US012346909B2

(12) United States Patent
Mukherjee et al.

(10) Patent No.: US 12,346,909 B2
(45) Date of Patent: Jul. 1, 2025

(54) UNIQUE DEVICE IDENTIFICATION SYSTEM

(71) Applicant: Synchrony Bank, Stamford, CT (US)

(72) Inventors: Joydeep Mukherjee, Stamford, CT (US); Karen Yagnesak, Stamford, CT (US); Viveka Vardhan Ravi, Stamford, CT (US); Sarath Vadakapurapu, Stamford, CT (US); Ravish Kumar, Stamford, CT (US); Vish Dadireddy, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 17/815,404

(22) Filed: Jul. 27, 2022

(65) Prior Publication Data

US 2023/0031114 A1    Feb. 2, 2023

Related U.S. Application Data

(60) Provisional application No. 63/203,557, filed on Jul. 27, 2021.

(51) Int. Cl.
*G06Q 20/40* (2012.01)
(52) U.S. Cl.
CPC .................. *G06Q 20/409* (2013.01)
(58) Field of Classification Search
CPC ............. G06Q 20/409; G06Q 20/4016; G06Q 20/382; H04W 12/12; H04L 9/088; H04L 67/563; G06F 21/45

USPC ..... 705/2, 7.29, 14.73, 26.1, 26.5, 28, 36 R, 705/39, 44, 67; 707/17.014; 726/1, 8; 235/380; 379/189; 713/168
See application file for complete search history.

(56) References Cited

U.S. PATENT DOCUMENTS 7,711,697 B2 * 5/2010 Parry ................. G06Q 30/0601
705/26.1
8,145,560 B2 * 3/2012 Kulkarni ................ G06Q 40/03
379/189
8,996,150 B1 * 3/2015 Ambrose ........... G06Q 30/0621
705/26.5

(Continued)

FOREIGN PATENT DOCUMENTS

CA         2896525 A1 *  1/2016  ......... G06Q 20/3224
WO  WO-2012003534 A1 *  1/2012  ............. H04M 3/51

(Continued)

*Primary Examiner* — Hani M Kazimi
*Assistant Examiner* — Sanjeev Malhotra
(74) *Attorney, Agent, or Firm* — Polsinelli LLP

(57) ABSTRACT

Systems, methods, devices, instructions, and other aspects are provided for unique device identification. In one aspect, a method is providing including receiving, at a server computer, transaction data associated with a client device, wherein the transaction data includes device configuration data, aggregating the device configuration data for the client device received within a threshold time period to generate a unique set of device configuration characteristics, receiving, at the server computer, transaction request data associated with the client device, verifying the client device using the unique set of device configuration characteristics, and facilitating a transaction associated with the transaction request data based on verification of the client device using the unique set of device configuration characteristics.

20 Claims, 33 Drawing Sheets

(56) References Cited

U.S. PATENT DOCUMENTS

| | | | |
|---|---|---|---|
| 2009/0198596 A1* | 8/2009 | Dolan | G06Q 10/06 705/28 |
| 2009/0319776 A1* | 12/2009 | Burch | H04L 63/08 713/168 |
| 2010/0042504 A1* | 2/2010 | Shenfield | G06Q 30/0277 705/14.73 |
| 2010/0153451 A1* | 6/2010 | Delia | G06F 21/316 707/E17.014 |
| 2012/0116976 A1* | 5/2012 | Hammad | H04L 63/0853 705/67 |
| 2012/0158531 A1* | 6/2012 | Dion | G06Q 30/0601 705/26.1 |
| 2012/0259647 A1* | 10/2012 | Syed | G16H 10/20 705/2 |
| 2013/0204786 A1* | 8/2013 | Mattes | G06Q 20/40145 705/44 |
| 2013/0218637 A1* | 8/2013 | Bikman | G06Q 30/0201 705/7.29 |
| 2015/0007253 A1* | 1/2015 | Thomas | H04L 63/20 726/1 |
| 2015/0206241 A1* | 7/2015 | Manning | G06F 21/31 705/36 R |
| 2016/0012427 A1* | 1/2016 | Van Heerden | H04L 63/0853 705/44 |
| 2016/0171486 A1* | 6/2016 | Wagner | G06Q 20/326 705/39 |
| 2017/0026187 A1* | 1/2017 | Ramatchandirane | G06F 21/6218 |
| 2017/0230390 A1* | 8/2017 | Faulkner | H04L 67/02 |
| 2017/0302656 A1* | 10/2017 | Ramatchandirane | H04L 63/0869 |
| 2017/0346850 A1* | 11/2017 | Jin | G06F 9/4416 |
| 2018/0077120 A1* | 3/2018 | Baughman | H04L 67/563 |
| 2018/0096354 A1* | 4/2018 | Kohli | G06F 21/32 |
| 2018/0196694 A1* | 7/2018 | Banerjee | G06F 13/1642 |
| 2018/0234420 A1* | 8/2018 | Mattes | G06Q 20/40145 |
| 2019/0156338 A1* | 5/2019 | Salama | G06Q 20/20 |
| 2019/0236558 A1* | 8/2019 | Miles | G06Q 20/02 |
| 2019/0370800 A1* | 12/2019 | Song | G06Q 20/4016 |
| 2020/0112561 A1* | 4/2020 | Hearty | G06F 21/73 |
| 2020/0402054 A1* | 12/2020 | Manjunath | G06Q 20/3674 |
| 2021/0136063 A1* | 5/2021 | Cheek | H04W 12/12 |
| 2021/0185531 A1* | 6/2021 | Avetisov | H04W 12/108 |
| 2021/0306335 A1* | 9/2021 | Avetisov | H04L 9/0643 |
| 2021/0377254 A1* | 12/2021 | Avetisov | H04L 67/133 |
| 2022/0109674 A1* | 4/2022 | Avetisov | H04L 63/0884 |
| 2022/0198007 A1* | 6/2022 | Katta | H04L 63/101 |
| 2022/0255931 A1* | 8/2022 | Avetisov | H04L 63/0442 |
| 2022/0318394 A1* | 10/2022 | Broome | G06F 21/57 |
| 2022/0394468 A1* | 12/2022 | Avetisov | H04L 63/0884 |
| 2023/0100993 A1* | 3/2023 | Edwards | G06Q 20/4014 235/380 |
| 2023/0239284 A1* | 7/2023 | Simic | H04L 9/3213 726/8 |

FOREIGN PATENT DOCUMENTS

| | | | | |
|---|---|---|---|---|
| WO | WO-2014163280 A1 | * | 10/2014 | H04L 61/303 |
| WO | WO-2019197883 A1 | * | 10/2019 | H04L 63/108 |

* cited by examiner

2200

```
┌─────────────────────────────────────────────────────────────────────┐
│ RECEIVING, AT A SERVER COMPUTER, TRANSACTION DATA ASSOCIATED WITH A │
│ CLIENT DEVICE, WHEREIN THE TRANSACTION DATA INCLUDES DEVICE         │
│ CONFIGURATION DATA                                                  │
│ 2202                                                                │
└─────────────────────────────────────────────────────────────────────┘
                                    ↓
┌─────────────────────────────────────────────────────────────────────┐
│ AGGREGATING DEVICE CONFIGURATION DATA FOR THE CLIENT DEVICE         │
│ RECEIVED WITHIN A THRESHOLD TIME PERIOD TO GENERATE A UNIQUE SET    │
│ OF DEVICE CONFIGURATION CHARACTERISTICS                             │
│ 2204                                                                │
└─────────────────────────────────────────────────────────────────────┘
                                    ↓
┌─────────────────────────────────────────────────────────────────────┐
│ RECEIVING, AT A SERVER SYSTEM, TRANSACTION REQUEST DATA ASSOCIATED  │
│ WITH THE CLIENT DEVICE                                              │
│ 2206                                                                │
└─────────────────────────────────────────────────────────────────────┘
                                    ↓
┌─────────────────────────────────────────────────────────────────────┐
│ VERIFYING THE CLIENT DEVICE USING THE UNIQUE SET OF DEVICE          │
│ CONFIGURATION CHARACTERISTICS                                       │
│ 2208                                                                │
└─────────────────────────────────────────────────────────────────────┘
                                    ↓
┌─────────────────────────────────────────────────────────────────────┐
│ FACILITATING A TRANSACTION ASSOCIATED WITH THE TRANSACTION REQUEST  │
│ DATA BASED ON VERIFICATION OF THE CLIENT DEVICE USING THE UNIQUE    │
│ SET OF DEVICE CONFIGURATION CHARACTERISTICS                         │
│ 2210                                                                │
└─────────────────────────────────────────────────────────────────────┘
```

FIG. 22

UNIQUE DEVICE IDENTIFICATION SYSTEM

CROSS-REFERENCE TO RELATED APPLICATIONS

This application claims the benefit of U.S. Provisional Application No. 63/203,557 titled "UNIQUE DEVICE IDENTIFICATION SYSTEM" and filed on Jul. 27, 2021, which is hereby incorporated by reference, in entirety and for all purposes.

FIELD

The present disclosure relates generally to payment systems and associated offer systems, data security, transactions. In one example, the systems, methods, and other embodiments described herein may be used to implement a multi-product platform used to coordinate customer and merchant systems with multiple different payment system product platforms that are not independently connected, and an integrated device identification system.

BACKGROUND

Customers often seek to obtain and use credit from a lending institution for a variety of purposes. In some circumstances, a customer may interact with a merchant in an environment where the customer prefers additional security and protection for the customer's data. Managing a transaction in such environments can create barriers to completing transactions between customers, merchants, and lenders. Additionally, mobile platforms are an increasing share of the devices which a customer can use to obtain and use credit, and these environments can be leveraged for point of sale (POS) devices. The POS terminal is where the checkout process occurs in both online and in-store purchases, and is usually the last interaction a shopper has with a retailer during a transaction. For some shoppers, the POS terminal is the most important part of the entire shopping experience. If the POS interface is quick, efficient, and pleasant, the customer is more likely to return. Such POS systems can, however, limit certain credit options and present further barriers to transactions for purchase options other than those directly associated with the POS environment (e.g., a mobile environment). Further, other considerations can be involved in such transactions or credit offer operations, such as lender and merchant concerns related to fraud, and regulatory controls on data sharing when the data used in such transactions can be subject to a variety of privacy and regulatory considerations. Such considerations can further create barriers in the context of network communications and data management in a communication system for the data used to facilitate credit options and associated purchase transactions.

BRIEF DESCRIPTION OF THE DRAWINGS

The present disclosure is described in conjunction with the appended figures:

FIG. 22 is a flow diagram illustrating a method for unique device identification in accordance with some examples.

Figure 1A:
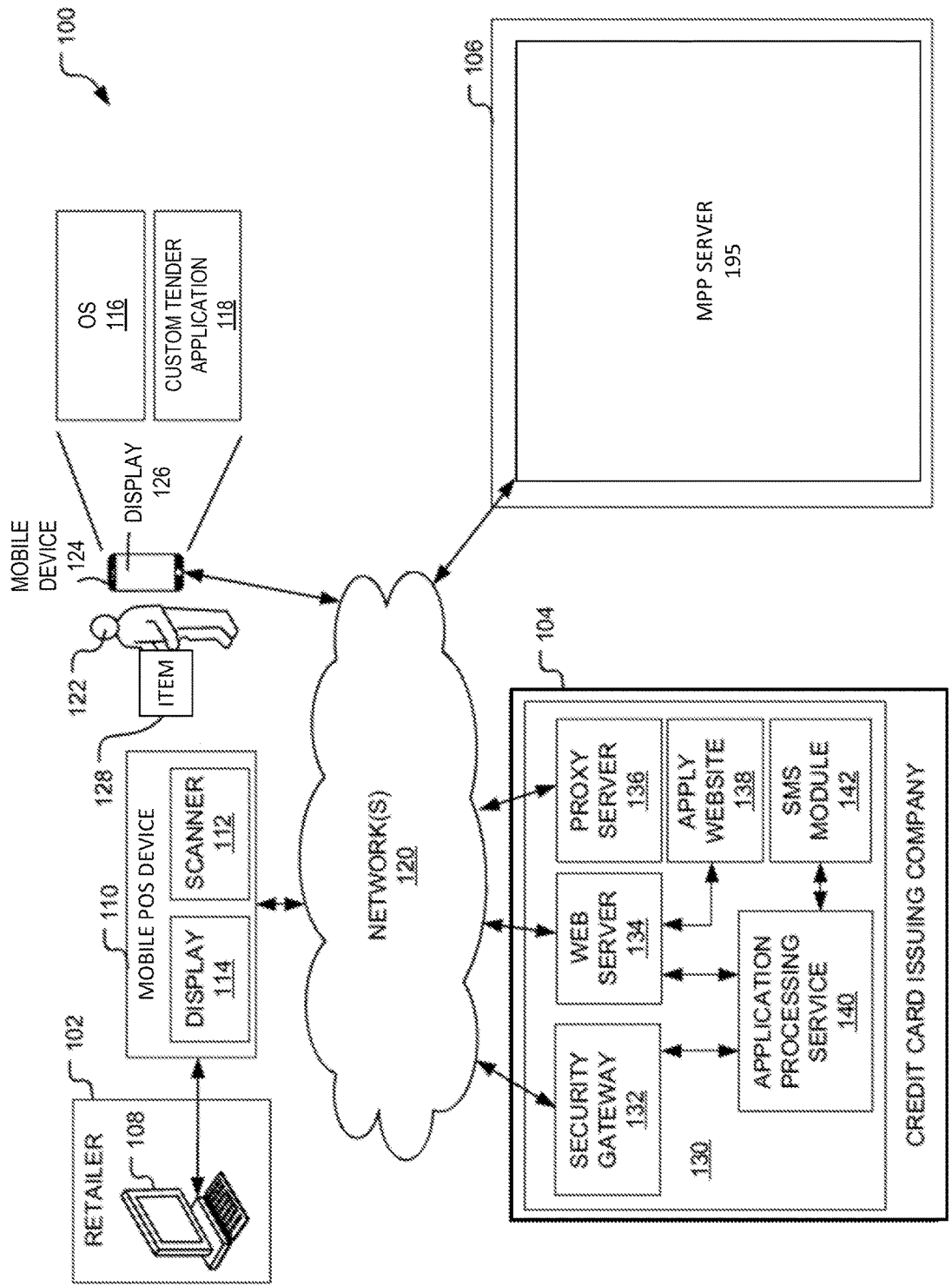
FIG. 1A depicts aspects of a system that can be used with a multi-product platform system integrated with payments in accordance with examples described herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples of embodiment(s) only and is not intended to limit the scope, applicability or configuration of the disclosure. Rather, the ensuing description of the examples of embodiment(s) will provide those skilled in the art with an enabling description for the described implementations. In the following description, for the purposes of explanation, specific details are set forth in order to provide a thorough understanding of certain inventive embodiments. It is understood that various changes can be made in the function and arrangement of elements without departing from the spirit and scope as set forth in the appended claims. Additionally, it will be apparent that various embodiments may be practiced without these specific details. The figures and description are not intended to be restrictive.

As described above, a point of sale (POS) terminal is where the checkout process occurs in both online and in-store purchases, and is usually the last interaction a shopper has with a retailer during a transaction. For some shoppers, the POS terminal is the most important part of the entire shopping experience. Modern POS systems can be built with ecosystem-specific applications that limit certain credit options and present further barriers to transactions for purchase options other than those directly associated with the POS environment (e.g., a mobile environment, a web browser environment, or a laptop computer environment). Similarly, phone applications and web-interfaces can include sales systems within the application or web-interface which can fulfill POS functionality or include other such ecosystem-specific application functions within the checkout or purchase functionality. Such applications or web-interfaces can include similar barriers to those described above in POS systems.

Such barriers can obstruct system goals which are better served by seamless access to products such as delayed purchase transaction payment products, fixed repayment products, and other such products. In some environments, such products are offered by different stand-alone systems which require separate user identification, login operations, or other such interface flows for non-integrated products that can act as a barrier to customer use.

Examples described herein can use an application programming interface that allows various digital components to store data and decisions associated with a customer session while the customer follows user interface flows. In some examples, checkout data can be temporarily stored that includes not only state and history data for a transaction (e.g., user interface selection and search histories), but also device details such as operating system versions, browser versions, and other such details about a device. Such data can be gathered not only for a single product interaction, but for any combination of product interactions in a MPP system as described herein. Integration with an MPP system or other similar systems allows security and interface improvement solutions to scale across loosely coupled components for different products.

In various examples, a common repository of customer data and device data allows different products and product systems to have access to the common repository of data. Storage of a unique combination of device details on a temporary basis allows a customer identity to be established, and for the device to access the common depository of information as the device uses multiple product systems. Security systems can confirm that a devices set of characteristics is unique. If the identified characteristics are determined not to be unique, additional data can be requested to arrive at a unique set of characteristics for a device, or additional security limits can be imposed. The unique characteristics are further achieved by limiting the amount of time that a device's characteristics are stored. This reduces opportunities for duplicate device characteristics to be stored in a given time frame. Limiting data storage to deletion threshold limits opportunities for malicious actors to spoof the device data. Such deletion limits can be set for a single transaction time period (e.g., 5 minutes, 10 minutes, etc.), or an expected return time period following a transaction (e.g., 24 hours, 48 hours, etc.).

In some examples, a learning system can use anonymized history data to improve a unique device identification system by determining data sets that result in non-unique overlap between devices, and that updates a default set of data expected to provide uniqueness for a given device. Such machine learning systems can improve device performance by limiting data used while achieving security targets and other targets in a system. For example, certain device types may use less information for unique identification (e.g., due to common device characteristics or less common device characteristics), and can allow a system to target the amount of data for certain device types to reduce memory use within a system.

Such improved systems can be offered for device described herein, including POS software offered via a customer's device, or any other such POS device, mobile device, desktop device, merchant system, etc. FIG. 1A is a block diagram of a system 100 in which payments can be performed in accordance with some examples to enable seamless presentation of multiple products during a transaction. In example system 100 of FIG. 1A, POS device 110 can include a user interface element for a multi-product platform integration option as described above. The option can be presented as a customer 122 is purchasing an item 128. When the option is selected on POS device 110, the POS device 110 can communicate with application 118 on the customer 122 mobile device 124, as supported by any suitable operating system 116.

The example system 100 includes a retailer 102, a credit card issuing system 104, and a multi-product system 106. In some systems, aspects can be merged, such as for example, the MPP system 106 being merged with the credit issuing system 104 such that devices of MPP system 106 and system 104 can be the same device or devices. (e.g., where the card issuing system 104 also provides dynamic offers as part of a multi-product system 106). The retailer 102 (e.g. a merchant or other clients of multi-product system 106) includes a retail computing system 108 connected to at least one POS device 110. The illustrated POS device 110 includes a scanner (e.g., a barcode scanner) and a display device. The POS device 110 of FIG. 1A can include various systems for communicating with mobile device 124. The communication systems can include Bluetooth WiFi®, or other wireless network systems for communication. In some examples, rather than communicating using local wireless communications, a code or other matching mechanism can be used to match application 118 with POS device 110 via a wide area network (e.g., the Internet) to allow communications and dynamic synchronization between POS device 110 and mobile device 124. In various implementations, the customer device 124 can access various communication channels, including short message service (SMS), text, application based communications, e-mail, web browsers, or other such communication channels.

Once a connection is established between POS device 110 and mobile device 124, tender operations integrating products from multiple product systems can be performed using application 118 as described below. Additionally, other implementations of POS device 110 can include a credit card scanner or other payment input, a keypad, or other such elements. Additional examples of a POS device 110 can be a tablet device, a smartphone, a laptop computer, or any other such device that can be accessed by a customer, either directly, or through an employee of the retailer. The retail computing system 108 may be directly connected or connected by one or more networks 120 (described below) to the POS device 110. The retail computing system 108 and the POS device 110 may each be implemented by one or more computing devices, which may each be implemented as a computing device with architecture 2400 described below and illustrated in FIG. 24.

Referring to FIG. 1A, the POS device 110 is configured to be operated by a customer 122 having a customer device 124 (e.g., a cellular telephone) with a display device 126 (e.g., a conventional touch screen). For example, the customer 122 may purchase one or more items 128 using the POS device 110. As will be described below, the customer 122 may also use the POS device 110 and the mobile device 124 to apply for credit. Enabling the customer 122 to request credit at the POS device 110 and complete the application process using the mobile device 124 gives the customer 122 the opportunity to save money or make flexible financial arrangements by applying for credit when it is needed in a quick and easy manner.

The credit card issuing system 104 operates one or more computing devices 130. The computing device(s) 130 implement a security gateway 132, a web server 134, a proxy server 136, an application processing service 140, and a SMS module 142. The security gateway 132 is configured to communicate with the SCO device 110 over the network(s) 120. The web server 134 and the proxy server 136 are both connected to the network(s) 120. The web server 134 is configured to generate an apply website 138. The application processing service 140 is configured to communicate with the security gateway 132 and/or the web server 134. The SMS module 142 is configured to communicate with the application processing service 140. The SMS module 142 may be implemented by middleware. By way of a non-limiting example, the computing device(s) 130 may each be implemented as the computing device architecture 2400 described below and illustrated in FIG. 24.

The multi-product system 106 operates one or more MPP servers 195 configured to communicate over the network(s) 120. The MPP servers can perform a variety of operations to enable dynamic offer presentation from multiple product systems as described below. By way of a non-limiting example, the MPP servers may each be implemented as the computing device with architecture 2400 described below and illustrated in FIG. 24.

As described herein, a customer device 124 can be used in conjunction with POS device 110 to establish secure communications between customer 122 and retailer system 108. In some contexts, a customer 122 is concerned about privacy and financial communications, in particular with respect to a retailer employee that may be communicating with customer 122. A customer 122 can additionally have concerns about data being communicated with retailer system 108 being visible to checkout employees of the retailer in ways that customer 122 can wish to avoid, such as the possibility of a credit request being denied (e.g., rejected). Examples described herein use a unique URL generated by the of multi-product system 106 to establish secure communications between customer device 124 and retailer system 108 in ways that enable additional privacy and security. This also enables initiation of certain data communications using POS device 110 to allow a retailer to improve sales through offers to customers made through devices associated with the retailer, such as POS device 110.

In various examples described herein, POS device 110 can use information from retail system 108 to identify offers available from system 106 using MPP server 195. In response to an indication of interest from a customer 122 (e.g. using POS device 110), the retail computing system 108 can communicate request data to multi-product system 106. This can include identifying information from POS device 110 or customer device 124 that can be used by a device authentication service to confirm information regarding devices related to the request data. This can include data about a location or store associated with POS device 110. This can include identifying account information, location information, or any other such context information about customer device 124. The request data and information from device authentication service can also provide information to other services. For example, an SMS service can identify whether multi-product system 106 has authorization to communicate with customer device 124 in accordance with regulations limiting the ability for a business to initiate communications with customer devices such as device 124. MPP server 195 can interact with mobile device 124 to seamlessly allow a credit request (e.g., an apply operation) followed by a purchase operation using information from the apply operation. In other such examples, other products can be seamlessly integrated using MPP server 195 to dynamically direct user interfaces of application 118 to products managed by MPP server 195.

In some examples, a token service can act in a number of ways to facilitate secure communications between customer 122 and various other services and devices, including retail computing system 108 and credit card issuing system 104. Tokenization is a process of substituting sensitive data elements with non-sensitive equivalents (e.g. tokens). Such a token service can use large random number in combination with other systems, such as timing systems, to limit and secure the use of sensitive data being communicated over networks such as networks 120.

As described above, in some examples, multi-product system 106 and credit issuing system 104 can, in some implementations, be the same system. In such a system, a token service can further act to generate tokens for credit numbers or other aspects of financial transactions which involve credit system 104. In additional examples, other aspects of system 100 can further be altered or include additional or intervening elements, such as multiple customers, customers with shared accounts, additional merchant or retailer systems, subsystems that can operate independently, such as the use of an independent SMS service, or any other such structure for a system 100.

Figure 1B:
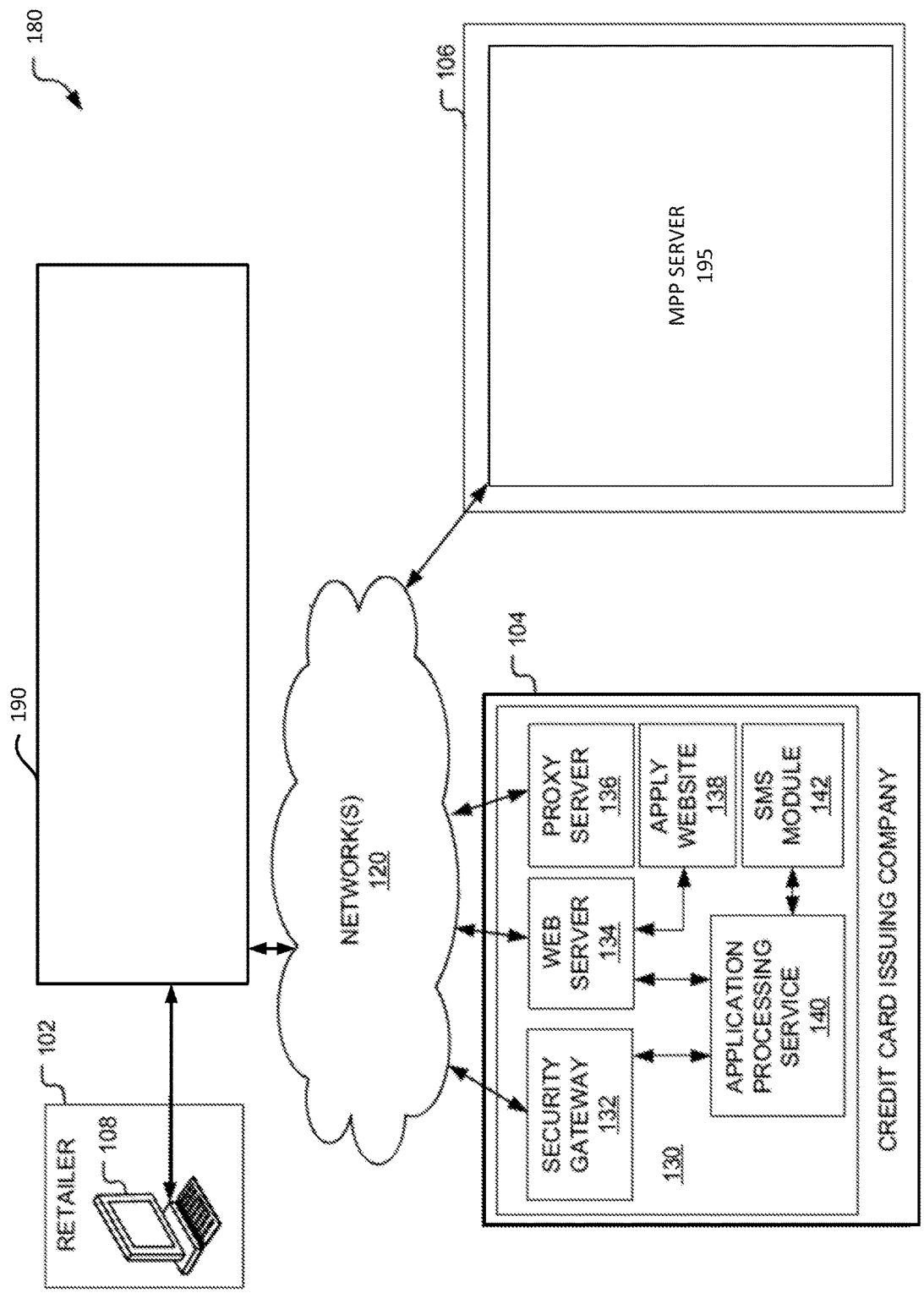
FIG. 1B depicts aspects of a system that can be used with a multi-product platform system integrated with payments in accordance with examples described herein.

FIG. 1B is a block diagram of a system 180 in which product offerings can be dynamically presented via an MPP server 195 as part of a transaction in accordance with some examples. System 180 of FIG. 1B is similar to system 100 of FIG. 1, except system 180 includes a purchase device 190 operating in place of the POS architecture of FIG. 1A. The purchase device 190 may be an electronic device such as a mobile phone, a laptop, a desktop, or any other such device. The purchase device 190 may perform any user device action described herein, including user selection of offers provided by an MPP server 195. Implementations of the payment device 190 can include elements of an application, a payment interface, or payment systems within an application that can be configured to provide interactions with the MPP server 195.

Figure 2:
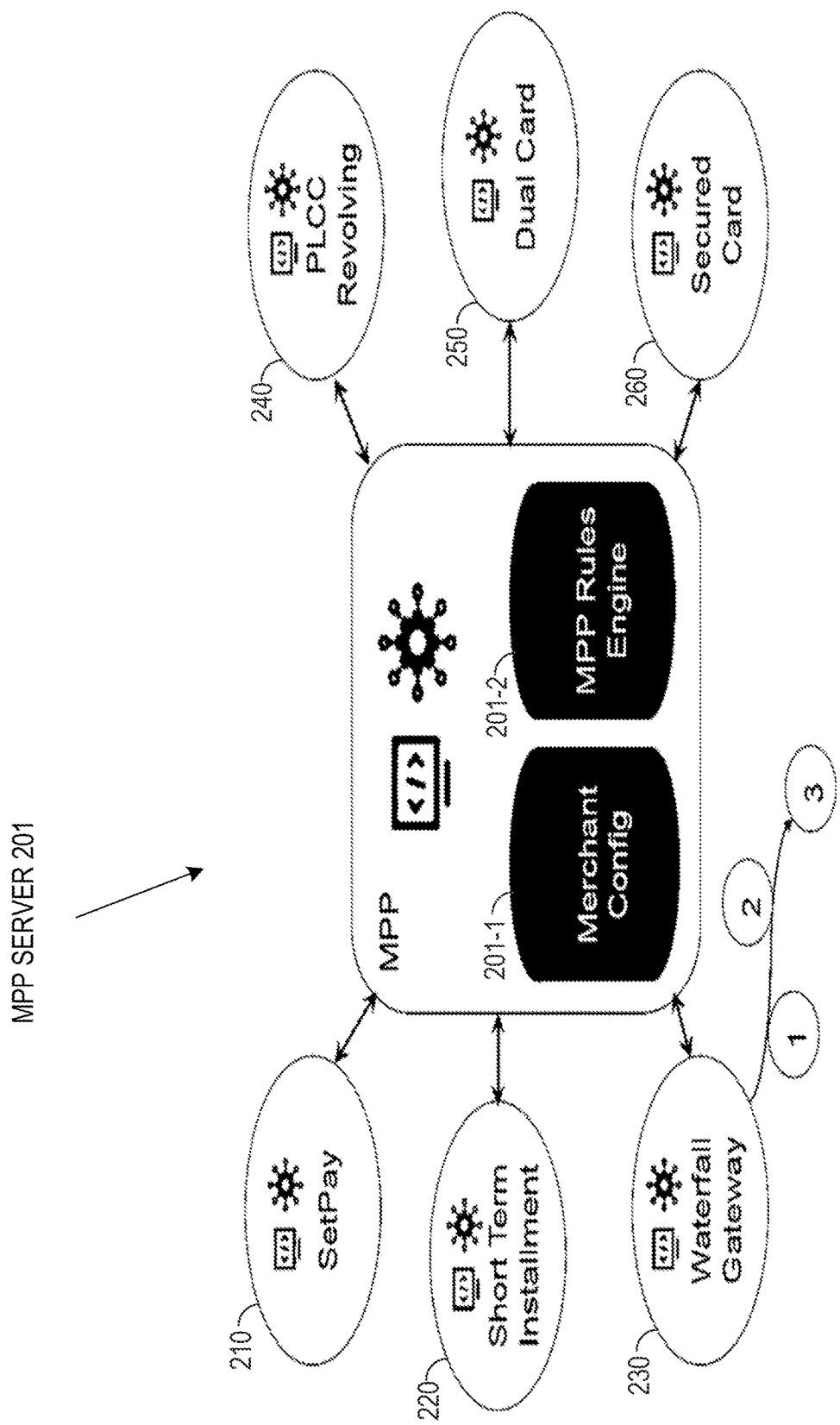
FIG. 2 depicts aspects of a system including a multi-product platform in accordance with some examples.

FIG. 2 depicts aspects of a system including a multi-product platform server 201 in accordance with some examples, and five direct product systems (e.g., multiple product systems) communicatively coupled to the MPP server 201. The illustrated direct product systems include a set payment system 210, a short term installment system 220, a revolving credit system, a dual card system 250, and a secured card system 260. In addition to the illustrated direct product systems, the MPP server 201 is additionally communicatively coupled to a waterfall gateway 230 that connects to 3 additional waterfalled systems 230-1, 230-2, and 230-3. In other implementations, a MPP server such as the MPP server 201 can act as an interface for any number of additional product system (e.g., direct or indirect via a gateway such as the waterfall gateway 230), not simply the illustrated systems of FIG. 2.

An application 118 as described in FIGS. 1A and 1B above can participate in a transaction, either on a merchant's POS device, or a customer's device (e.g., via an application on a mobile device, a web interface on a computing device, or via any other such interaction with a merchant system) as part of a transaction. During a transaction, such a POS device can gather dynamic customer data. Such data can include customer product interests, identifying customer data, customer payment information, or any other such data. The data can vary from traditional transaction security and payment information to customer preferences and customer demographic information. In some examples, an interface can be dynamically updated on a customer's device based on the dynamic customer data. During such interactions, if a transaction eventually results, the customer device sends the dynamic customer data along with item details for an item to be purchased to an MPP server 201. The MPP server 201 has access to merchant configuration details (e.g., static configuration information) from a merchant configuration system 201-1. The static merchant configuration information from the merchant configuration system 201-1 can be used to dynamically and seamlessly integrate a user interface to be sent by the MPP server 201 to the customer's device in response to the dynamic customer data. An MPP rules engine can dynamically analyze the dynamic customer information to identify independent product systems appropriate for the given dynamic customer data.

As mentioned above, the various product systems can be dynamically selected by a machine learning algorithm based on training data and past history data. At the end of a transaction, transaction details can be used as feedback to update the machine learning algorithm used to select a given product system by the MPP server 201. In the example system of FIG. 2, five different direct product systems are shown as described above (e.g., the systems 210, 220, 240, 250, and 260), and a waterfall gateway 230 to additional indirect systems 230-1, 230-2, and 230-2 available to the MPP are shown. The MPP rules engine 201-2 (e.g., a machine learning algorithm, dynamic decision engine, state decision machine, etc.) uses the dynamic customer data to select one or more product systems from among the available product systems. In some examples, the MPP rules engine first selects from direct (e.g., tier 1) product systems (e.g., the systems 210, 220, 240, 250, and 260), and if no product is found, indirect systems (e.g., tier 2 systems 230-1, 230-2, and 230-3) can be identified via the waterfall gateway 230. After a product system is selected, the MPP server 201 interacts with the system to receive product data matching the dynamic customer data. The MPP server 201 then configures the product data from the selected product system using system rules from the merchant configuration system 201-1 and the MPP rules engine 201-2 to develop customer (e.g., client of a merchant) compatible data.

The merchant configuration data can be used with the product data to generate client compatible data that not only functions with a purchasing device or user interface (e.g., the POS device 110, the mobile device 124, the purchasing device 190, etc.), but also provides a seamless user interface. The share interface presentation can be used for multiple products managed by the MPP server 201, such as credit application products and payment term products, as part of a single transaction. Such configuration rules can also be used for different offers from the same product system, or competing offers from different product systems. In one implementation, a product offering from a direct product system may fail due to information provided by a client during a product interaction. A similar offer may then be provided by an indirect product system using a standardized user interface, and shared dynamic customer data.

In addition to the example above where the MPP server 201 filters through multiple options to identify a single selection, in some implementations, multiple options or selectins can be identified in some implementations. For example, the MPP server can use the data as described above to select and configure multiple options, and can simultaneously communicate information for all selected options at the same time, rather than providing data for multiple options separately in a serial fashion.

Additionally, in another implementation, the waterfall gateway 230 can provide simultaneous credit offers from different independent product systems. Merchant configuration data can be used to aggregate the data from the different product systems and merge the data into client compatible data with a standardized user interface. The standardized user interface can be shared not only by the different product systems, but by the merchant system associated with the transaction, as configured by the merchant using static merchant configuration settings from the merchant configuration system 201-1.

The MPP server 201 can then facilitate any customer interaction needed to complete a product offering, and to facilitate the transaction between the customer device and the merchant system involving a product offering from the MPP server 201 used in the transaction. For example, the MPP server 201 can receive information for thousands, hundreds of thousands, or millions of transactions, along with client data associated with the transactions, and merchant configuration data for any number of merchants. The merchant configuration data can be stored in the merchant configuration system 201-1, and the MPP rules engine 201-2 can be configured by a system operator, or can be trained using the information from the received transactions to identify matches between current transaction data and successful outcomes for product system matches (e.g., customer selection of a product selected by an MPP server and completion of a transaction with the customer using the selected product. For example, in some implementations, data can be analyzed to identify industry codes which are used as part of the matching (e.g., merchant codes or other such codes for product types, specific products, etc.)

FIGS. 3A through 3H depicts domain objects a multi-product platform in accordance with some examples described herein. The illustrated objects 310-380 involve both dynamic user interface presentation and dynamic product selection based on elements of the dynamic customer data, transaction data, or product selection operations and analysis. This can include information about transaction workflow (e.g., customer journey through a user interface flow), items involved in a transaction, or any information involved in a transaction. The illustrated blocks include information that can be used to integrate a product system, merchant, product, or any aspect of a purchase flow with customized detail into an integrated system operated by an MPP server. For example, when a new merchant or a new product for a merchant is to be integrated with MPP server management (e.g., so the MPP server can manage purchase product presentation as part of a checkout process), the blocks described blow can include setup processes, interface structures, and other information, rules, and/or templates that can allow automatic and dynamic integration with the MPP server. Such dynamic and automatic integration can be used for new merchants, new merchant products, new product systems and/or offers associated with product systems (e.g., credit or purchase type products).

In some implementations, the methods described herein, and the associated configurations described in FIGS. 3A through 3H are configurations captured as rules for use with an MPP server. For example, when a merchant system is onboarded (e.g., integrates MPP systems with merchant systems), the merchant can select unifying (e.g., UniFi) products, which offers a suite of business, branding, and integrations structures captured as such rules. Example template structures of blocks as described in FIGS. 3A through 3H can represent the structure of merchant rules in some implementations. Such rules can be stored as JavaScript Object Notation (JSON) in a system for use during operations. In such an implementation, when a customer request originates from a merchant website after merchant system onboarding associated with the merchant website, and MPP server can access the rules (e.g., files or data including the JSON data or other such data), assemble required system components based on the rules, and execute associated processes for the customer request (e.g., a transaction, a data request for product offers, etc.)

Additionally, in some implementations, details of transaction history can be integrated with such setup data and used in automatic and dynamic updates to system features while the system is facilitating transactions. For example, as described herein, an MPP server can be configured to assist with any number of generic merchants or products in addition to customized or pre-configured merchant, product, offer, and other items. Such a system can process and facilitate thousands of transactions per second, and millions or billions of bytes as part of such transactions. Feedback data provided to a setup system can be used not only for an initial setup and integration with an MPP server, but can be called to dynamically adjust or change MPP preferences, templates, and settings based on dynamic analysis of transaction results. Such feedback and dynamic use of the setup system can allow MPP configurations for any block below to be adjusted while the MPP server is facilitating transactions, with transactions started before the dynamic change using the old settings, and new transactions (e.g., as a system is processing large numbers of transactions, such as hundreds, thousands, or tens of thousands of transactions per second) after dynamic implementation of the new settings proceeding in real-time following the change with the new dynamically updated settings.

In some examples, the MPP server operates by dynamically analyzing transaction results, system data, and product rules (e.g., dynamic or static), and dynamically determines the product is not appropriate for a transaction. In some examples, such a dynamic determination that a product is not appropriate will automatically trigger additional analysis, such as a waterfall analysis of related lower-tier offers or product systems. For example, if a preferred lender product system rejects a transaction, a sub-prime product lender can then be considered. If the sub-prime lender product system is accepted, the product information from the sub-prime lender can be managed by the MPP server 201 and transmitted to the client system for consideration by the client as part of the transaction. Each such process for every product system, merchant, prescriptive transaction data, or any other such data, can be used to generate user interface elements and to trigger dynamic operations using objects 310-380 as described. The examples of FIGS. 3A through 3H, are illustrative, and it will be apparent that may other such processes to select interfaces and associated operations will be possible within the scope of the innovations described herein.

FIGS. 3A-3H depict domain objects for use with a multi-product platform in accordance with some examples described herein. FIGS. 3A-3D describe rule definitions and templates for domain actors, and FIGS. 3E-3H describe rule definitions and templates for other aspects of an MPP system as described herein.

Figure 3A:
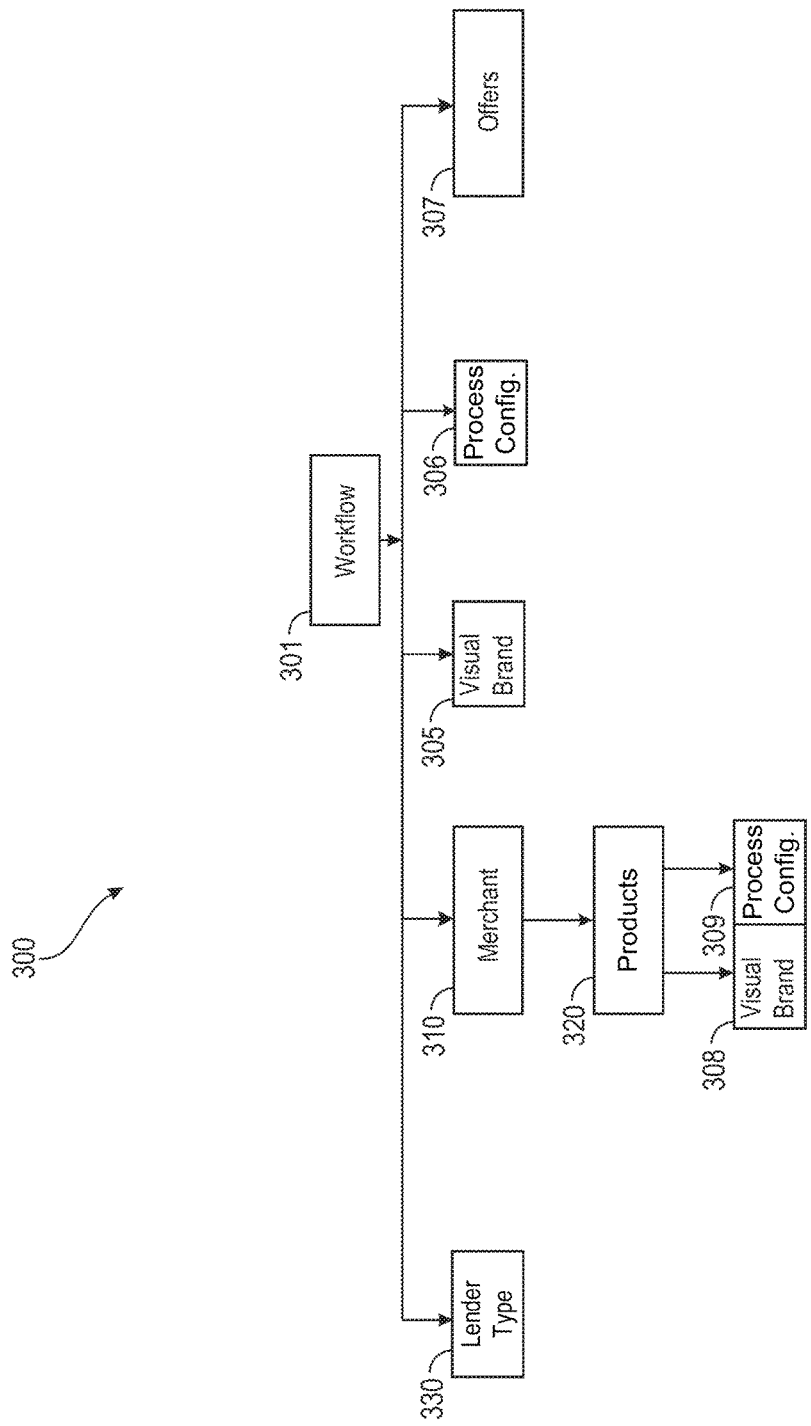
FIG. 3A depicts domain objects for use with a multi-product platform in accordance with some examples described herein.

FIG. 3A is graph 300 of domain objects branching from a workflow block 301. The branches include a merchant block 310, a visual brand block 305, a process configuration block 306, an offers block 307, and lender type block 330. The merchant block 310 has products block 320 as a dependent block, and the products block 320 has visual brand block 308 and process configuration block 309 as dependent blocks. The blocks of graph 300 are structures used with data from the MPP server 201 to generate interfaces for the products served by the MPP server 201. Each of the product systems in FIG. 2 will have associated data for some or all of the blocks under the workflow block 301. For example, product systems having an associated lender will include data for the lender type block 330, product systems having merchant and/or product specific data associated with the corresponding product(s) will have associated data for the merchant block 310, product block(s) 320, visual brand block 308, and process configuration block 309. For a given merchant, merchant block 310 can include overarching merchant data, product block 320 can have product specific data for products associated with a merchant (e.g., products sold by a merchant having associated data in the merchant block 310), and each product can have associated visual brand and interface or sales process configuration data in visual brand block 308 and/or process configuration block 309. For example, as described above, a MPP server can receive both merchant configuration data as well as transaction history data. Such data can be integrated into structures of the workflow block 301 to allow an MPP server to have information customized to a merchant and product that is used by the MPP server to identify MPP product systems (e.g., for sales or credit products to be offered to a customer as the customer is performing a checkout or payment process using a POS device or other payment device to pay for a merchant product associated with data in products block 320). Visual brand block 305 can be used to identify or store interface data associated with high level system or interface structures not otherwise identified under another sub-block of the workflow block 301 (e.g., including blocks not illustrated in FIG. 3A). Similarly, the process configuration block 306 can include information and default processes for product systems, lenders, offers, or other system aspects not defined within another block. Offers block 307 can include information about product system offerings for use within high-level MPP interface and decision making data structures. Any such data from any block can be used by machine learning or other systems to generate decision making algorithms that can be used by an MPP server to perform decision making and product selection operations in response to receipt of information regarding a current transaction at an MPP server.

Process configuration blocks such as the process configuration block 306 and/or the process configuration block 309 can include information about systems and processes for implementation and integration of any aspect of an associated architecture into MPP server operations. The process configuration blocks can additionally include information about dynamic changes to rules for an architecture element (e.g., a merchant, product, lender, offer, or any grouping or type grouping of such elements) while a system is functioning in addition to process rules for an initial integration with the MPP server.

Figure 3B:
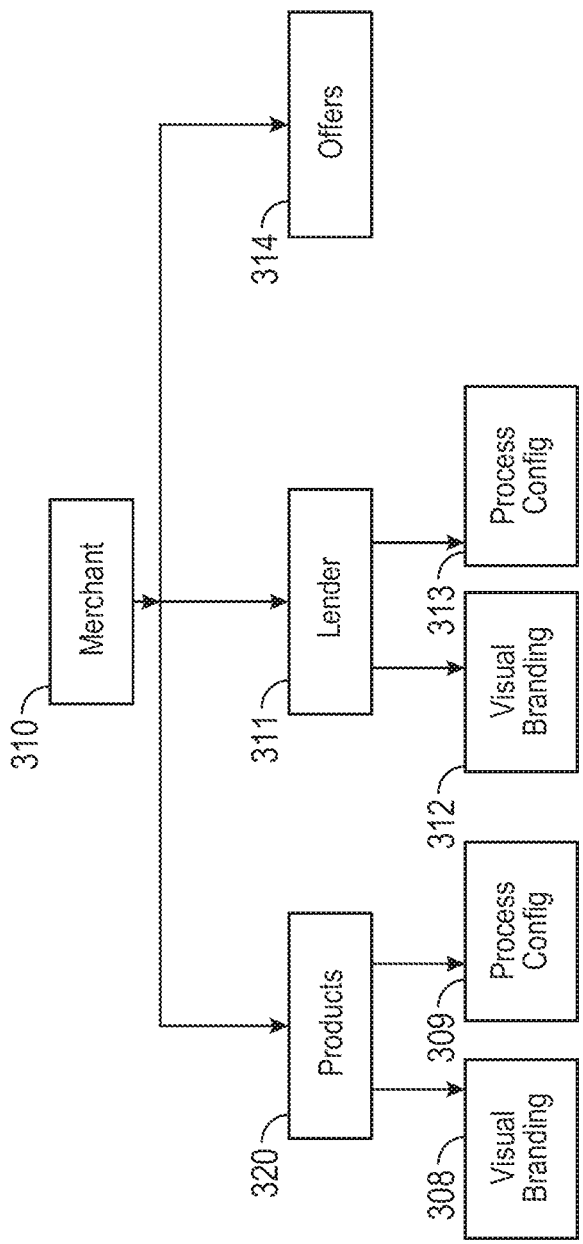
FIG. 3B depicts domain objects for use with a multi-product platform in accordance with some examples described herein.

FIG. 3B is an expanded chart of the merchant block 310 domain object sub-blocks. In some implementations, merchant configurations can include specific details or branding for particular merchant products, for particular lenders (e.g., where a lender partners with a merchant), or for merchant specific offer configurations (e.g., where a merchant selects particular offers from within a list of available offers, or where a merchant rejects certain offer types). Such data can be stored in a workflow block 301 within sub-blocks of the merchant block 310, as illustrated by product(s) block 320, visual branding block 308, process configuration block 309, lender block 311, visual branding block 312, process configuration block 313, and offers block 314.

The information in given blocks described above can be used by an MPP server (e.g., the MPP server 195 or the MPP server 201) to store data to be used in response to data received that is associated with a merchant transaction. When the data for a merchant transaction is received, the MPP server can use corresponding data from domain object blocks described above to match static and dynamic data to the transaction, and to select and generate product system offers (e.g., offer details and interface information) customized based on the MPP data and the merchant transaction information. For example, if a request is received for a product having no customized information associated with the merchant, top level visual branding data from the visual branding block 305 may be used to provide information to the purchasing device. By contrast, if a merchant associated with the transaction has product specific preferences and lender specific preferences associated with an offer that is selected to be presented to a user's device, information from visual branding blocks 308 and 312, and data from process configuration blocks 309 and 313 specific to the product and lender associated with the merchant product and the selected product system can be generated and presented to a customer by the MPP server.

Figure 3C:
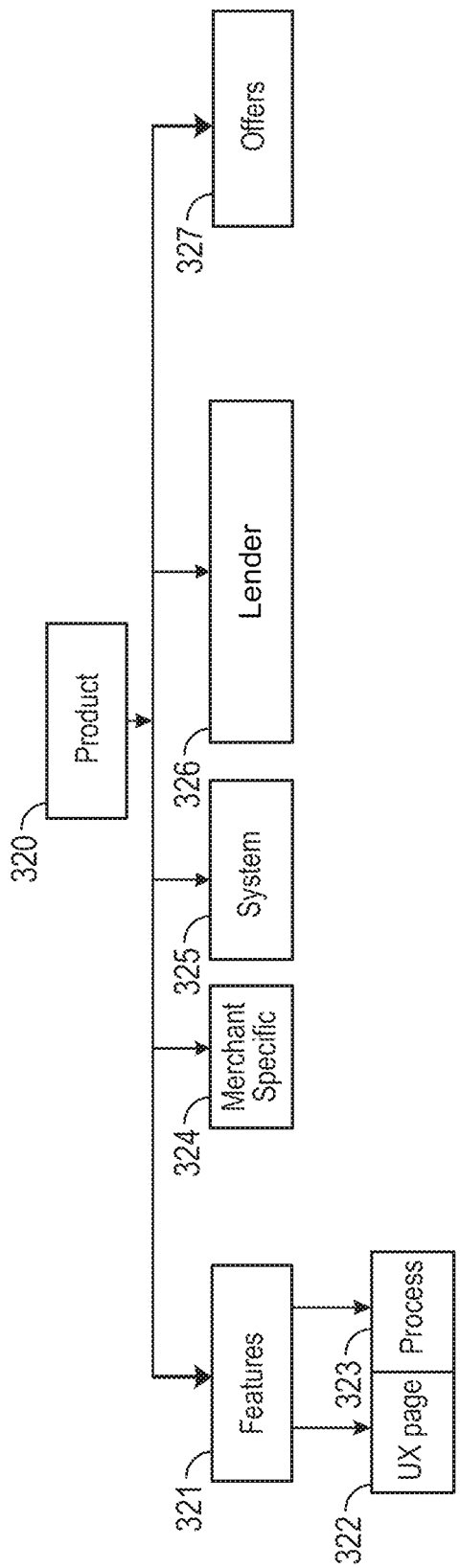
FIG. 3C depicts domain objects for use with a multi-product platform in accordance with some examples described herein.
Figure 3D:
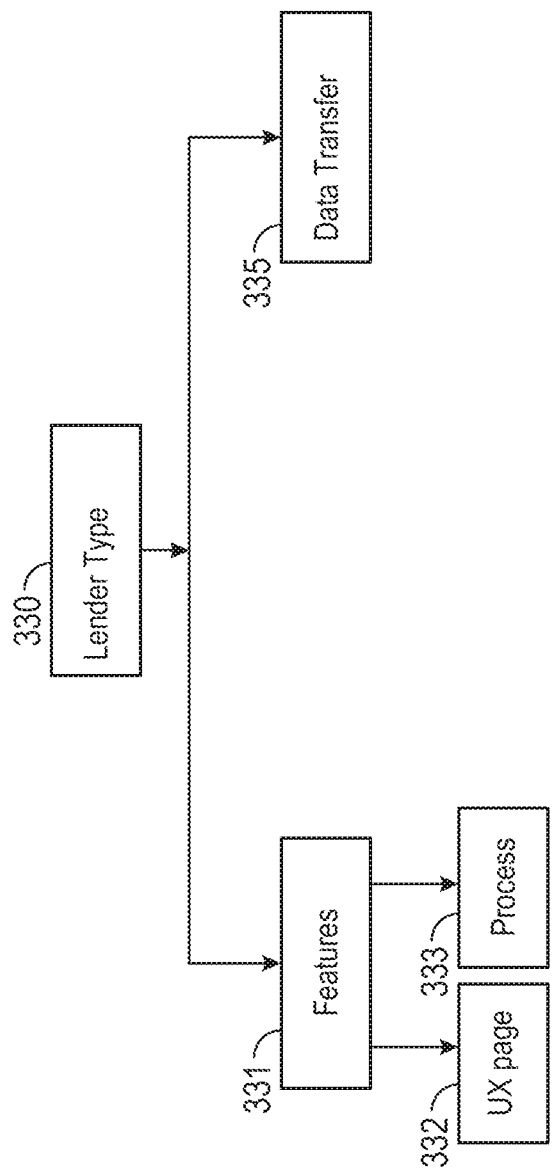
FIG. 3D depicts domain objects for use with a multi-product platform in accordance with some examples described herein.

FIG. 3C and FIG. 3D illustrate additional charts of block relationships that can be used by an MPP server for customized selections of credit products and interfaces associated with those products as described above. FIG. 3C is an expanded chart of the product block 320 domain object sub-blocks. As illustrated, product data associated with the product block 320 can have additional data for specific products associated with the product block 320 structured as domain object data in features block 321, merchant specific block 324, system block 325, lender block 326, and offers block 327. While data associated with merchants, systems, lenders, and offers can be present in other blocks, the data under the product block 320 can be specific to an individual product or a group of products. For example, a merchant can be associated with multiple groups of merchant products, and one or more products under the product block 320 can have product specific systems, lender associations, offers, or user interface or interface process features (e.g., with data stored in the user page block 322 or process block 323 associated product features block 321) with the product. Data stored in blocks under the product block 320 can be used for automatic configuration and presentation of such features to a purchasing device. Similarly, FIG. 3D is an expanded chart of the lender type block 330 domain object sub-blocks, including the illustrated features block 331 with user interface page block 332, process block 333, and data transfer block 335. When a purchasing device associated with transaction data for a merchant selling a large variety of different products provides information about a purchase to an MPP server, the MPP server can use the various information stored in domain-objects to handle credit product offers to be presented to the purchasing device as part of the transaction for the merchant product. Depending on the data associated with the merchant product involved in the transaction, the merchant rules for the transaction, and any system (e.g., top level workflow) offers and lenders, merchant specific offers and lenders, and/or product specific lenders, the interface presented to the purchasing device can be customized with any number of interface and process modifications identified within the domain-objects as matched to the current transaction. The MPP server can use the matching data to select one or more credit products and offers, and to dynamically generate a user interface based on the particular combination of matches between information in the MPP domain-objects (e.g., as described in FIGS. 3A-H) and the information associated with the current transaction. The MPP server can then facilitate presentation of offers to the purchasing device, support communications between the purchasing device and one or more product systems selected by the purchasing device as part of the transaction, and facilitate transaction completion once purchase transaction products (e.g., credit or payment type products) are selected from product system products presented to the purchasing device via the MPP server.

FIGS. 3E-3H then describe additional domain-object relationships. While FIGS. 3A-3D describe domain-object relationships in a domain actor context (e.g., product, merchant, lender, etc.), FIGS. 3E-3H describe rule and template relationships for other system organizations.

Figure 3E:
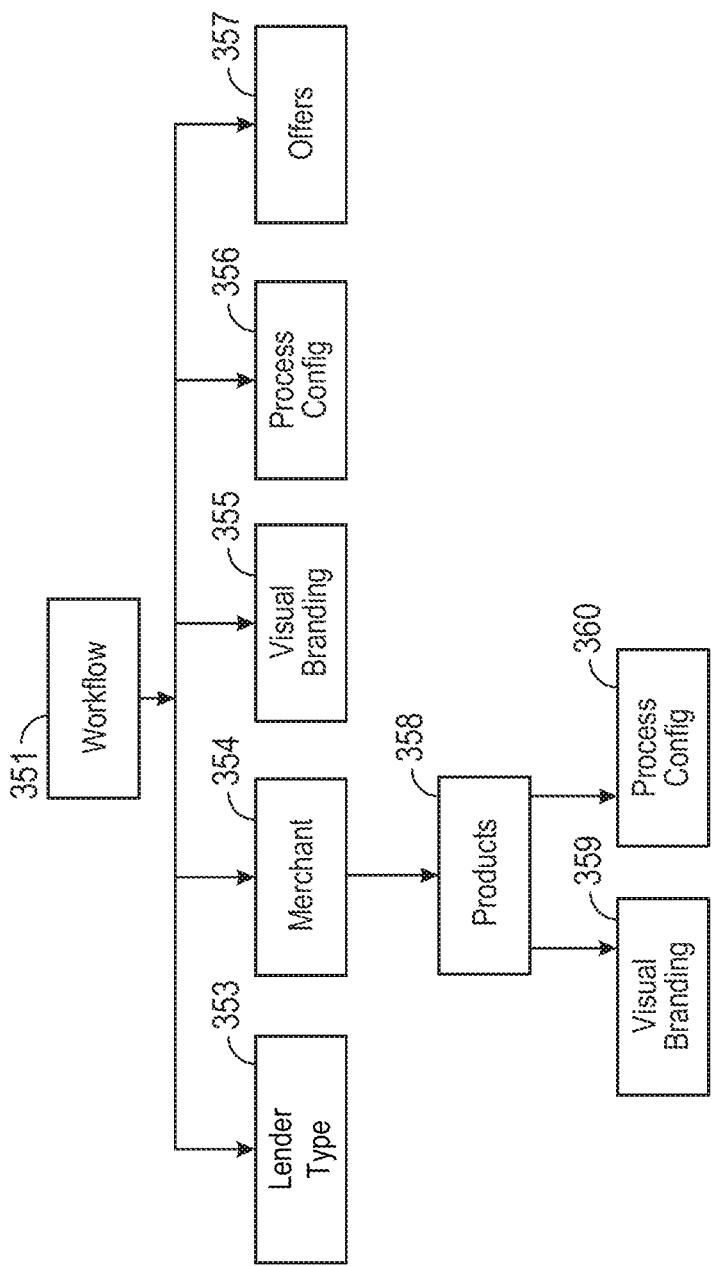
FIG. 3E depicts domain objects for use with a multi-product platform in accordance with some examples described herein.

FIG. 3E illustrates block rule and template data relationships for branding within an MPP server architecture. A branding workflow block 351 is related to a lender type block 353, a merchant block 354, a visual branding block 355, a process configuration block 356, and an offer block 357. The merchant block 354 has additional sub-blocks as illustrated of product block 358, visual branding block 359, and process configuration block 360. The rules and templates stored in such architectural data structures can be used for implementing branding (e.g., visual, grammatical, process flow, etc.) rules associated with a brand. Such branding rules, definitions, and templates can include color, font, language, graphics, or other standardized presentation and operational implementation details to allow merchants, merchant products, lenders, or any aspect of products and product systems managed by an MPP server to be pre-configured for automatic generation and integration with MPP server selected products and presentation of any combination of such products to a purchasing device.

Figure 3F:
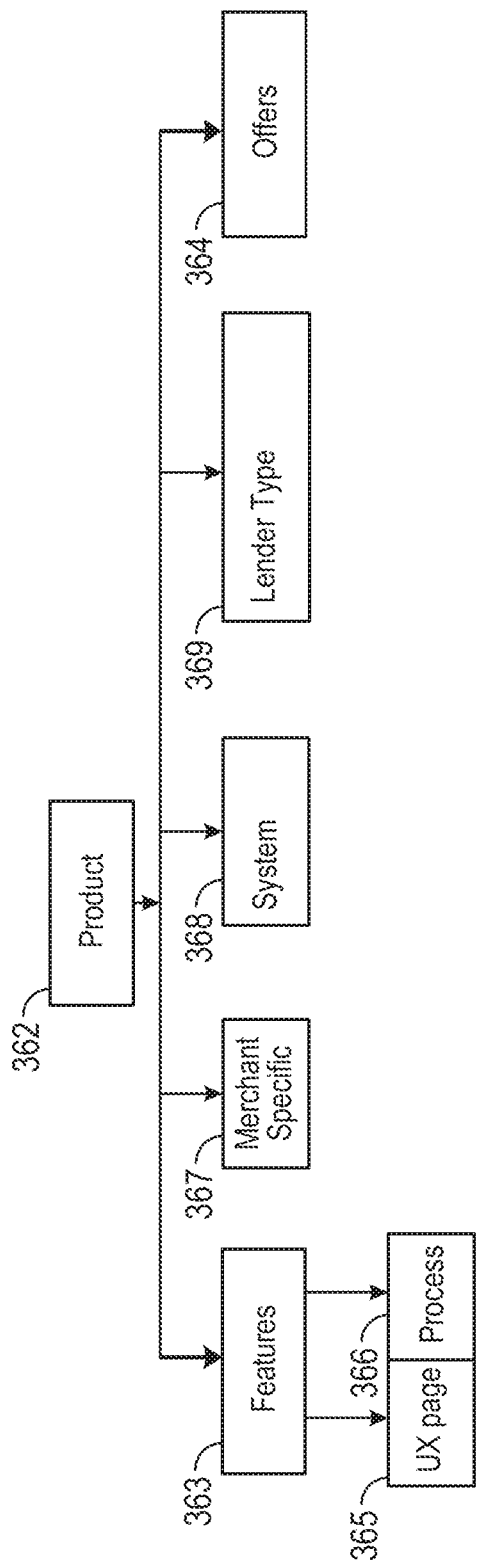
FIG. 3F depicts domain objects for use with a multi-product platform in accordance with some examples described herein.
Figure 3G:
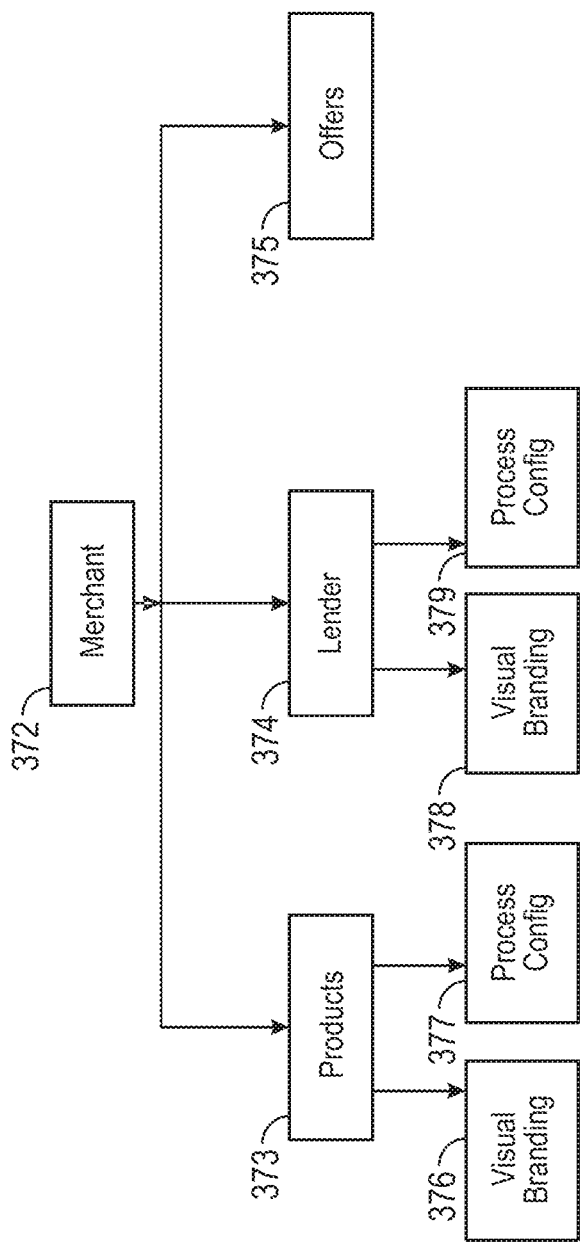
FIG. 3G depicts domain objects for use with a multi-product platform in accordance with some examples described herein.
Figure 3H:
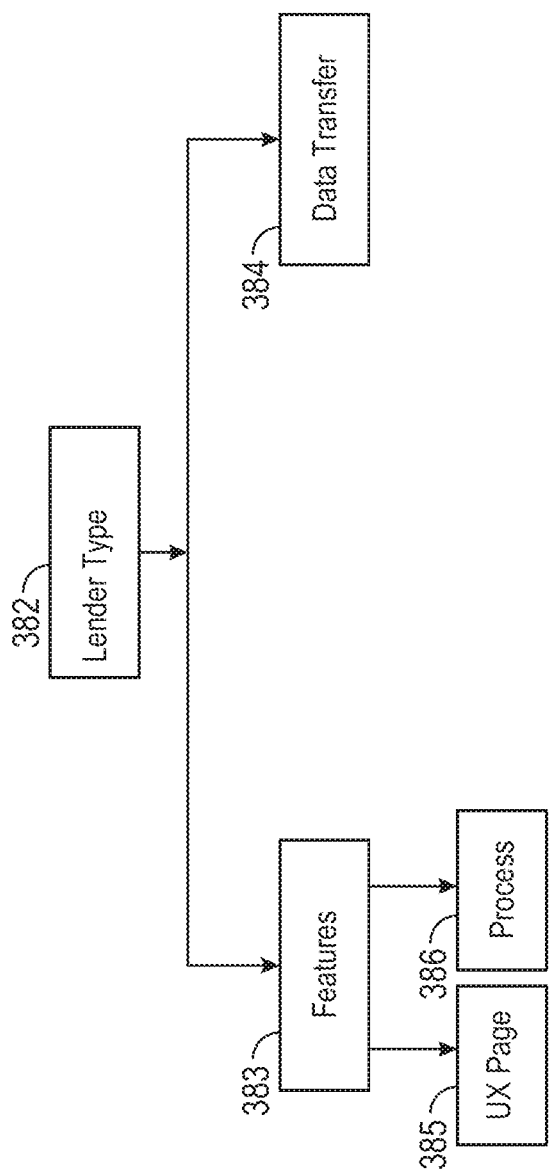
FIG. 3H depicts domain objects for use with a multi-product platform in accordance with some examples described herein.

Similarly, FIG. 3F can include independent blocks for products in product block 362 with independent or generic (e.g., not domain actor specific as in FIGS. 3A-3D), rules and templates for features block 363 and associated user interface page block 365 and process block 366, merchant specific block 367, system block 368 (e.g., customizable to different implementations by the operator of the MPP system), lender type block 369, and offer block 364. FIG. 3G includes independent blocks in a merchant architecture shown as merchant block 372, product block 373 with associated visual branding block 376 and process configuration block 377, lender block 374 (e.g., with independent rules and templates for lender types, such as sub-prime or identified market segment lenders) and associated visual branding block 378, process configuration block 379, and offers block 375. FIG. 3H includes rules and templates for lender types, including lender type block 382, features block 383 and associated interface page block 385, process block 386, and data transfer block 384.

Figure 4:
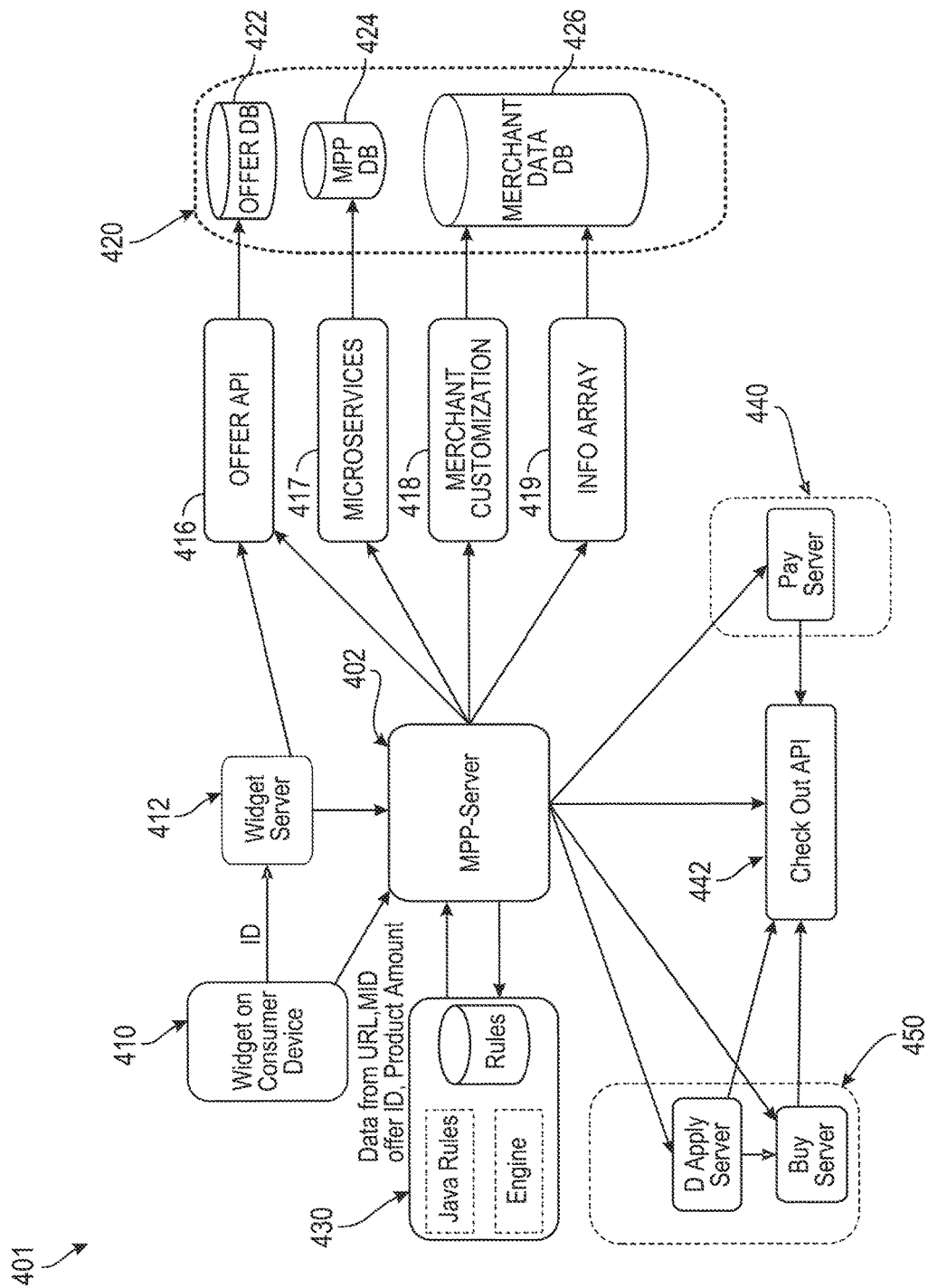
FIG. 4 depicts aspects of a system including a multi-product platform in accordance with some examples.

FIG. 4 illustrates MPP server 402 (e.g., similar to the MPP server 195 or 201) operation in a broader context of a transaction system MPP architecture 401. In some examples, a customer device, POS, or application can use a dynamic widget system to manage the dynamic user interface elements in conjunction with a widget server and the MPP server 402. The dynamic widget system can, in some aspects, include dynamic JavaScript and a webserver that operate to customize both front-end and back-end operations of a POS device or related application. This can include dynamic user interface presentation and selection based on the dynamic customer data described above, or any such data in a transaction. In some aspects, the processes of FIGS. 3A and 3B can be used to dynamically select different user interfaces and operations with associated custom widgets (e.g. JavaScript) for the various processes.

The transaction system MPP architecture 401, in addition to including the MPP server 402, includes a widget server 412, one or more consumer devices (e.g., similar to devices 124 or 190) having widgets 410 operating on the corresponding consumer (e.g. user or merchant customer) devices. Data from various sources (e.g., uniform resource locators, offer identifiers, product amounts, history data, current transaction data, etc.) are received at rule system(s) 430. In some implementations, the rule system(s) 430 are separate from the MPP server 402, and in other implementations, the rules systems 430 are integrated with the MPP server 402.

In some aspects, a Java implementation of rules system 430 and an associated or integrated database can be used for any such aspects of MPP architecture 401. In some aspects, the Java rules of the system 430 can be part of a machine learning system, and can be dynamically updated using transaction feedback data, or prescriptive (e.g., advertising data) for both completed and failed transactions.

The architecture 401 additionally includes a plurality of product systems communicatively coupled or integrated with the MPP server 402. Some or all product systems managed by the MPP server 402 can include offer systems 416, MPP microservices 417, merchant branding integration with product data via system 418, and arrays of product information as part of system 419. When dynamic customer data of the MPP server 402 (e.g., as described above) is analyzed to select a product system and offers associated with a product system, such subsystems of the product system can be used in the MPP server analysis, and in gathering associated data for a response or a subsequent product system analysis, depending on whether a product system is involved in a transaction or actively rejected for a transaction after an MPP server analysis associated with the product system. Additionally, after one or more products are selected and approved by a customer for use in a transaction, additional transaction systems, such as check-out systems and payment settlement systems may use information from a product system handled by the MPP server. The architecture 401 describes a particular set of product systems (e.g., 416, 417, 418, and 419), but in other implementations, any combination of product systems can be used (e.g., including product systems as described above in FIG. 2). In some implementations, a data system 420 may store data from combinations of product systems, such as a database of offer information 422, a general MPP database 424, a database of merchant data 426, or any such combination of data. In some implementations, the data system 420 is independent of the MPP server, to allow for added security or control of the data. In other implementations, the data system 420 can be integrated with the rules server system 430 and the MPP server 402 in any structure.

For example, in some aspects a customer may approve a delayed payment (e.g., where an initial payment associated with a loan product is not due for a certain period following the transaction, such as 6-months, 12-months, etc.) and/or delayed interest (e.g., a zero percent interest for an initial term associated with a loan term) associated with a payment product system managed by the MPP server 402. During checkout and following checkout, the MPP server may handle communications between a payment and settlement system and the delayed payment product system. In the architecture 401 of FIG. 4, the payment system integration includes redirect system 450, which may include connections to additional product systems such as a credit application or a credit use system, which may be further integrated, along with any selected product system (e.g., 416-419) with a checkout API system 442, that can further interact with a payment system 440 to facilitate payment and settlement for a product purchase. Such operations allow a wide variety of product systems to be used by a merchant without resource intensive modifications to the merchant system or the product system to enable interoperability. Instead, the MPP server can "translate" for the various customer, merchant, product, and transaction completion systems. This can include handling tokenization systems, merchant identifier systems, product identifier systems, offer identifier systems, security systems, or any other such systems used in a transaction.

Figure 5:
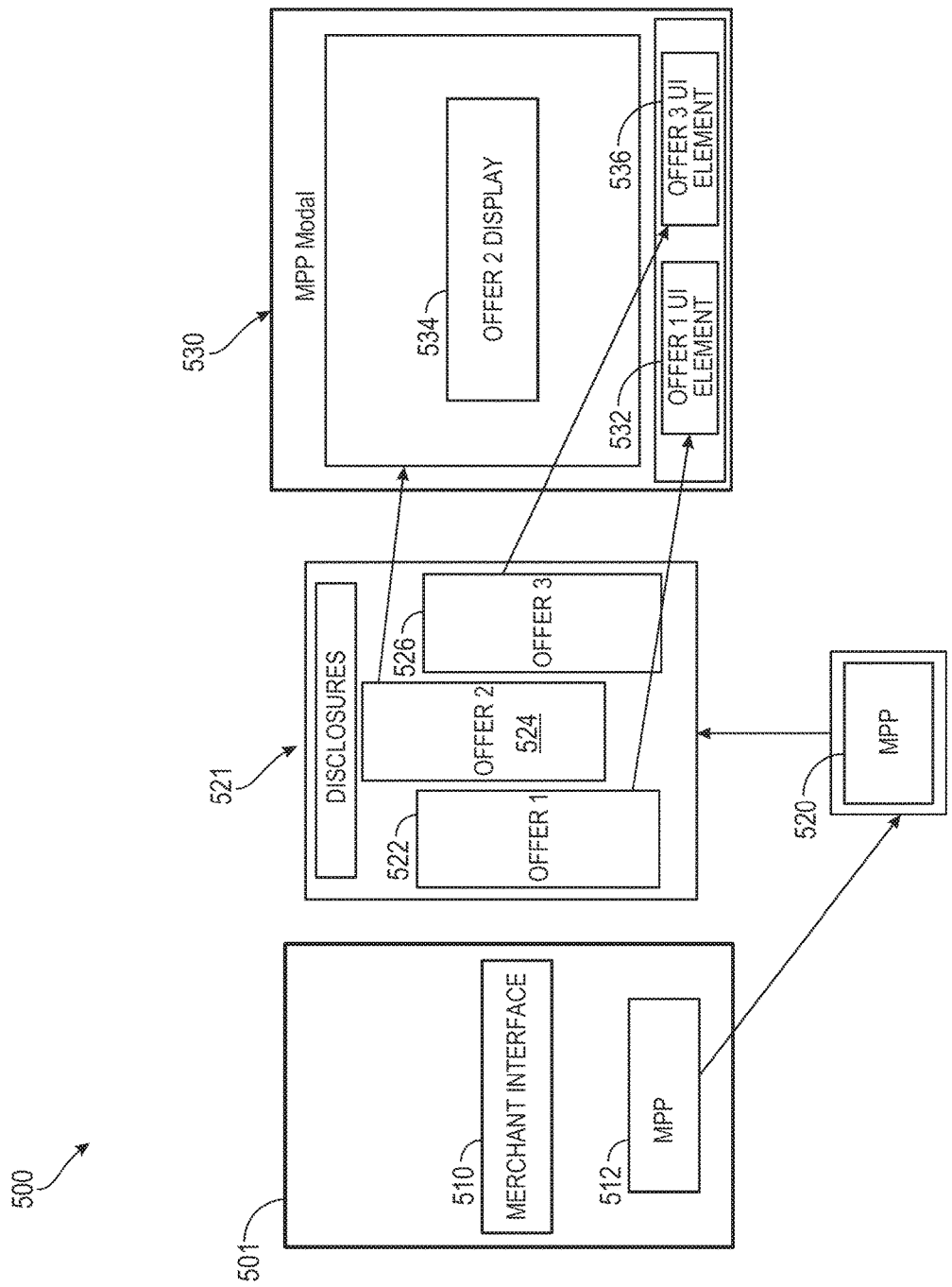
FIG. 5 depicts aspects of a user interface modal enabled by a multi-product platform via a merchant system in accordance with some examples.

FIG. 5 depicts aspects of a user interface flow 500 including modals enabled by a multi-product platform via a merchant system in accordance with some examples. The modal flow 500 of FIG. 5 illustrates the interactions between a merchant website, an MPP server, and user interface modals for disclosures and products presented on a client device. As illustrated a merchant system interface 510 can be structured (e.g., using the merchant setup structures described in FIGS. 3A-3H) with a merchant interface 510 (e.g., either a website, application, or other such merchant interface) to include MPP integration 512. The MPP integration 512 can be an offer integrated with the merchant interface 510, a selection button, a checkout integration, a product or product group association, or any such merchant interface 510 integration. In some examples, when a client device displaying the merchant interface 510 with MPP integration 512 follows a user interface path for a purchase that can be associated with one or more offers available via product systems managed by the MPP server, the merchant website is integrated with a disclosure modal 521 for one or more of the offers. The MPP server 520 uses dynamic customer information associated with the user interface path to create and serve the modal 521 as a seamlessly integrated display with the merchant website interfaces. This integration can be facilitated by the static merchant configuration data along with any other structures to integrate product offer data with merchant website data to match the modal with merchant based interface elements. When the MPP server 520 receives a triggering communication or an indication of a selection associated with MPP server 520, the MPP server can gather information (e.g., price, product details, product groups, merchant information, customer information, etc.) associated with a current transaction (e.g., actual or potential transaction depending) and can use a machine learning system or rules system (e.g., the rules server system 430) to select any direct or indirect (e.g., waterfalled, subprime, etc.) products applicable to the current transaction. As mentioned, this MPP integration communication can occur as part of a checkout process where a customer has initiated a flow that ends with payment, or as part of a potential transaction, where a customer or purchase device has selected an item of interest, and request information about available products associated with the potential purchase as part of a user interface flow to provide information. In either case, the MPP disclosures modal 521 can provide disclosure information for one or more offers 522, 524, 526 selected by the rules and/or machine learning analysis systems of the MPP server 520. When an offer is selected, the MPP server 520 provides additional detailed information as part of an MPP modal 530, including a selected offer detail display 534, and one or more UI elements 532 and 536 associated with other offers or additional details from the MPP server 520.

The flow 500 of FIG. 5 is one possible implementation example, and other examples can be implemented, including systems that accept user privacy agreements, additional user (e.g., customer) information, authorization for text or phone communications or communications outside of the website or application with the MPP integration 512, or any other structure integrated with the merchant interface 510 on a device display 501 by a setup as described above (e.g., including interface or process flow product customization, lender customization, merchant customization, etc.)

The one or more offers are presented on the client device as described above with each having an associated interface element to allow selection of an offer. When an offer is selected, additional data can be presented via an MPP managed modal similar to the disclosure modal described above. When an offer is selected, additional information can be requested via the modal or additional modals, managed by the MPP server and structured to integrate with the merchant website as described above. In some examples, a presented modal can be represented or updated (e.g., repainted or redrawn) with additional information. When a selected offer is either accepted and confirmed for a transaction, or rejected, the MPP server can transition interface control at the client device back to the merchant web site to allow completion of the transaction (e.g., using aspects of the checkout system from FIG. 4).

In some examples, multiple offers can be accepted for a single transaction (e.g., a credit offer and a payment offer), or an initial selected offer can fail (e.g., either to the client selecting a cancelation interface, or due to the product system determining that the client does not meet product offer criteria using information received after the initial acceptance before the offer acceptance is confirmed.) In some such examples, the MPP server can temporarily store certain elements of client data provided during the offer acceptance flow. That data can then be used in a subsequent offer acceptance flow. For example, if a client attempts to accept a credit offer associated with an item purchase at a specific interest rate, and the client is rejected, the MPP server may waterfall the selected product to a sub-prime lender product that may offer similar terms with a higher interest rate. The MPP waterfall system that selects a subsequent product system to waterfall the similar acceptance to can, if approved by client input or settings, store dynamic client data to automatically provide similar data requested by the first product system to the second product system. Such MPP temporary data storage can improve system performance by reducing the number of user inputs needed to finalize a second product offer acceptance after an initial offer is rejected. Similarly, for a credit application and subsequent use flow, the MPP server can temporarily store data associated with a credit application (e.g., a new credit number or account token) following credit approval for automatic use during a purchase. In some examples, the dynamic client data (e.g., credit application data and a resulting credit account identifier) can be stored temporarily for use in subsequent transaction if approved by client inputs or settings. Such systems allow for seamless product use in a standardized interface context selectable by merchant settings to integrate products available through the MPP server with the merchant's process schema and branding schema.

Additionally, in other examples, microservices for other product and merchant websites can be integrated via MPP microservices.

Figure 6:
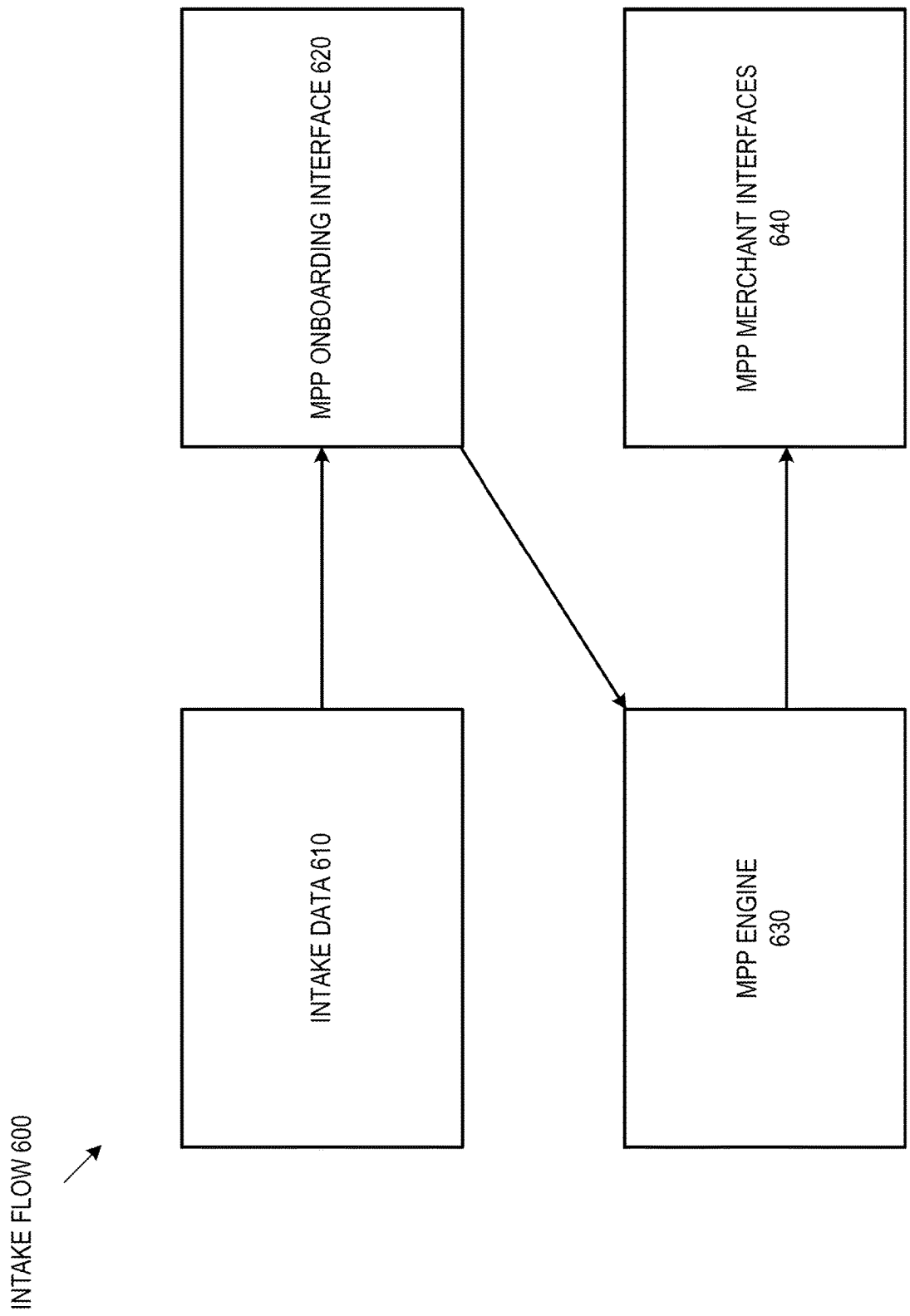
FIG. 6 depicts aspects of a user interface enabled by a multi-product platform via a merchant system in accordance with some examples.

FIG. 6 depicts aspects of a system setup and associated user interface configuration enabled by a multi-product platform via a merchant system (e.g., a UniFi/unified merchant management and administration system) in accordance with some examples. FIG. 6 particularly illustrates an intake flow 600 for static data that can be used by an MPP server to accept settings used to integrate product data with a merchant website. Such intake information may be structured within the block hierarchy described in FIGS. 3A-3H. For example, a merchant providing data for merchant products, secondary lender and acceptable offer criteria and limitations imposed by a merchant integrating MPP functionality with merchant sales systems. The intake flow includes an initial intake data 610 using an MPP onboarding interface 620. The MPP onboarding interface provides the intake data 610 to an MPP engine 630, and the MPP engine uses the intake data 610 received via the MPP onboarding interface 620 to dynamically generate MPP merchant interfaces 640.

In some examples, the merchant provides intake data 610 as a document of static configuration data to an MPP onboarding webpage. On upload, the MPP server parses the merchant data to set configurations in the MPP engine. The MPP then standardizes product data from product systems using the static configuration data received from the server. When the MPP receives a communication associated with a transaction and the merchant system, interface indications from the static configuration data can set modal interface details such as colors, logos, headers, footers, modal interface flows, interface software for interaction elements of the modal, and other such interface details. This information is then used to generate a seamless interface between a website of the merchant that provides the intake data, and the product data managed from different product systems by the MPP server. As described above, such a system can additionally be used to make real-time system updates while the merchant system and MPP system are working together to facilitate large numbers (e.g., hundreds or many thousands of transactions per second) of transactions. Such systems improve operations of devices in a communication network by reducing operator time for initial setup, reducing operator time for integration of MPP functionality with merchant systems via automated processes, and allowing increased uptime with dynamic real-time updates to systems rather than using offline downtime to perform updates to interfaces and processes as described above.

Figure 7A:
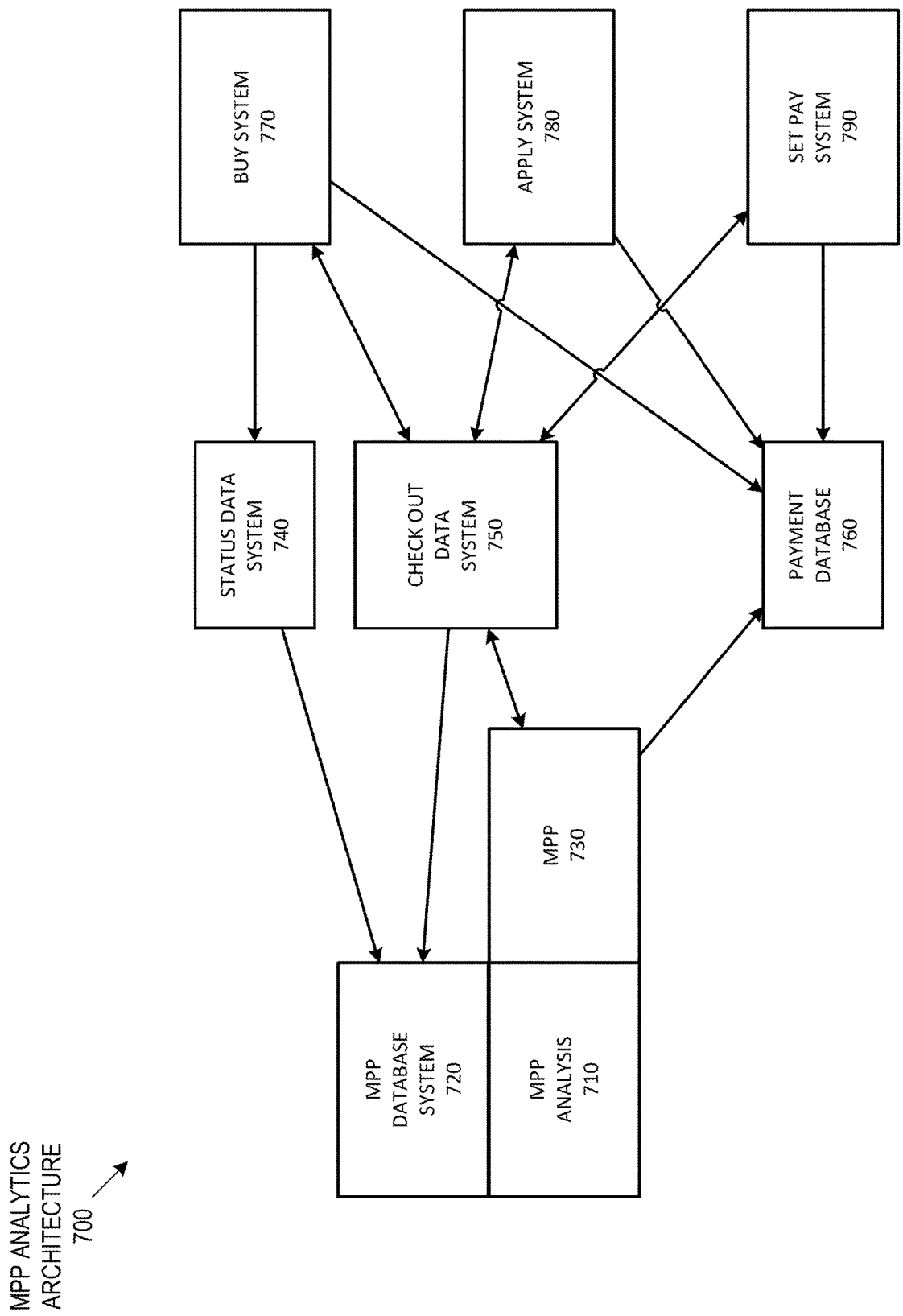
FIG. 7A depicts aspects of a system and system operations for payment operations with a multi-product platform system in accordance with some examples.
Figure 7B:
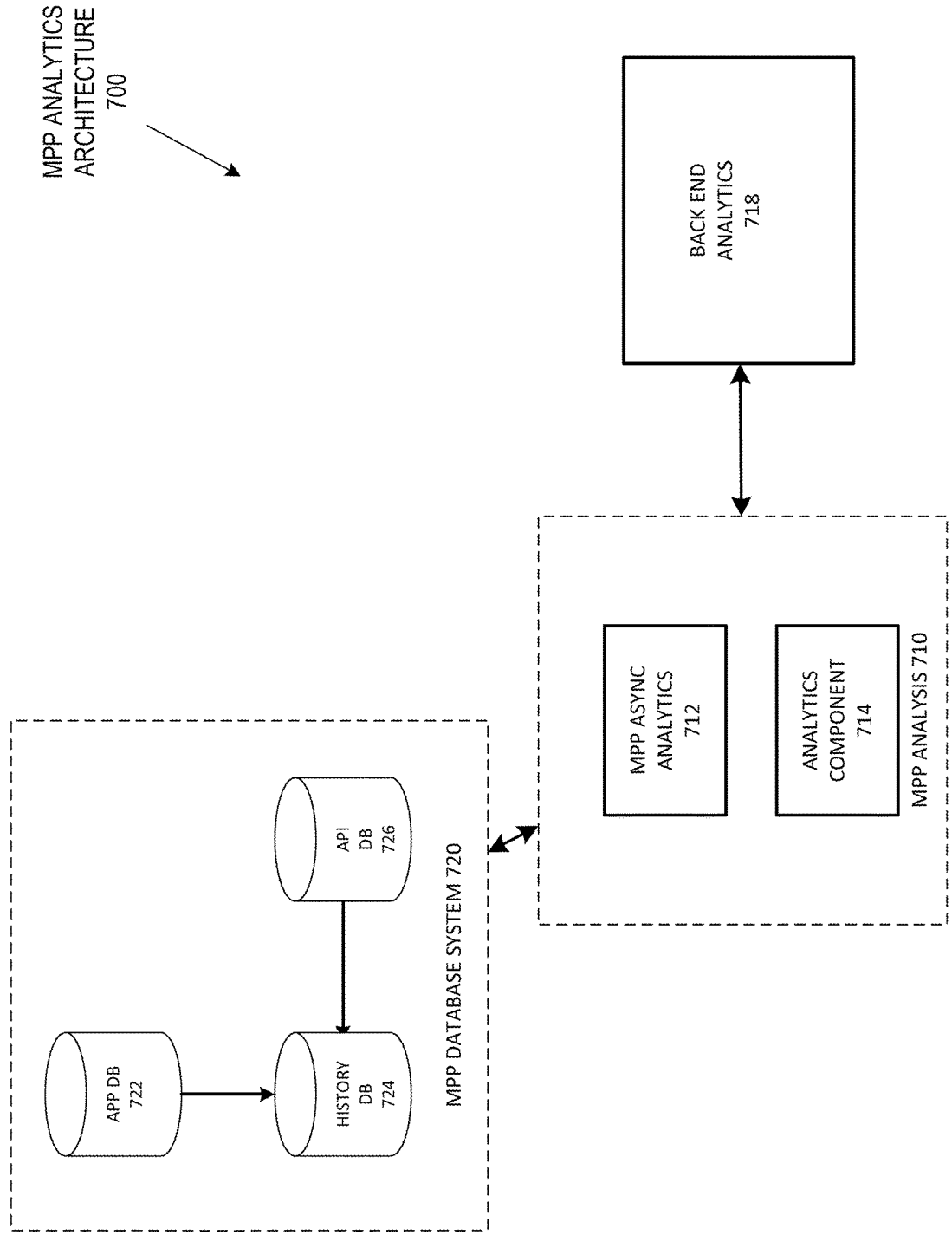
FIG. 7B depicts aspects of a system and system operations for payment operations with a multi-product platform system in accordance with some examples.
Figure 8:
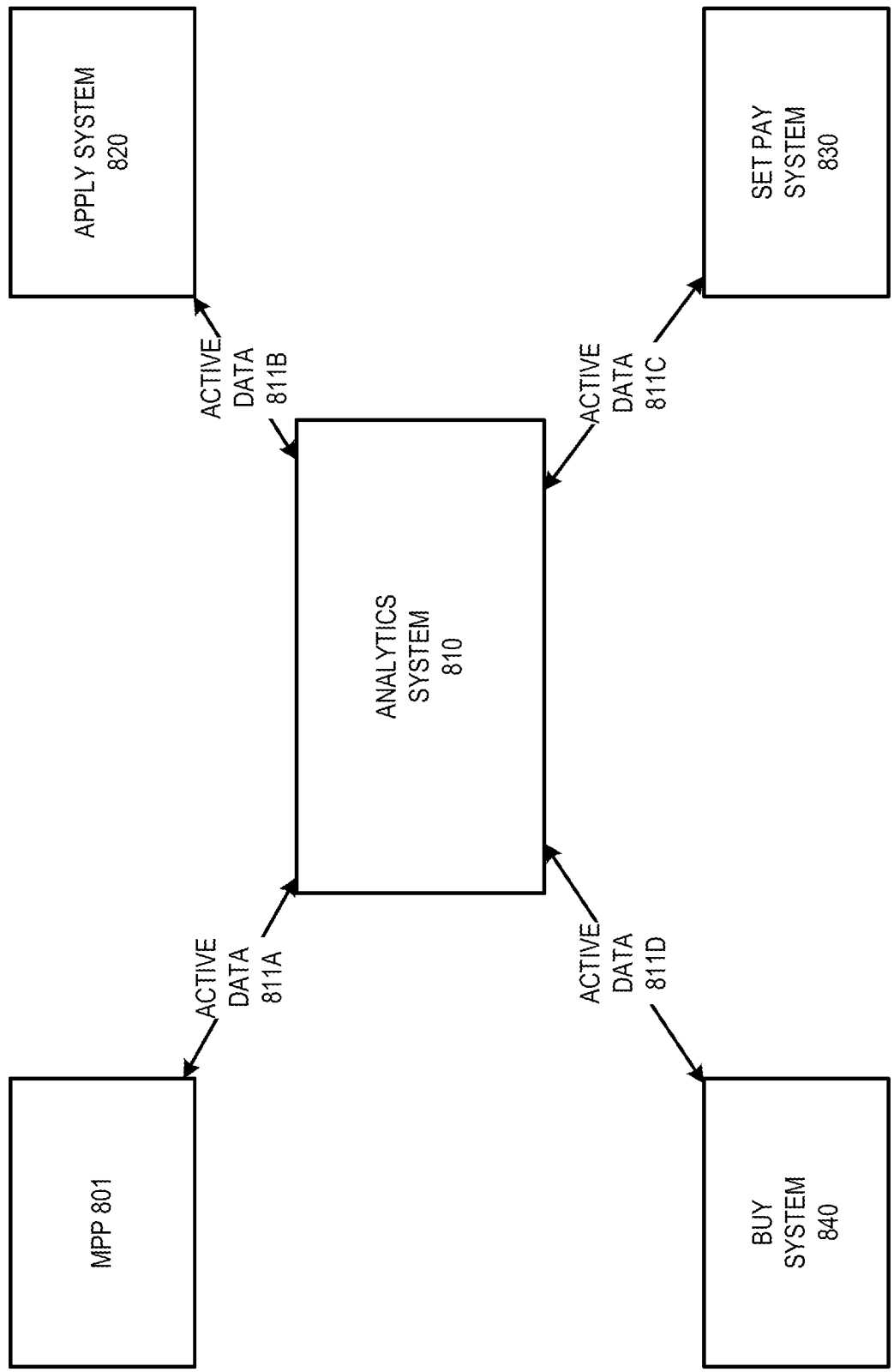
FIG. 8 shows illustrative aspects of a system for network data management that can be used with an application integrated with a multi-product platform system in accordance with at least one example.

FIGS. 7A, 7B, and 8 depict aspects of multi-product platform analytics, artificial intelligence, and machine learning in an MPP analytics architecture 700 for use with multi-product platforms in accordance with some examples. FIGS. 7A and 7B show MPP analytics, where the MPP servers can be associated with multiple databases including application databases, application programing interface databases, and history databases, for feedback and automated adjustments to system interfaces, processes, and/or selection of product systems.

FIG. 7A illustrates an MPP server 730 coupled to supplemental MPP analysis systems 710, an MPP database system 720, and multiple product data systems, shown as a status data system 740, a checkout data system 750, and an integrated payment system database 760. The product data systems are organized and communicatively coupled to different combinations of product systems, and can be structured to manage different types of user data with different security or detail levels based on user privacy concerns, regulatory structures, and/or user selections. As illustrated, a buy (e.g., credit purchase account) system 770 is coupled to a status data system, which can store data associated with current user account status information. Apply system 780 and set pay system 790 are two additional illustrated product systems. A checkout data system 750 and a payment database 760 are both coupled to all three illustrated product systems, and can store different types of data, as well as provide different types of data access to MPP analysis systems 710. For example, the checkout data systems can store data relevant to real-time product selection as part of MPP facilitation of a current transaction. The MPP database system can access such information quickly (e.g., in sub-second time frame requirements set for payment facilitation) to identify and server product options to a purchasing device as part of the transaction. Such real-time data uses involve systems where speed is a greater concern, and the system may be designed with higher cost, energy usage, network bandwidth, etc. to support such operations. Payment database 760, by contrast, may store a record of transaction data, along with additional results data from a feedback system (not shown), which includes information about fraud events, returns, negative customer feedback, positive customer feedback, repayment issues, or other such transaction data that can be stored as history data. Such information can then be accessed asynchronously by the MPP server 730 for use by MPP analysis system 710. Such access and analysis may occur periodically, or when system usage is below peak, and computing, memory, bandwidth, and other such resources are available for use in machine learning analysis operations rather than peak transaction facilitation. The MPP analysis system may use data from the payment database 760, as well as other selected information from any other database, in operations to identify improvements to product selection algorithms (e.g., using neural networks to match real-time transaction details with positive outcomes identified from history data). In some systems, the MPP analysis can gather such information for the training of machine learning algorithms, and can then delete such data after training is completed. In other implementations, such data is continuously gathered in real-time to be stored in a local MPP database system 720, which can allow real-time analysis by the MPP analysis system 710. Such operations can identify issues with product decisions in real-time, and can dynamically update product selection algorithms or neural networks dynamically in real time as an MPP continues to facilitate real-time merchant transactions (e.g., with updates occurring in the context of a block data hierarchy of interfaces and processes as described above with respect to FIGS. 3A-3H.)

FIG. 7B illustrates an example implementation of MPP analytics architecture 700 with additional detail on the MPP database system 720 and MPP analysis system 710 of FIG. 7A. As illustrated, the MPP database system 720, in some implementations, can include an application database 722, a history database 724, and an application programming interface (API) database 726. The application database 722 can store information from web-interfaces and user device applications. The API database can store a record of communications and commands used within a system, as well as a record of changes made to system configurations. The history database 724 can include filtered versions of such data, along with other history and feedback data received from any such system. In some implementations, the history database 724 includes anonymized versions of data from other databases with certain types of metadata or identifying information removed to preserve customer, merchant, and/or product system privacy, while maintaining information that can be used in updating product selection algorithms and various interface and process designs. The MPP analysis system 710 can include both a real-time analytics component 714, and an asynchronous analytics component 712. The real time analytics can be used to identify critical issues with priority sufficient to perform real-time system updates as the MPP system is facilitating transactions and selecting product systems and offers to match to real-time transactions. The MPP asynchronous analytics component 712 may perform other analysis which may be lower priority or use resources that make real-time analysis and updates impractical. A back-end analytics system 718 may be used for large data analysis (e.g., full database training or retraining of machine learning algorithms) that can occur in specialized training systems outside of the standard MPP systems that support real-time transactions.

FIG. 8 illustrates data gathering from varieties of data sources in a system using an analytics system 810 with an MPP server 801 and other product systems. The databases attached to such systems can gather information from a variety of sources, including both the MPP server 801, product systems, and checkout systems. The illustrates systems include an apply system 820, a buy system 840, and a set pay system 830, as described above. In other implementations, any product system can feed active data into the analytics system 810. Some systems may prioritize active data to direct product systems that impact checkout or customer facing applications, while second tier (e.g., waterfall or systems not directly impacting a time-limited checkout system) may be limited to asynchronous or non-active data that is managed by a database system not directly integrated with the analytics system 810. In some examples, the MPP server 801 can include an analytics component or can be associated with a separate analytics server for asynchronous data analysis as described above. Active data 811 (e.g., data 811A associated with the MPP server 801, active data 811B associated with the apply system 820, active data 811C associated with the set pay system 830, and active data 811D associated with the buy system 840) is communicated to the analytics system 810 as illustrated In some examples, separate analytics systems can be used for asynchronous data analysis and for real-time analysis. In some aspects, real-time analysis can be used for security (e.g., machine learning patterns for loss prevention) and updates to offers within a single transaction with a merchant, while asynchronous analysis can be used to update offer, product, and interface configurations for later transactions. In some aspects, analytics data is used for learning customer responses to offers, and improving product performance by reducing interface elements needed to have a customer arrive at preferred products, and to improve sales conversions associated with merchant transactions. In some aspects, MPP data can be used to for interaction analysis to determine how customers respond positively to certain interface elements, and truncation analysis, to determine how customers exit the system. In some examples, machine learning is used to identify both patterns that result in a completed transaction, as well as patterns that result in an incomplete transaction. Machine learning can use feedback data to adjust dynamic aspects of a system to increase the incidents of patterns resulting in a completed transaction, and to reduce incidents of patterns resulting in an incomplete transaction.

In some examples, an MPP server can use dynamic customer data with communication patterns, machine learning and artificial intelligence security threat analysis, or other such verification operations as part of analytics. In some implementations, validation or authentication operations associated with acceptance of offers can be dynamically performed in real-time with associated synchronous (e.g., real-time) analysis to improve the security of the system while maintaining quality of service (e.g., overall system responsiveness to client device 124 communications). In some examples, transactions and analytics can be performed in real-time for many customers simultaneously (e.g., thousands of checkout communications per minute, thousands of checkout communications per second, or more depending on system configurations). The real-time analytics can be performed in addition to asynchronous analysis using history data and any other such available data to improve rules, machine learning algorithms, and other aspects of an MPP server operation.

Figure 9:
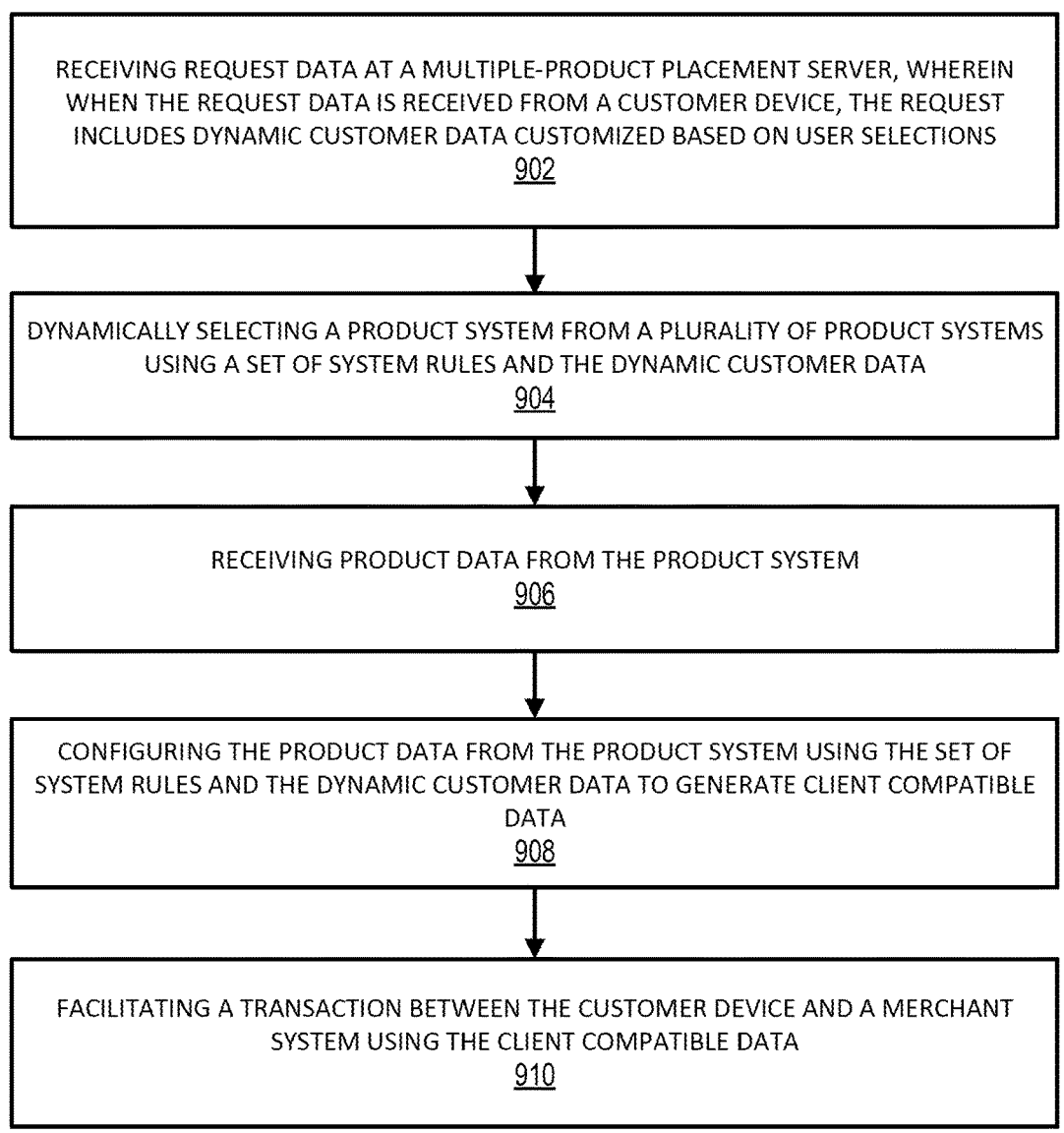
FIG. 9 is a flow diagram illustrating a method in accordance with some examples.

FIG. 9 is a flow diagram illustrating an example method 900. Method 900 can be performed by one or more processors of a server computer or server system as part of an MPP system (e.g., MPP server 195). Method 900 can, in some examples, be implemented as computer readable instructions that, when executed by processing circuitry of a device, cause the device to perform steps of method 900.

Operation 902 of method 900 involves receiving request data at a multiple-product placement server, wherein when the request data is received from a customer device, the request includes dynamic customer data customized based on user selections. Such dynamic customer data can include product information, customer preference information, customer purchase history information, credit or financial information, merchant interaction data, current purchase or interest information, or any other such information.

Operation 904 of method 900 dynamically selecting a product system from a plurality of product systems using a set of system rules and the dynamic customer data. As described above, the system rules can be set using data structures organized using merchant, user, lender, offer, or other such information that can be hierarchically organized based on inputs and system block level details.

Operation 906 of method 900 receiving product data from the product system. Such product data can include products associated with checkout operations of a merchant product purchase initiated by the customer associated with the customer device.

Operation 908 of method 900 configuring the product data from the product system using the set of system rules and the dynamic customer data to generate customer compatible data.

Operation 910 of method 900 facilitating a transaction between the customer device and a merchant system using the customer compatible data.

The dynamic customer data and system rules described above can, in various implementations, be modified or used by machine learning algorithms, neural networks, or various feedback mechanisms trained with customer data from a large number of customers to modify the product selections of an MPP server that are made available to a customer. Similarly, the data above (e.g., the generated customer compatible data) can be stored, either directly or in a format with details removed to anonymize information, as history data to be used in updates to any feedback mechanisms used in training or updating system operations.

In some implementations, the method 900 can further include receiving transaction data, wherein when the transaction data is received from the customer device, the transaction data comprises updated dynamic customer data; dynamically selecting a second product system different than the product system using the set of system rules and the updated dynamic customer data; receiving second product data from the second product system, wherein the second product data is associated with a data structure incompatible with the product system and the customer device; configuring the second product data using the set of system rules and the updated dynamic customer data to generate second customer compatible data; and facilitating the transaction between the customer device and the merchant system using the customer compatible data.

In some implementations, the method 900 can operate where facilitating the transaction using the customer compatible data comprises presenting a credit application user interface and a subsequent purchase user interface flow without requesting additional identifying user data for the subsequent purchase user interface flow.

In some implementations, the method 900 can operate where the product system is an installment payment system. Similarly, In some implementations, the method 900 can operate where the product system is a delayed payment system, or any other such product or payment system as described herein.

In some implementations, the method 900 can further include determining that the product data includes an indication that a first resource request was denied by the product system, the indication including a user identifier, and in response to the determining that the first resource request was denied, generating a resource request waterfall that includes a sequence of two or more indirect product systems, wherein the resource request waterfall is configured to facilitate resource request transmissions to the sequence of two or more indirect product systems and presentation of an offer from a first indirect product system of the sequence of two or more indirect product systems to approve resources in response to the first resource request.

In some implementations, the method 900 can further include receiving transaction feedback data associated with the product system and updating a machine learning algorithm using the transaction feedback data, wherein dynamic selection of the product system from the plurality of product systems using a set of system rules and the dynamic customer data is performed using the machine learning algorithm.

Figure 10:
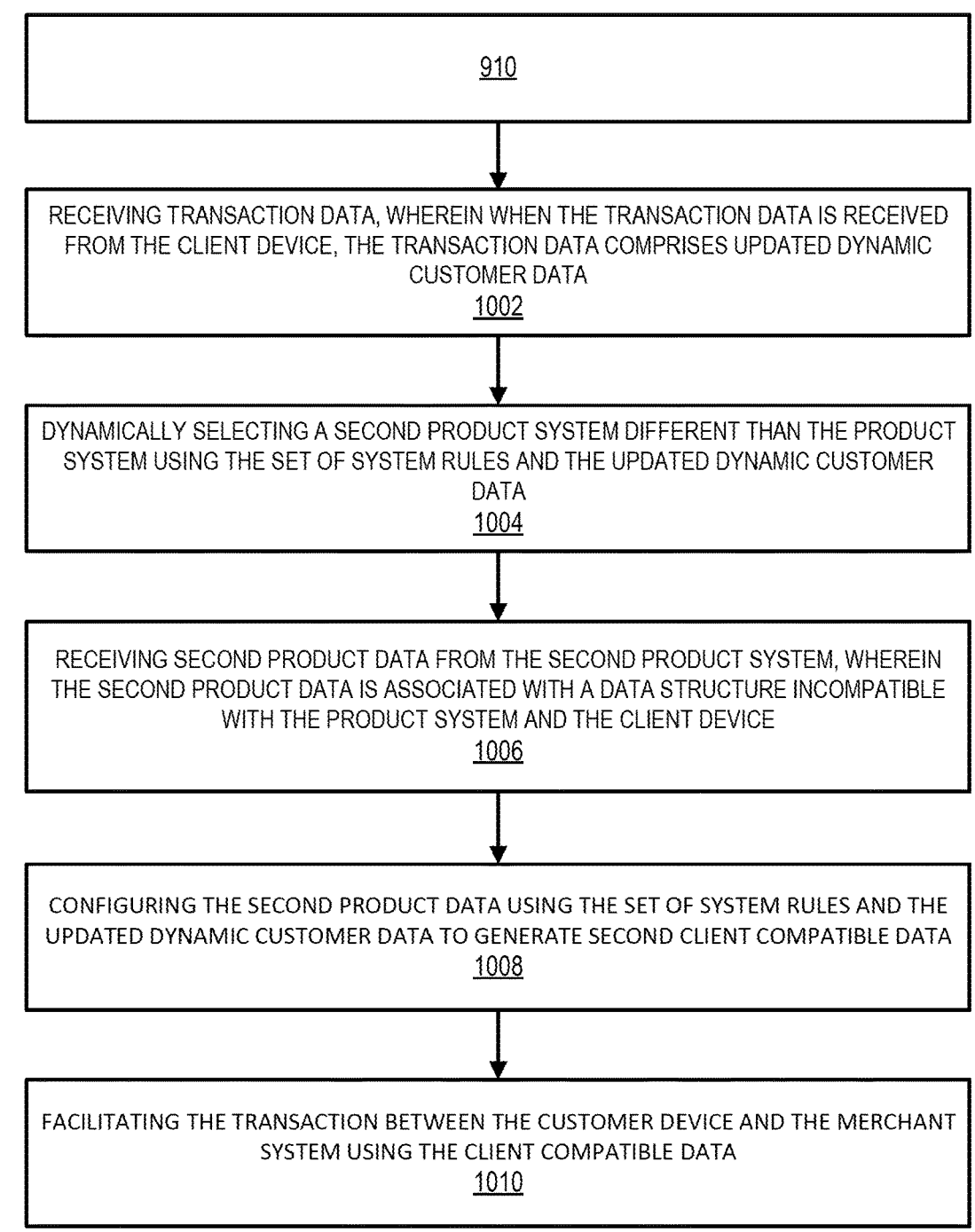
FIG. 10 is a flow diagram illustrating a method in accordance with some examples.

FIG. 10 is a flow diagram illustrating an example method 1000. Just as with method 900, method 1000 can be performed by one or more processors of a server computer or server system as part of an MPP system (e.g., MPP server 195). Method 1000 can, in some examples, be implemented as computer readable instructions that, when executed by processing circuitry of a device, cause the device to perform steps of method 1000. Method 1000 is, in some examples, a continuation of method 900 following operation 910.

Operation 1002 of method 1000 follows operation 910 with receiving transaction data, wherein when the transaction data is received from the client device, the transaction data comprises updated dynamic customer data.

Operation 1004 of method 1000 involves dynamically selecting a second product system different than the product system using the set of system rules and the updated dynamic customer data.

Operation 1006 of method 1000 involves receiving second product data from the second product system, wherein the second product data is associated with a data structure incompatible with the product system and the customer device.

Operation 1008 of method 1000 involves configuring the second product data using the set of system rules and the updated dynamic customer data to generate second client compatible data.

Operation 1010 of method 1000 involves facilitating the transaction between the customer device and the merchant system using the customer compatible data.

Any such implementations described herein can be used with product systems that support installment payments, delayed payments, credit accounts, token or point based accounts (e.g., other than a standard currency associated with a location of the merchant) or other such product systems supporting system functionality for increased security, privacy, customer payment flexibility, or other such improvements to a payment system.

In some implementations, a system may determine that the product data includes an indication that a first resource request was denied by the product system, the indication including a user identifier. In response to the determining that the first resource request was denied, the system can generate a resource request waterfall that includes a sequence of two or more indirect product systems, wherein the resource request waterfall is configured to facilitate resource request transmissions to the sequence of two or more indirect product systems and presentation of an offer from a first indirect product system of the sequence of two or more indirect product systems to approve resources in response to the first resource request. In other implementations, any flow for selection of a secondary or additional MPP product system can be used.

Figure 11:
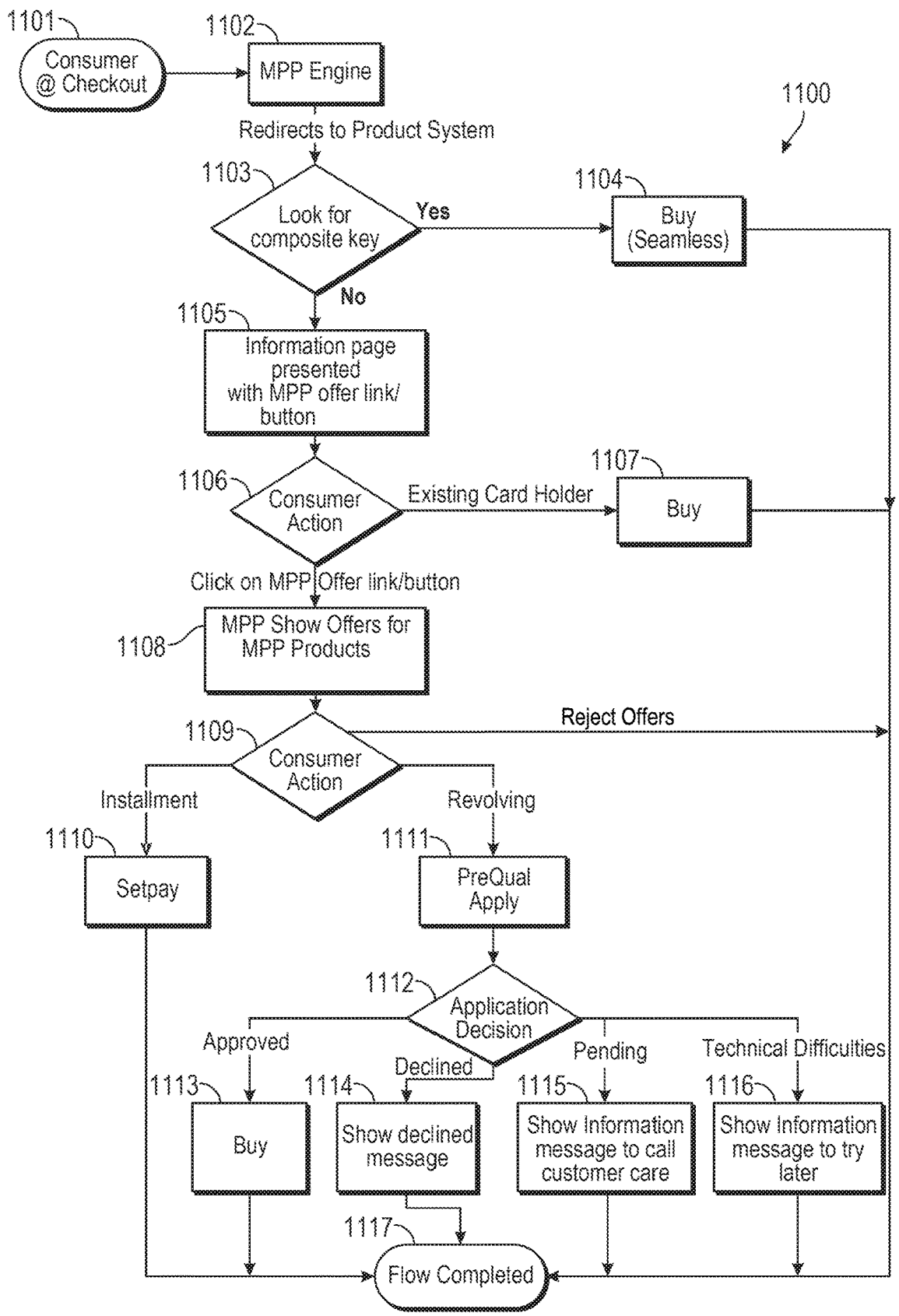
FIG. 11 is a flow diagram illustrating a method in accordance with some examples.

FIG. 11 illustrates a process 1100 that can be used by an MPP server 195 as part of a transaction. As described above, customer state information updated from a transaction flow at a merchant website can be used to initiate operations, such as those of process 1100, at a website. In process 1100, a checkout state is used by MPP server 195 to initiate a set of buy operations. Composite key information (e.g., from dynamic customer data) can be used to determine if payment information is present to allow the MPP managed products to transition to a seamless buy operation. If such a key is not present, data can be presented in a modal via the MPP server to allow a consumer action to initiate a buy (e.g., purchase and payment) set of operations, or to select display of product offers available via the MPP server. Depending on various customer selections via the modal interface at the customer device, various products can be used in a transaction as illustrated.

As illustrated, the process 1100 includes a checkout block 1101, where information associated with a merchant purchase is generated by purchasing devices and/or merchant systems, and provided to an MPP server. In block 1102, an MPP engine of an MPP server receives the information, and generates a redirect for the purchasing device to a product system. In the illustrated implementation, in block 1103, a check is performed for a composite key. When available, the composite key allows a seamless action for facilitating purchase in block 1104 (e.g., using security key information to validate and proceed associated with the present composite key). The composite key can be associated with a customer preference and MPP options to automatically accept MPP product recommendations. If a composite key is not present in block 1103, then in block 1105, an information page (e.g., as part of a modal flow such as the flow illustrated in FIG. 5). In such a modal flow, a customer may proceed with a purchase without interacting with an MPP integration element in decision block 1106. Ignoring or rejecting the MPP option results in the direct purchase or proceeding without non-MPP related checkout flows in block 1107.

If a purchasing device provide a communication indicating an interaction with an MPP integrated element (e.g., an offer acceptance, request for more information, etc.) then in block 1108, the MPP server provides information for selected product systems. In the background, the MPP server can perform a dynamic analysis of the information associated with the current checkout (e.g., information provided starting in block 1101), and can use this information with machine learning algorithms, merchant preferences, or static data and decision rules to select the products to present in block 1108. In block 1108 operations, information for the associated product systems is presented with selection options. In decision block 1109, the consumer can either select from one or more MPP product offers, or can reject all offers. If an MPP product is selected, then the MPP server facilitates any actions used for the selected offer (e.g., by gathering information, acceptance verification, etc.). As illustrated, if a set pay product offer is accepted in block 1110, then associated product (e.g., set payment elements) are integrated with checkout flows after the MPP flow is completed in block 1117. If a revolving product is selected, then multiple operations may be performed to confirm availability. The MPP selection of an offer in block 1108 may, for example, identify a possible product, and can then facilitate the product system interacting with a purchasing device to confirm availability of the product for the current purchase. In illustrated blocks 1111, 1112, 1114, 1114, 1115, and 1116, various product system operations are illustrated. In block 1111, the product system performs an additional prequalification check, and then performs a decision operation in block 1112. The decision operation can result in an approval in block 1113, a rejection in block 1114, a routing to a communication system outside MPP server interaction in block 1115, or a technical support interaction in block 1116.

The flows of FIG. 11 illustrate example flows for certain MPP integrated product systems. In other implementations, additional MPP integrated system operations can be added to the examples of FIG. 11, or different combinations of systems can be used. For example, as described herein, if an initially selected product system issues a rejection as illustrated in block 1114, then the MPP server may loop back to offer a waterfalled product (e.g., with a loop to block 1108 rather than to completion block 1117). Such a waterfall offer can occur multiple times via interactions with the MPP server facilitating different product offers based on customer interactions with different product systems for a single current transaction.

Figure 12:
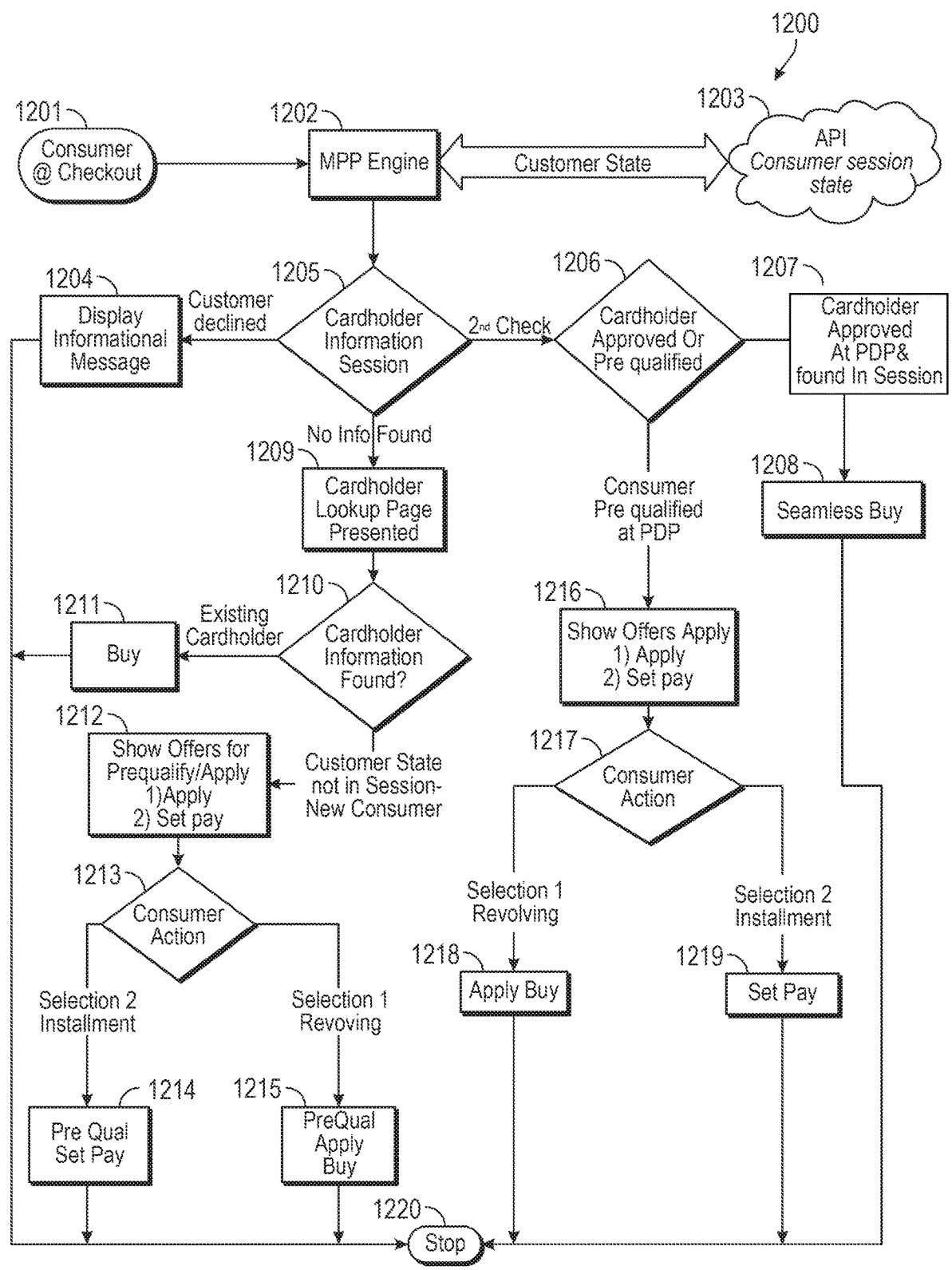
FIG. 12 is a flow diagram illustrating a method in accordance with some examples.

FIG. 12 then illustrates another process 1200 for use with an MPP server 195. Process 1200 involves a consumer checkout action at a merchant system being communicated to an MPP engine of an MPP server (e.g., the MPP server 195, 201, etc.).

Similar to the flow of FIG. 11, FIG. 12 has an initial consumer checkout block 1201 that provides information to an MPP engine 1202. The MPP engine 1202 gathers customer state information from an API consumer session state 1203, and as described above, can use the customer state information as an input to static or dynamic decision making systems to identify and communicate product system offers to a customer's purchasing device. In block 1205, the MPP engine 1202 facilitates a cardholder information session with an interface to provide information to a customer. In the process 1200, the information session block 1205 has a decline options resulting in block 1204 where information is presented to the customer, and the customer's device proceeds without MPP interactions, no information found block 1209 leading to additional customer interactions in block 1210, or a $2^{nd}$ tier check block 1206.

The no information found block 1209 allows the customer to provide identifying information that can be used either to facilitate a purchase without MPP interaction in block 1211, or to select MPP facilitated products with associated consumer actions in blocks 1212, 1213, 1214, and 1215. In any such blocks, a customer may decline MPP interactions, returning to block 1211. Similarly, block 1206 allows either facilitation of a purchase via an MPP system in blocks 1207 and 1208 leading to a flow stop block 1220, or presentation and interaction with one or more product systems in blocks 1216, 1217, 1218, and 1219. The process 1200 illustrates a flow with a single installment product system, where blocks 1214 and 1215 or 1218 and 1219 reflect customer election of offer options provided by an installment product system, depending on the MPP servers identification of customer state information (e.g., prior information associated with a purchasing customer or purchasing customer device). As described herein, it will be apparent that multiple product systems and many different types of product systems can be integrated in similar process flows.

During the customer transaction flow at the merchant website, a consumer session state is tracked and used to update product data available to a customer at the merchant website. The current state when the checkout is received is used to determine if cardholder information is present in the MPP session for the transaction. If the transaction is declined a message is presented and the MPP server updates the transaction state.

If cardholder information is present, a lookup page is presented. If a lookup process finds information, a buy process can be initiated. If customer information is not found, an apply or set pay operation can be initiated within a client device modal. These operations can be managed by the MPP server to facilitate applications for credit and payment in accordance with any example described herein.

If data is found, an automated purchase flow can be initiated for approval by the customer. If prequalification data is found in the session, apply or by product offers can be presented based on user selections, and used to complete the transaction. At any time, a user can cancel the MPP modal flow and return to a separate system if offered by a merchant.

Figure 13:
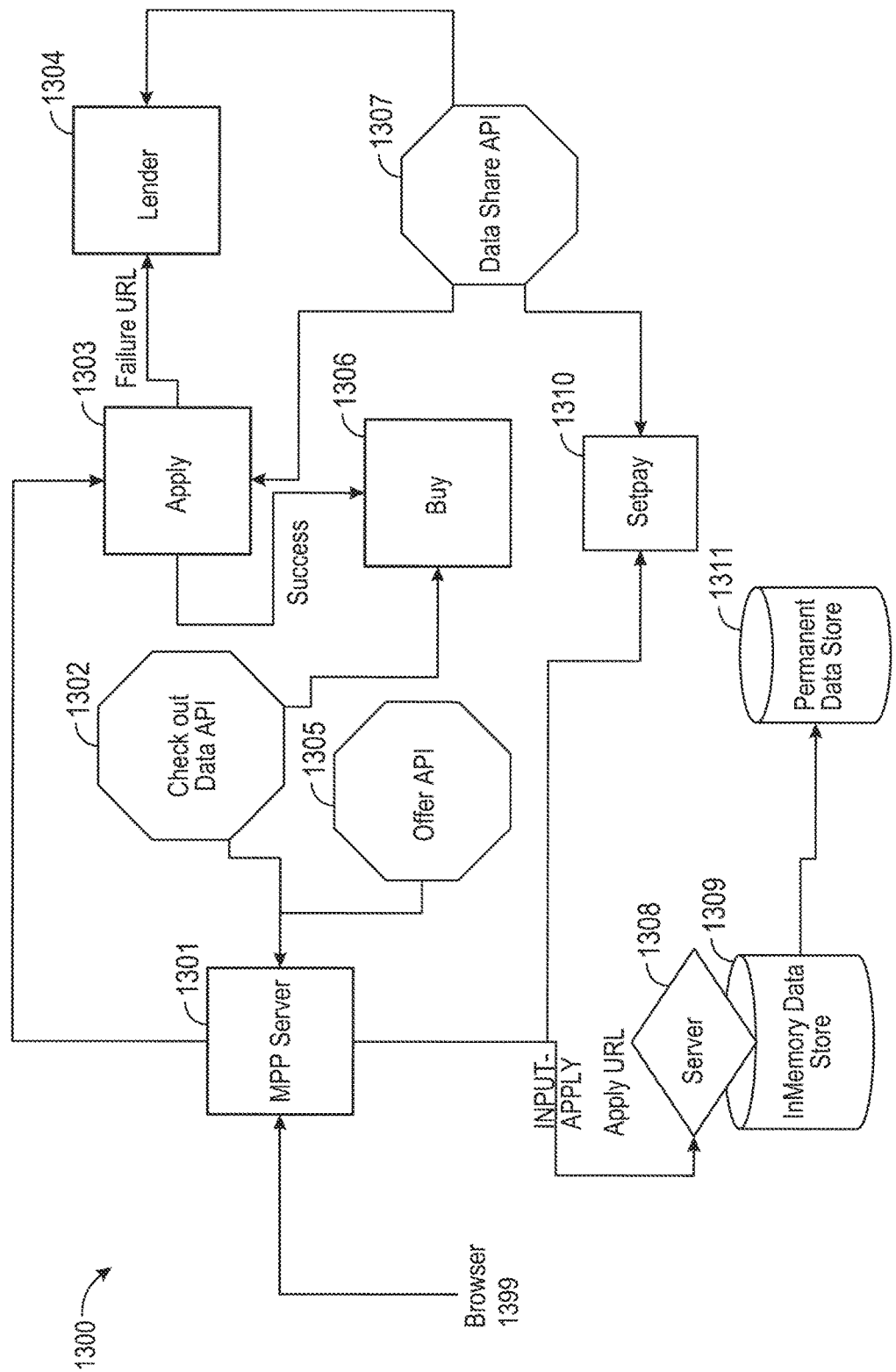
FIG. 13 is a flow diagram illustrating a method in accordance with some examples.

FIG. 13 illustrates another process 1300 for use with an MPP server 195. Process 1300 similarly involves operations available as part of MPP server interactions with a merchant website for a transaction involving a customer. In the example of process 1300, the MPP server 1301 manages interactions with a merchant website via a browser 1399 or other interface on a client device (e.g., via an application API) to manage product presentations for offers from an offer API 1305 and purchase operations via apply systems 1303 and buy systems 1306. A check out data API 1302 can be used with the MPP server 1301 to integrate MPP systems for facilitating checkout in addition to allowing product system integration (e.g., apply systems, offer systems, etc.) in a transaction. Process 1300 illustrates primary (e.g., direct) product systems associated with the MPP server 1301, as well as indirect $3^{rd}$ party lender systems 1304 that can be integrated when credit products are not available directly from systems associated with the MPP server 1301 (e.g., direct apply systems 1303 reject or fail in an offer, and then waterfall to with indirect $3^{rd}$ party lender systems such as lender systems 1304). Third party lender systems 1304 and set pay systems 1310 can receive information from a data share API 1307 that can receive information from a MPP engine associated with the MPP server 1301, or from other data systems. Such data systems can include server 1308, a data store 1309 which may include temporary data storage, and a permanent database 1311, that can include data that complies with privacy settings or regulations. Such data storage systems can be used by product systems and MPP analysis for training and offer selection in accordance with any aspects described herein. In some examples, some $3^{rd}$ party product lender systems can qualify for secure access to shared data managed by the MPP server 1301. In other examples, the lenders make independent decisions without access to any sensitive data managed by the MPP server.

Figure 14:
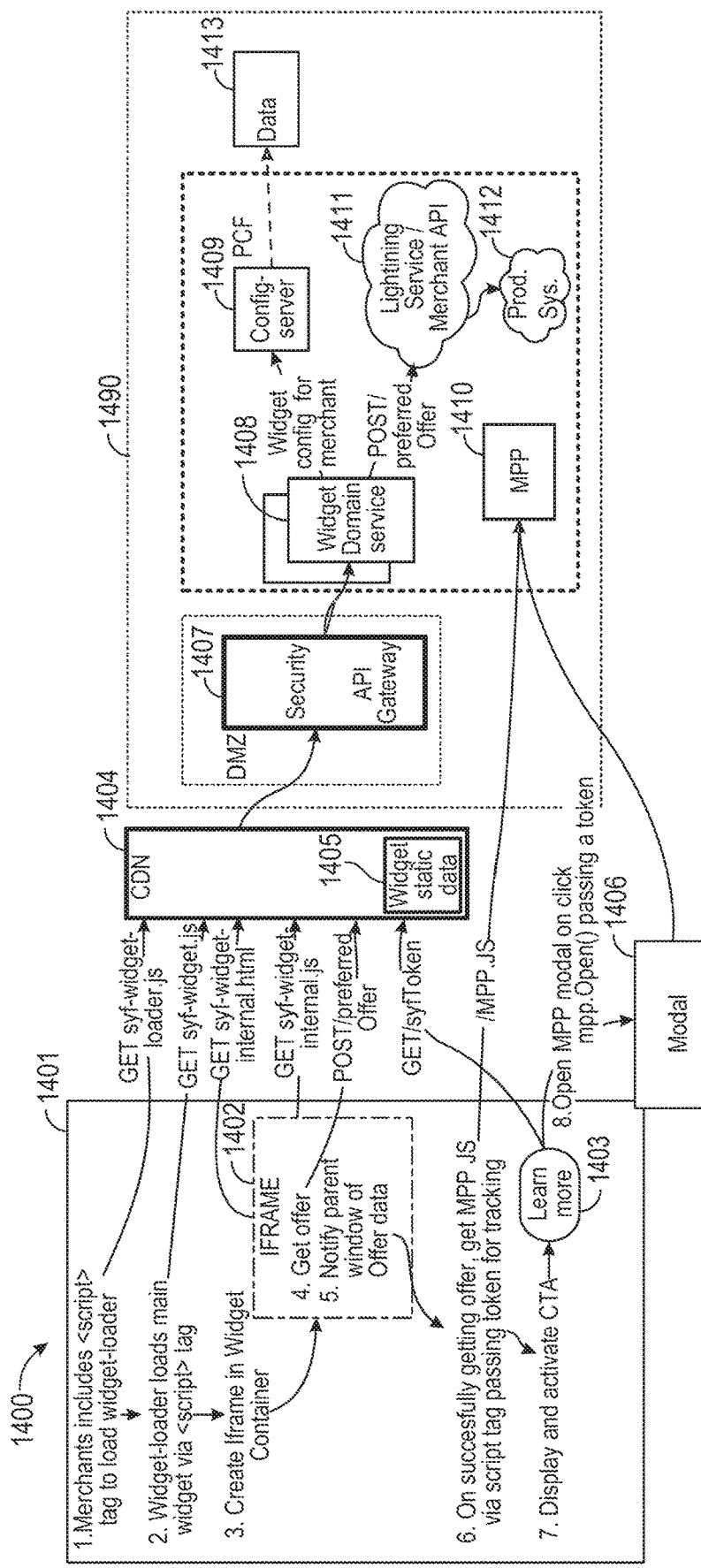
FIG. 14 depicts aspects of a system including a multi-product platform in accordance with some examples.
Figure 15:
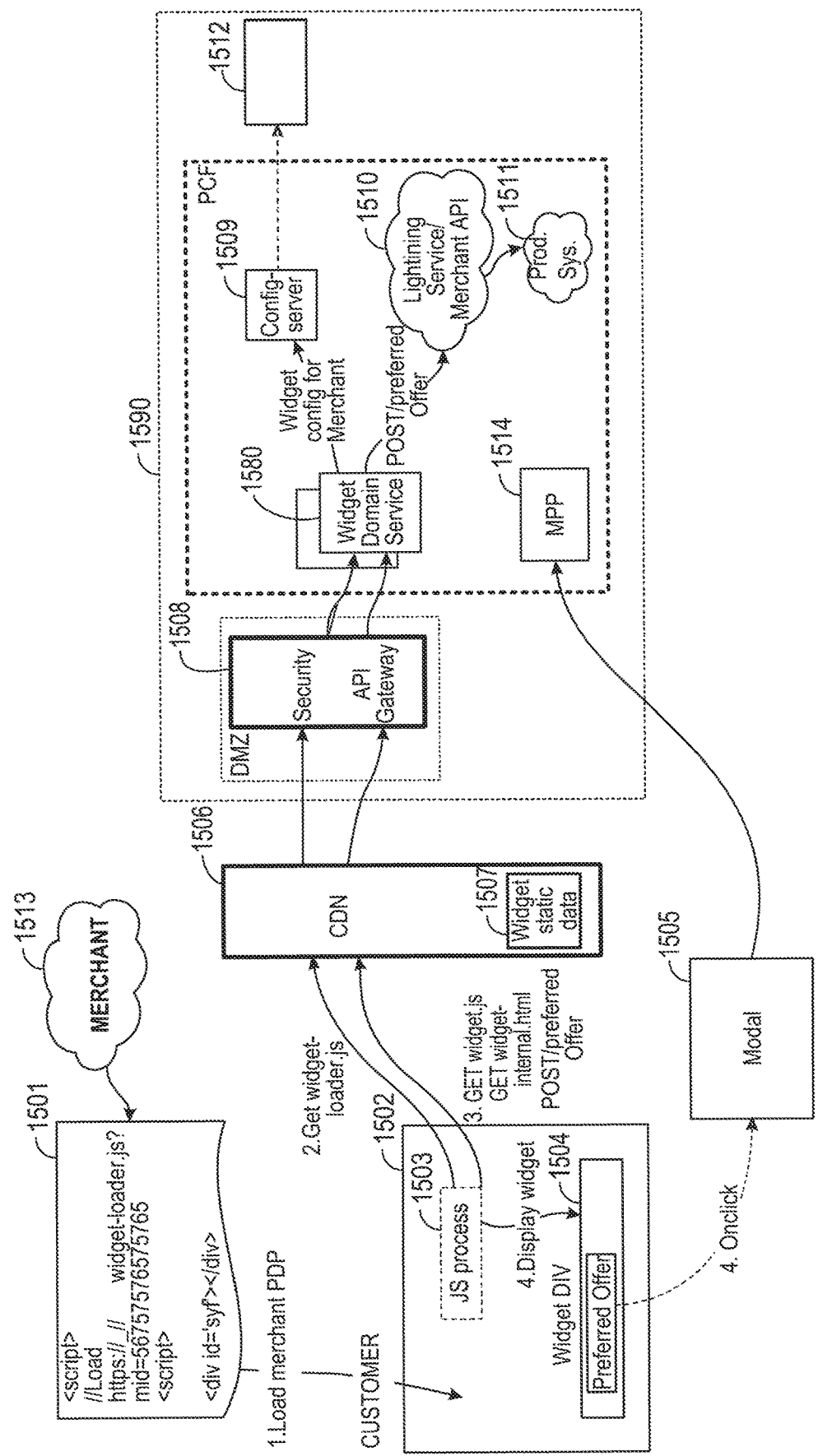
FIG. 15 depicts aspects of a system including a multi-product platform in accordance with some examples.

FIGS. 14 and 15 depict aspects of a system 1400 including a multi-product platform in accordance with some examples. As described above, an MPP server (e.g., the MPP server 195, the MPP server 201, etc.) can use state information to determine information to provide to a customer device via an MPP server provided modal. In some examples, such state data can also be used by a widget server or a webserver system 1490 (e.g., enabling Javascript) to integrate the state data directly into JavaScript or widget application data transferred to a customer device and supported by a widget domain service 1408. FIG. 14 illustrates an example implementation with a merchant system 1400 having website data 1401 used to initiate loading of widget data onto a customer device. In the illustrated example, a merchant includes a script in website data 1401 to load a widget loader via a customer device's web browser (e.g., using JavaScript process) to access static widget data 1405 via data network 1404, and any additional data via security system 1407. The widget loader then loads a main widget using the script tag. The widget is used to create an Iframe 1402 in a widget container. The Iframe 1402 can act at the customer device to interact with the MPP server 1410 to access offers from product systems managed by the MPP server using MPP integration 1403. When products with appropriate offers are available, the Iframe 1402 can notify a parent window of the merchant website of the available offer data received from one or more product systems via the MPP website using the provided MPP integration 1403. MPP scripts associated with the main widget can track offer presentation use as prescriptive tracking data described above for use with analytics, along with any other such tracked data allowed by a customer selection or customer preference settings. Such communications can flow through CDN 1406, security system 1407, configuration server 1409, data system 1413, merchant API 1411, and internal (e.g., first tier) product systems 1412. At certain points in the customer flow for the website, offers from the MPP server can be presented within an MPP server managed modal 1406. When offers are selected via the modal, or a purchase indication associated with a transaction calls MPP server functionality, the modal is used for such operations.

FIG. 15 depicts aspects of a system including a multi-product platform in accordance with some examples. The operations illustrated track the operations described above, with alternative details shown associated with the widget operation and calling of the MPP associated modal. In FIG. 15 a merchant system 1513 interacts with a purchasing device 1502 to executes instructions 1501 for a web-browsing software that receives instructions to access a merchant webpage stored by a webserver. The web-browser executes code 1503 of the webpage to render interfaces including MPP integration element 1504 to present a preferred offer, access widget static data 1507 and MPP systems via data network 1506, security system 1508, and widget domain service 1580 on the client device using a widget loader as described above. An MPP server 1514 can further interact in this system to cause the web-browser to execute code for a modal 1505 add-on to the merchant web page as described herein, with the modal using merchant configuration information to standardize interface elements from the website and the MPP. The webpage can include a script tag including a script (e.g., a set of instructions) for executing acquisition protocols. For example, the script may obtain a user identifier and/or one or more attributes of the computing device. Such attributes may be used for device fingerprinting as described herein.

The script may then transmit the user identifier and/or attributes of the computing device to a system 1590 including MPP server 1514 (e.g., and systems of the MPP server). The script may identify one or more possible alternative acquisition protocols based on the user identifier and/or attributes of the computing device. For example, the server may identify an alternative acquisition protocols based on a geolocation of the computing device. Server then selects from the possible alternative acquisition protocols one or more alternative acquisition protocols to be transmitted to webpage.

The acquisition protocols may be based on a variety of different dynamic consumer information identified by the scripts operating on a customer device. Such protocols can, for example, be based on history data associated with clickable (e.g., selectable in the user interface of the web-browser software displaying a merchant website) advertising for products or promotions, clickable prequalification for products or services, clickable purchase selections, or clickable engagement interfaces to communicate with a sales representative (e.g., via a chat modal or communication system). Other protocols can be based on device alerts that are set by general or merchant specific settings, or messaging set by general or merchant specific settings.

In some examples, acquisition protocols can be based on account login information received at a web-browser, or user selection of merchant associated links. In other examples, protocols can be based on widget functionalities in a device associated with product systems, or other such systems. The widget functionalities used to trigger protocol use can include reporting components, merchant alert components, authentication components, or other such widget (e.g., software sub-system) functionality. The protocols can be used to allow the device 1502 to display product system information identified by configuration server 1509, product systems 1512, merchant API 1510, product systems 1511, or any other such systems managed by MPP server 1514.

Any such data at a customer device described above can be received at a server and processed to select acquisition protocols. Such operations can be performed within an MPP server 1514, or in a separate widget server or webserver within system 1590. When the data is processed, a rules engine or a machine learning algorithm can use the dynamic customer information described above to select one or more acquisition protocols. The particular acquisition protocol selected by the server can be based on personalization for the customer device, AB tested or testing rules, or the trained machine learning algorithm. Depending on the dynamic decision making, the selected acquisition protocol can be associated with delivery of a specific JavaScript associated with the acquisition protocol to the customer device. When the JavaScript associated with the selected acquisition protocol is received at the customer device, the JavaScript is used to update and modify the user experience at the customer device. For example, during a specific time period within a threshold time before a holiday, dynamic customer data acquired from various sources described above (e.g., browser data, user clicks, etc.) can be used to select a particular protocol and an associated script from a number of available protocols and associated scripts. When the script is received at the customer device, the device executes the script and the web-browser interface generated in association with the merchant website and the script is customized using the script. As additional data is gathered from the customer device and sent to the widget server (e.g., or other server handling the protocol selection), a new or refined protocol can be selected, and a new or supplemental script sent to the customer device. Such refinement can continue until the customer device terminates the interaction, either by leaving the website without completing a transaction, or by completing a transaction.

The data gathered and the history of protocol selections, script use, and customer device response to the script use, can be stored as history data. In various implementations, the history data can further include AB testing of different protocols and scripts, and refinement of machine learning algorithms with the history data used to update training of the learning algorithm (e.g., using trained neural networks or other such AI tools). In addition to use for improving a customer path through merchant website and MPP interfaces, the data gathered as part of the protocol and script selection and refinement process can be stored and used for services and products within an MPP system, such as offer systems, unique device identification systems, or any other such system described herein.

Figure 16:
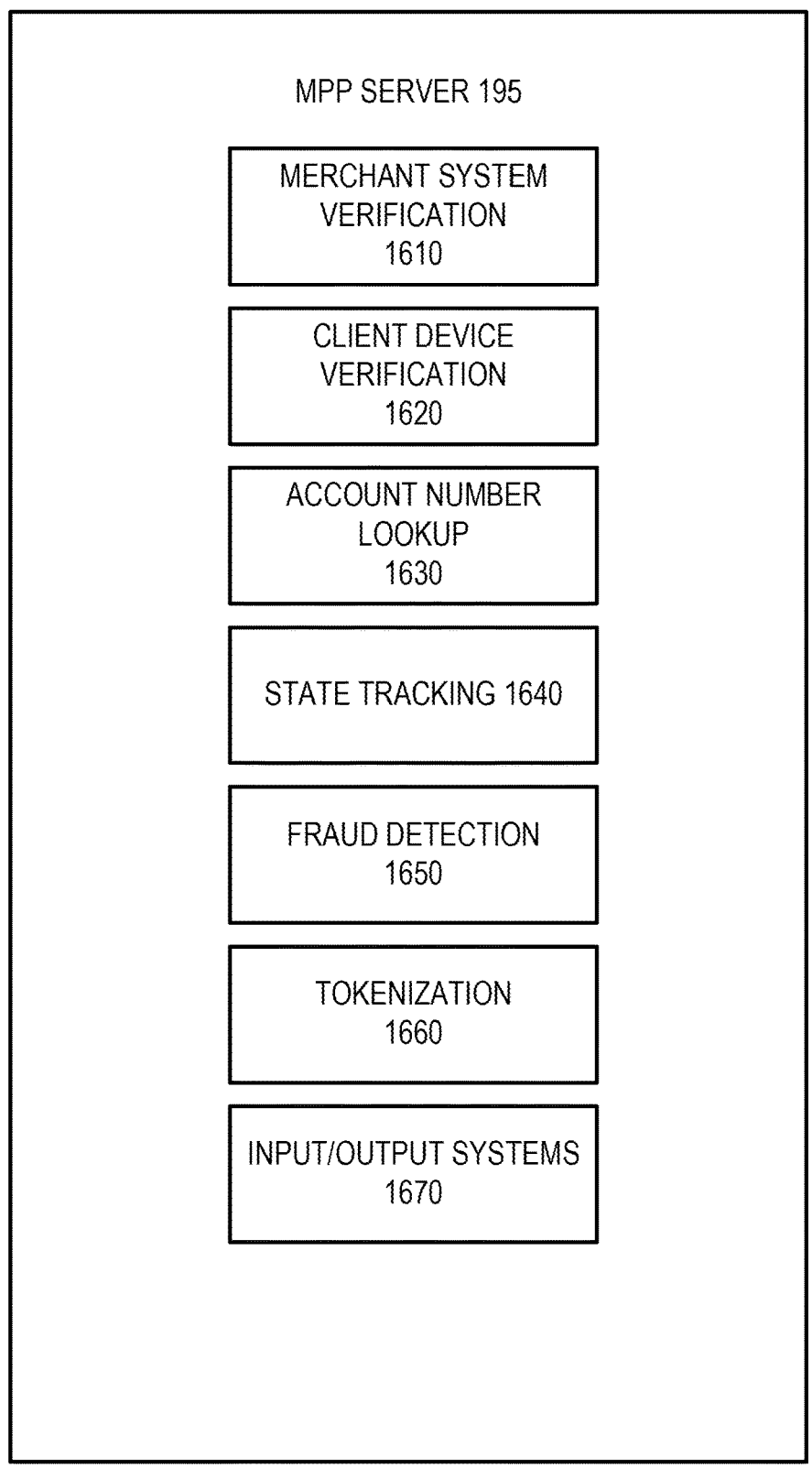
FIG. 16 depicts aspects of an example multi-product platform in accordance with some embodiments.

FIG. 16 depicts aspects of an example MPP server (e.g., the MPP server 195, the MPP server 201, etc.), which can be used within a system 100 or other systems as described above to integrate multiple products into a transaction between a merchant system and a customer device. MPP server 195 includes a number of different elements that can be implemented as modules or different devices networked to implement various security functions. MPP server 195 can be implemented as an application on a POS device (e.g., POS device 110 or 190), as an application on a mobile device (e.g., mobile device 124), as modules on a server, or as any combination of the above across any number of devices. Input/output systems 1670 can manage transmission of data and receipt of data both between different elements of the system 104 as well as with other devices, such as merchant servers and client devices, using any suitable network and communication components, such as those described below with respect to FIG. 16. The communications can also include managing interactions between different product systems which may compete or interact in complex ways. For example, if two products are offered, the offered products may impact each other if both are accepted (e.g., an installment offer and a new account offer or a product based offer combined with a merchant based offer), or the systems may include details or rules that exclude a product if another product is accepted, and the communications may involve providing such information to a purchasing device in an information modal (e.g., disclosure modal 521). The described elements of MPP server 195 include merchant system verification 1610, customer device verification 1620, account number lookup 1630, state tracking 1640, fraud detection 1650, and input/output systems 1670. In other examples, these elements can be grouped in a variety of different ways. For example, client device verification 1620 and fraud detection 1650 can, in some examples, be structured as a single sub-system, or can be largely implemented as a separate system (e.g. using separate fraud detection system(s) such as those of device(s) 150). In various examples described below, the elements of account security system perform different parts of the operations to implement security as part of a secure transaction that uses modular elements to add to the security of larger systems.

Merchant system verification 1610 interacts with merchant systems such as merchant system 108 to authenticate that the merchant is safe for a user to perform a transaction with. This verification can be done using security measures such as using security keys, transaction history data, merchant registration, and other verification tools. Merchant system verification 1610 can create tokens that can be used as part of a secure transaction to allow participants in the transaction to confirm that they are interacting with verified participants that have met security standards and have access to the token generated by merchant system verification 1610 for a specific transaction.

Customer device verification 1620 can include security operations to check for issues with a client's device, such as malicious software installed on a customer device, a history of questionable transactions or fraud associated with a specific device, or other operations. This verification can be implemented via communication with a specific client device, accessing database data with fraud history data, or requiring installation of software on a customer device to check for security issues with a client device. In some examples, merchant system verification 1610 operations and customer device verification 1620 operations can be used as gateways for additional sub-systems, such that merchant systems and client devices are not allowed access or use of additional systems such as account number lookup 1630 unless the threshold requirements of merchant system verification 1610 and customer device verification 1620 have been met.

Account number lookup 1630 interacts with client devices to receive customer data and access sensitive client account information. These operations can, for example, include receiving information such as an address, phone number, government identifier, or other such information, and using this information to access an account number associated with a customer credit account. The client credit account number can then be provided to the customer device or tokenization 1660 element with an authorization to use the credit account with a specific secure transaction (e.g. a transaction associated with a client token generated by merchant system verification 1610.) Verification can accept a customer account number associated with the client credit account, and provide information such as an available balance to allow a customer to confirm that the available balance is sufficient for a current secure transaction. The operations of account verification and account number lookup 1630 can be associated with a particular transaction, and used to trigger generation of tokenized client data by tokenization 1660 element. This tokenization can involve generation of a one-time set of data that can be used only for a specific transaction. In some examples, after the tokenized customer data is generated in response to account security system interacting with a client device, the tokenized customer data is then stored until it is requested by the merchant system associated with the secure transaction, or until a deletion event occurs. Such deletion events can include a threshold amount of time, a number of incorrect requests for data associated with the client device or the customer account, or other such events. If a deletion event occurs, a subsequent request for the data by the verified merchant can be met with a response indicating that the data has expired and the secure transaction is to be restarted (e.g. a new secure transaction initiated and the original transaction abandoned.)

State tracking 1640 can receive information about a transaction flow and widgets present on a customer device. The state tracking 1640 can be used to trigger updates to MPP data and to retrieve information from product systems to determine when certain offers from product systems are to be made available to a customer device as part of a transaction.

Throughout operations for data security described herein, fraud detection 1650 can monitor data and generate alerts or halt operations for a specific transaction when a risk of fraud is identified.

Figure 17:
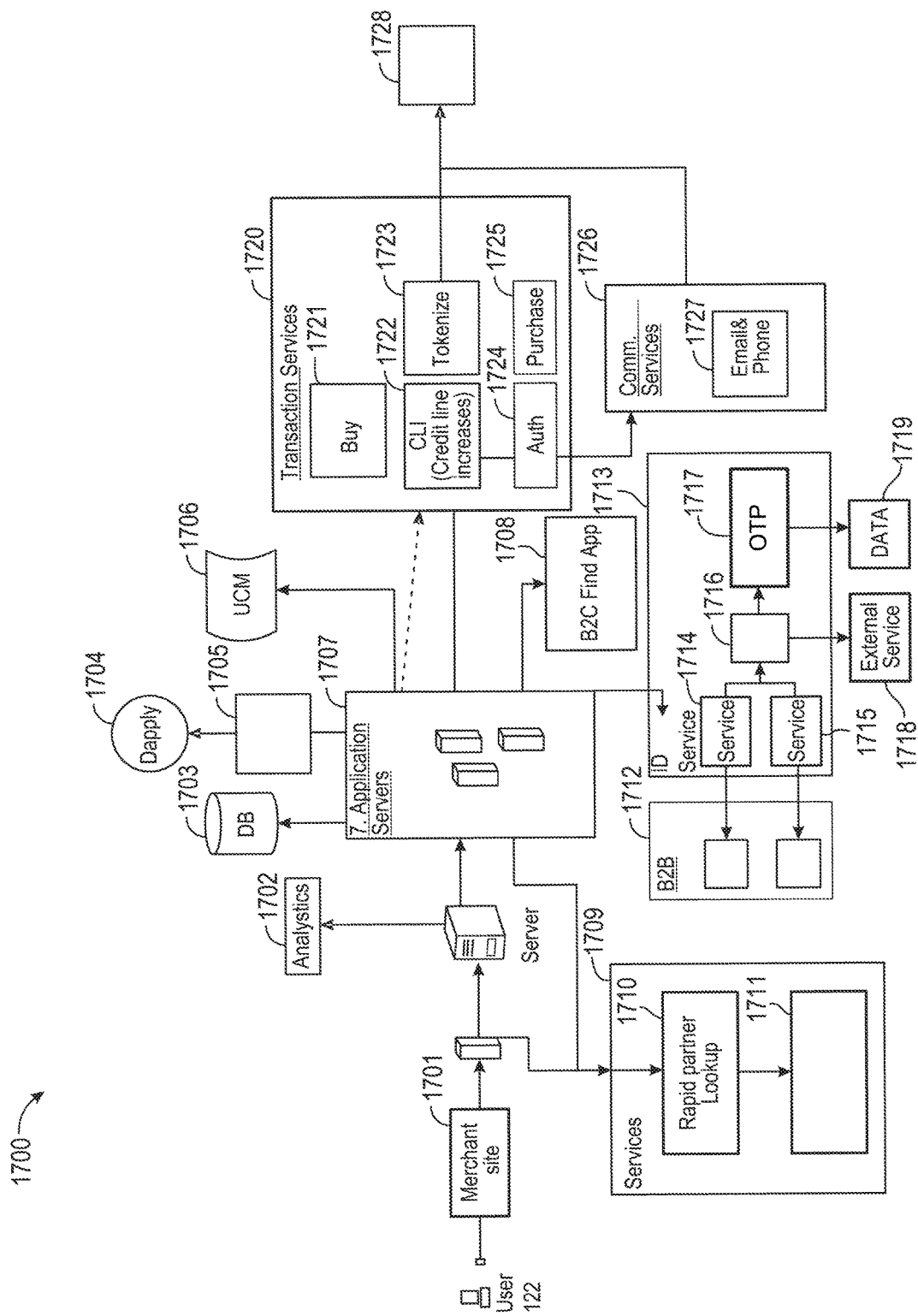
FIG. 17 depicts aspects of a system including a multi-product platform in accordance with some examples.
Figure 18:
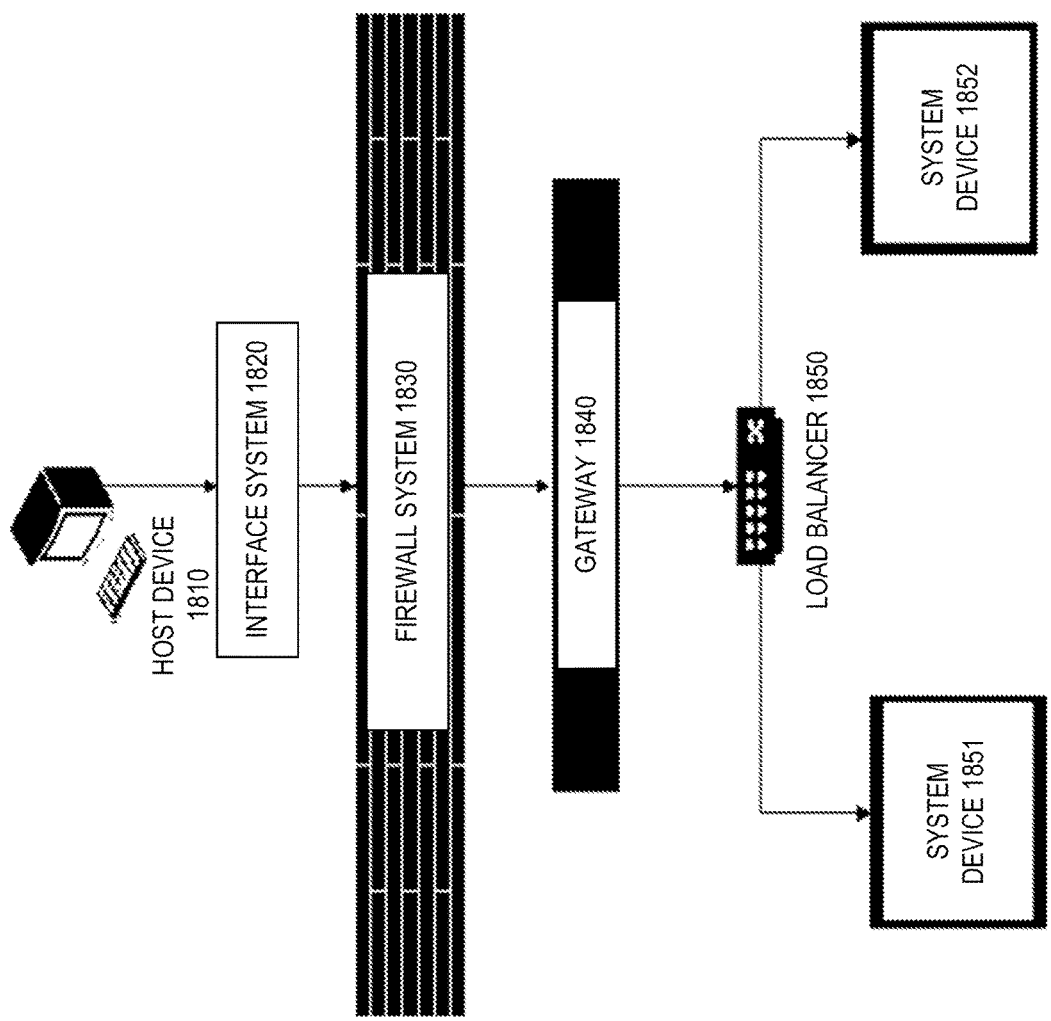
FIG. 18 shows illustrative aspects of a system for use with a multi-product platform in accordance with at least one example.

FIGS. 17 and 18 illustrate aspects of a system architecture 1700 for an example system using an MPP server. The architecture elements include various database, security, and product service elements used with an MPP server and analytics systems of the server. In the architecture of FIG. 17, direct product systems are shown as integrated with the architecture, and communications interfaces are available for indirect products, microservices, interactions with merchant websites, and other such systems.

In the architecture 1700, customer 122 (e.g., a customer or client associated with a purchasing device or customer device) interacts with a merchant system 1702 including a merchant site with purchasing information. The merchant system 1701 is coupled to a services system 1709 including rapid partner lookup systems 1710 and service systems 1711 that can enable the merchant system 1701 to interact with services such as the MPP service with MPP engines as described herein. The connection to application servers 1707 further allows connections with database(s) 1703, product systems 1704 and 1705, additional support systems and services 1706, 1708, 1712, and 1713. The support system 1708 can include a business find application system that supports waterfalled product systems with services and security operations for transaction support, including one time password system 1717, data service 1719, and other internal services 1714 and 1715, as well as external services 1712, and external support service 1718 via connection 1716 to allow integration with one time password system 1717. The MPP server can integrate product systems with systems to facilitate transactions in transaction services system 1720, which can include transaction buy (e.g., credit) services 1721, credit increase services 1722, tokenization services 1723, authorization services 1724, purchase services 1725 (e.g., connected to authorization and settlement systems). The transaction services 1720 can access external network systems 1728 and communication services 1726 such as email and phone services 1727 to support and facilitate transactions. Information from any such systems not limited by privacy, system rules, or regulations can be sent to analytics system 1702 for use in MPP server decision making as described herein.

FIG. 18 illustrates additional aspects of network data management for architecture 1700 in accordance with at least one embodiment. FIG. 18 includes interface system 1820 for interacting with a host device 1810 (e.g. a retail computer system or a customer device used to interact with a merchant web site or POS device) and protecting an authentication system that can include system devices 1851 and 1852. In particular, for a data management system protecting secure data, interface system 1820 can be one layer in a multi-layer secure management system for allowing a retail system and customer devices, such as host device 1810, to communicate with secure data stored in the devices of the system, including system device 1851 and 1852. The interface system 1820 can thus be separated from system devices 1851 by a firewall system 1830, a gateway system 1840, and a load balancer system 1850. The interface device can provide tokens to devices such as host device 1810 to authorize communications. Such a token, however, may not provide sufficient protection, and firewall system 1830 can include additional protections, including analyzing incoming request for patterns of malicious attack or improper communications. Further, some systems can be configured for large numbers of requests, and so request data for high volumes and different distributions of geographic locations originating different requests can be managed by gateway system 1840 and load balancer system 1850, which can route request data to different system devices such as system device 1851 (e.g., a computing device operating as an MPP server 195 or part of an MPP server 195 system) and system device 1852 based on incoming data and performance of different devices in a system.

Figure 19:
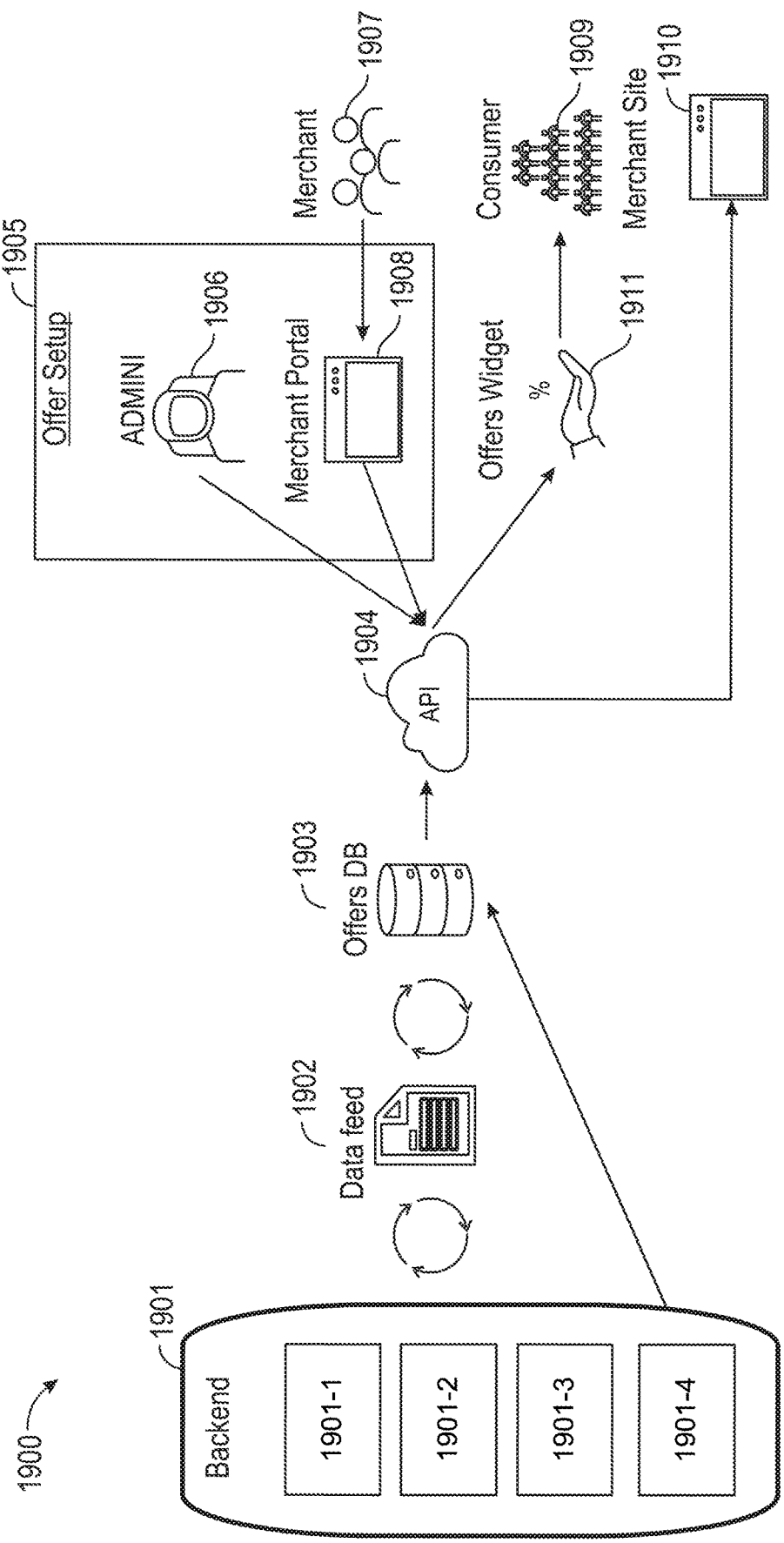
FIG. 19 illustrates aspects of a system for dynamic offer selection in accordance with at least one example.

FIG. 19 illustrates aspects of a system 1900 for dynamic offer selection in accordance with at least one example. The system 1900 includes a backend system 1901 that gathers available offers from product systems 1901-1, 1901-2, 1901-3, 1901-4, etc. As available offers are added to or removed from the backend system 1901, a data feed system 1902 monitors changes and provides a feed of updates to an offers database 1903. The offers database 1903 includes all current offers available for various product systems (e.g., product systems integrated with an MPP server, including internal and external or waterfall systems). These are not offers that are necessarily presented to clients, but are offers that are available to be selected by merchant systems to be made to customers of a given merchant. An offer setup system 1905 allows system administrator devices 1906 and merchant systems 1907 (e.g., via merchant portal 1908) to access the available offers from the offers database via application programming interface (API) 1904 to manage and sort options for dynamic selection of offers from product systems (e.g., systems 1901-1 through 1901-4, or any number of product systems in various implementations.) As described, such dynamic selection can be configured using various aspects of a rules engine, static configuration data, client state data from Javascript, an offers widget application, or other dynamic customer data, using a machine learning algorithm trained with results data from previous transactions, or other such configuration data. A merchant using a merchant portal can also specifically select offers for inclusion according to merchant based rules, such as limited time period offers, seasonal offers, product type offers, inventory based offer triggers (e.g., associated with merchant tracked inventory status data), or other such rules, using a merchant portal.

In some implementations, a data feed system can include offer data, and the system can track availability data for offer data in the data feed. Such tracking can include tracking and recording information for previously stored, offers, and adding or removing offers from a database based on various criteria. Such criteria can, for example, include removal criteria such as removing an offer if an offer update or validation has not been received from a product system within a threshold amount of time. Such tracking can also be matched with target performance criteria, such as acceptance rates, return rates, or other such thresholds. If a target performance criteria has a history of negative results that occur more often than a threshold level, the removal criteria can dynamically and automatically remove such offers from an MPP system until corrective action associated with the offers is made, or an active adjustment and confirmation is made for the offer. Similarly, positive feedback can be associated with target results, where target results above an identified threshold can be used to increase a likelihood of an offer being selected by the MPP server. Such positive results can, for example, be associated with particular prices (e.g., prices for specific products or for products within an industry code group, etc.).

During a transaction using a merchant website or merchant application, an offers widget can track a consumer state, and dynamically select or order offers presented by an offer widget 1911 (e.g., as describe in associated with widget systems above) to a consumer 1909 during a transaction via an MPP interface 1910. The dynamic selection can be based on the available offers for a merchant as selected from the available offers database using merchant based rules. The dynamic selection of subsets of such offers or ordering of such offers can be performed in real-time during the transaction based on up-to-date Javascript state data or widget application data received from a consumer device, combined with any other such dynamic consumer data. In some examples, a machine learning system is used with dynamic consumer data to select or order the available merchant offers based on history data. The system can then facilitate completion of a transaction based on customer interactions with offers presented via the offer system. In some examples, in addition to the merchant based rules, system rules can be applied using rules for multiple merchants. In some example, certain characteristics or rules can be generalized to groups of merchants (e.g., based on standard categories or merchant types) or to all merchants in a system. In some examples, such rules can be selected as defaults for all merchants or groups of merchants, and merchant based rules can modify or override such system rules.

Examples improve device operation by reducing device actions to provide appropriate relevant offer details to customers. In some examples, offers are targeted based on dynamic consumer information associated with price targets for a customer (e.g., including offers that will result in price or payments that fall within a target range for a given consumer).

Examples pull data from multiple product systems, such as payment systems, revolving credit systems, periodic payment systems, pricing systems and any other such product system described herein. Examples further improve system operation with improved merchant configurability with access to customize product based offers, including rate offers, for any products in the system using a merchant customized merchant portal.

Further, in some examples, merchants can select customized widget configurations. In some examples, a merchant customizes a widget for a merchant customized MPP interface in accordance with MPP systems described herein. Such examples can allow merchant customized state data for a customer, along with seamless merchant interface with the merchant website and merchant customized details for product offers from different products in an MPP system. In some examples, the merchant specific widget can additionally limit or customize product offerings from an MPP system available to all customers of a merchant site, or to specific customers based on the dynamic customer data. In such examples, any dynamic customer data described herein can be used to limit the product types presented to a given customer, and to select offers from the selected product types based on merchant rules.

As described above, examples such as system 1900 can be used to enable merchant partners control of financing offers available via POS elements, particularly in commerce website contexts. In some examples, system 1900 can allow system users options to filter and prioritize offers with initial configurations, with dynamic selection among a changing set of offers, and can further improve customer visibility to the offers dynamically selected in a merchant's context improving product goals and device operation by simplifying interfaces associated with offer presentation and reducing the number of user interface actions to view available offer data and complete transactions following offer selection.

Some implementations of system 1900 can include dynamic contextual intelligence for matching customer indications and information with available offers within merchant selected criteria ranges. A dynamic offer system 1900 can, in some implementations, include a partner portal that allows merchants or other users to select criteria to dynamically customize and filters offers available for a merchant, and then to dynamically select and promote certain offers as they are presented to customers engaging in transactions via merchant POS systems (e.g., for a commerce website sale interface). The dynamic selection can be based on merchant customized rules and sorting orders for available offers, as well as filtering of offers possible within the system.

A partner portal implemented in system 1900 can act as a central hub to provide simplified access to products in an MPP system. In some examples, such a central hub not only centralizes products from different product systems, but also manages offers from multiple product systems associated with a merchant and the merchant's dynamically selected available offers. In some examples, this allows a simplified single view that allows management of offers for a merchant in an interface that uses a reduced number of interface actions to control. In some implementations of system 1900, artificial intelligence machine learning can be used with both advertising data (e.g., prospective data) and post transaction data (e.g., history data). Such data can not only be used in providing feedback for a single product, but can be used in improving and modifying engines for dynamically selecting offers across multiple products. Training of machine learning algorithms can use both history data to improve the function of the algorithms in dynamic selection and organization of offers from among sets of available offers for a merchant. Additionally, real-time data associated with client device states and customer paths through interfaces of a merchant website can be used in real-time to dynamically impact selection and presentation of offers to the client. Such systems can reduce resource usage by simplifying user paths to a desired result using fewer search resources and fewer failed or rejected offer selections.

Figure 20:
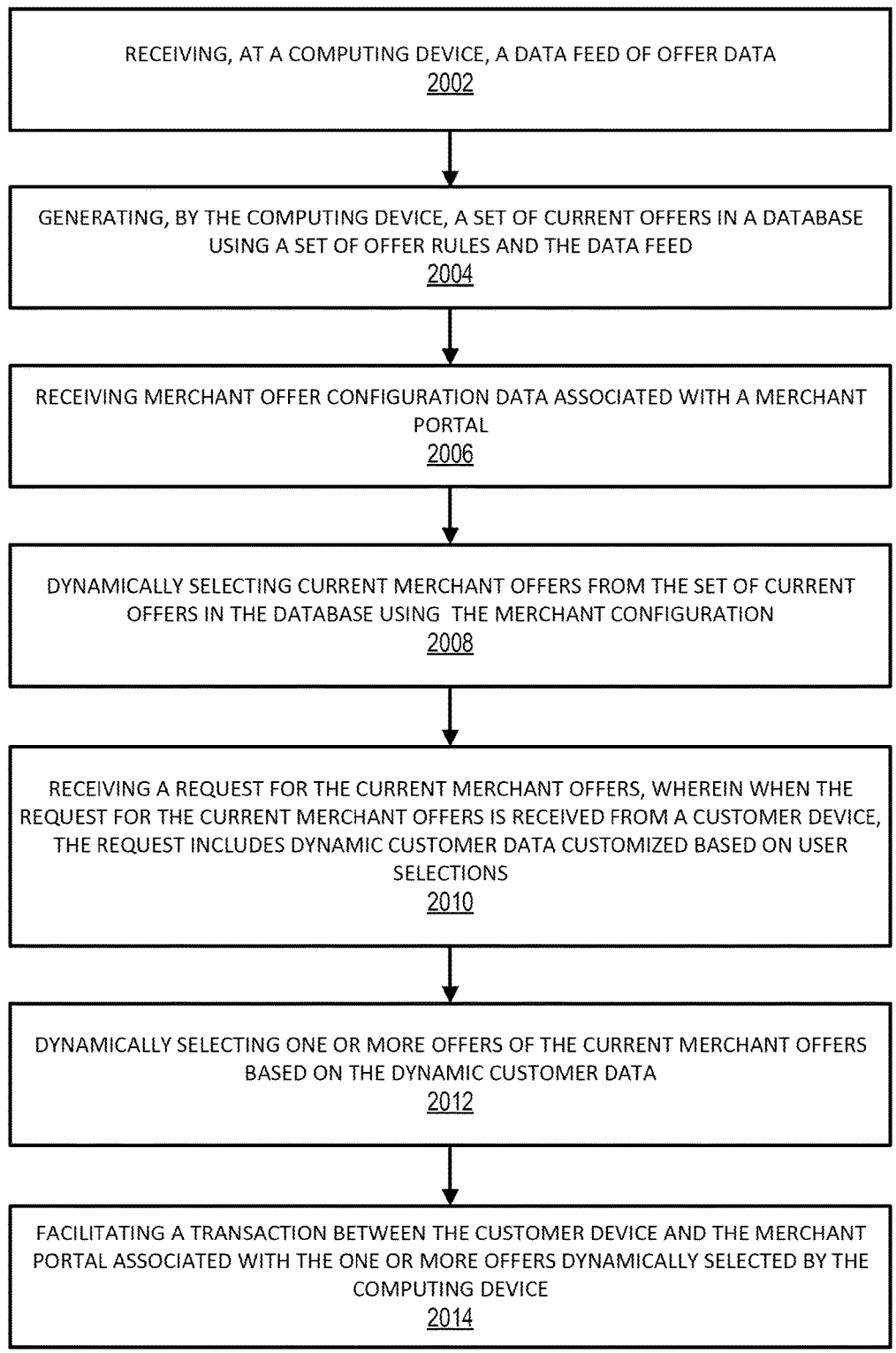
FIG. 20 is a flow diagram illustrating a method in accordance with some examples.

FIG. 20 is a flow diagram illustrating an example method 2000 for dynamic offer generation. Method 2000 can be performed by one or more processors of a server computer or server system as part of an MPP system (e.g., MPP server 195). Method 2000 can, in some examples, be implemented as computer readable instructions that, when executed by processing circuitry of a device, cause the device to perform steps of method 2000.

Operation 2002 of method 2000 involves receiving, at a computing device, a data feed of offer data.

Operation 2004 of method 2000 involves generating, by the computing device, a set of current offers in a database using a set of offer rules and the data feed.

Operation 2006 of method 2000 involves receiving merchant offer configuration data associated with a merchant portal.

Operation 2008 of method 2000 involves dynamically selecting current merchant offers from the set of current offers in the database using the merchant configuration.

Operation 2010 of method 2000 involves receiving a request for the current merchant offers, wherein when the request for the current merchant offers is received from a customer device, the request includes dynamic customer data customized based on user selections.

Operation 2012 of method 2000 involves dynamically selecting one or more offers of the current merchant offers based on the dynamic customer data.

Operation 2014 of method 2000 involves facilitating a transaction between the customer device and the merchant portal associated with the one or more offers dynamically selected by the computing device.

Figure 21:
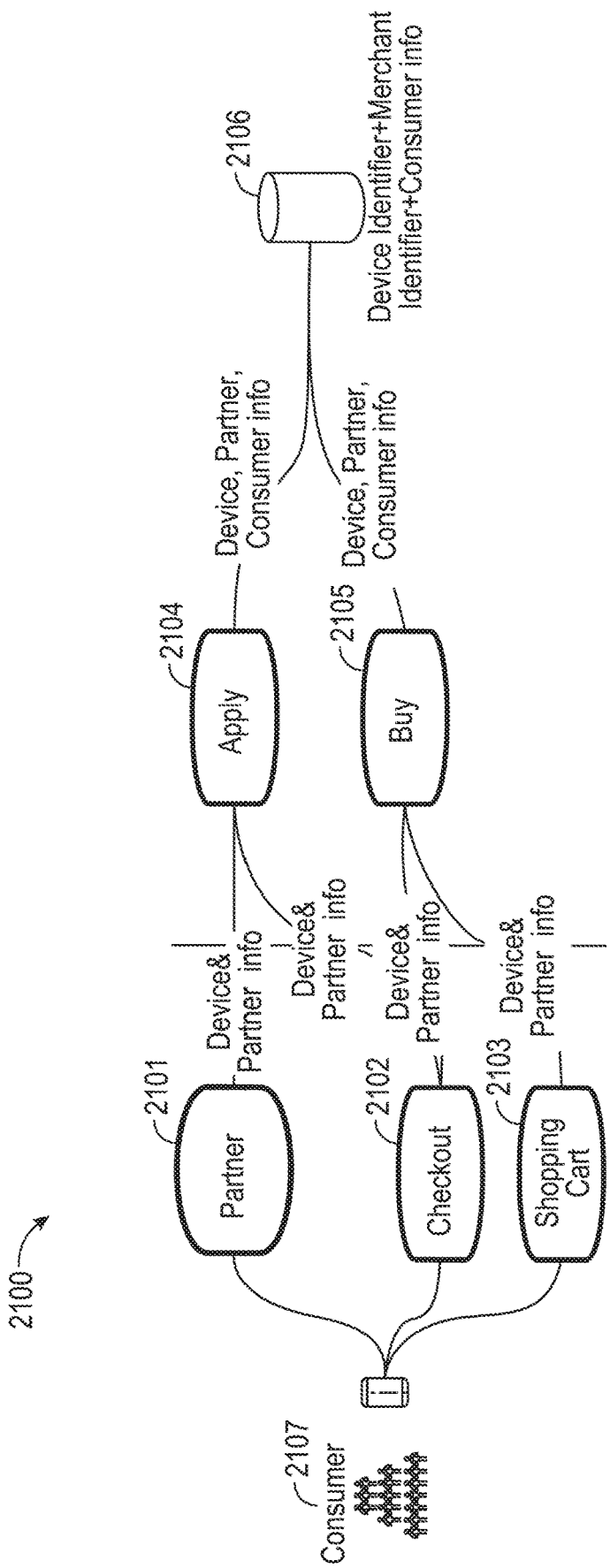
FIG. 21 shows illustrative aspects of a system for unique device in accordance with at least one example.

FIG. 21 shows illustrative aspects of a system 2100 for unique device in accordance with at least one example. System 2100 of FIG. 21 illustrates a fingerprinting system for customer devices. The fingerprinting system generates a set of unique device characteristics that can be used to improve device operation by reducing user interface actions to perform elements of a transaction. System 2100 includes a consumer device 2107 (e.g., mobile device 124, mobile POS device 110, POS device 190, etc.). Such devices 2107 can include a customer's phone, laptop, desktop computer, tablet, or any other such device used by a customer during a transaction. Such a device can interact with multiple different systems as part of a transaction, including partner product systems (e.g., direct systems, indirect systems, etc.), checkout systems, shopping cart systems, or any other such systems of a merchant or transaction system (e.g., MPP systems and product systems, etc.). For implementations within an MPP system, all such internal and external systems can provide device and partner information that can be included with dynamic customer information received during a transaction. Such data can be stored in a database with device identifiers, merchant identifiers, and other customer information.

In various systems such as MPP systems, different products will have different systems. Credit apply operations and purchase operations have traditionally been driven by independent strategies and separate products, with independent partner and merchant integrations. Examples described herein can use unique device characteristics to provide an improved level of security for separate products when they integrate seamless user interface flows and share sensitive client data. To assist with seamless interactions between products, an architecture that facilitates behind-the-scenes communication and data exchange between products in a secure fashion and without customers experiencing technical issues, client device data can be gathered and used in a variety of ways. The customer device data can be used not only to match application function (e.g., operating to address technical issues with specific combinations of client device characteristics), but sufficient detail about a customer device can serve as a client identifier to improve data and transaction security.

Seamless transitions of consumer or buyers between different product systems and transaction systems (e.g., products in an MPP system, credit provider systems, purchase authorizers, shopping cart enablers). All such systems use customer information. Rather than siloing (e.g., separating between domains) such data, examples described herein can store information in a shared database for a cross domain device identification and security. In some examples, sharing or transfer of data can happen with parties sharing an identifier along with consumer (e.g., buyer, purchaser, etc.) data with partners. In subsequent interactions the same identifier can be used for cross-domain security. In some examples, browser technology providers prevent cross domain interactions, which hampers domain integrations. The unique device identification systems described herein provide cross domain data sharing with a unique identifier based on device attributes and partner, provider, and merchant information. Such combinations of information uniquely form a fingerprint that can be utilized across domains without sharing of critical or confidential information either through hypertext transfer protocol (http) based post/get mechanisms or browser related cookie or local storage mechanisms. Some implementations use device identifiers with device details such as a type of operating system and operating system version, a type and version of a browser, canvas details, or any other such device details.

As illustrated, consumer devices 2107 can provide various partner data 2101 from third party or other partner systems, checkout data 2102 associated with transaction, and cart data 2103 associated with indications received via a merchant interface that have not resulted in a transaction. In some implementations, such data can be fed into a database system 2106. In other implementations, such data can be received via partner systems such as an apply system 2104, and a buy system 2105, and provided to the database system 2106 via partner systems. FIG. 21 illustrates two product systems, but in other implementations, any number of product systems can be used. In some such systems, different tiers or types of information are gathered from direct or first tier product systems, and different types of information are gathered from third party, waterfalled, or second tier product systems. In some implementations, combinations of such sources can be used to gather information from various silos to generate data sets that uniquely match consumer devices 2107.

In some examples, partner identifier data 2101 can be included in device identifier information. In some examples, a domain uniform resource locator (URL) history for domain URLs that can be validated and authenticated can be used in device identifier information.

Examples of system 2100 described herein can use an application programming interface that allows various digital components to store data and decisions associated with a customer session while the customer follows user interface flows. In some implementations of system 2100 in the context of MPP systems described herein, checkout data can be temporarily stored by an MPP server or another such system. The store data can include not only state and history data for a transaction (e.g., user interface selection and search histories), but also device details such as operating system versions, browser versions, and other such details about a device. Such data can be gathered not only for a single product interaction, but for any combination of product interactions in a MPP system as described herein. Integration with an MPP system or other similar systems allows security and interface improvement solutions to scale across loosely coupled components for different products.

In other examples of system 2100, a common repository of customer data and device data in database system 2106 allows different products and product systems to have access to the common repository of data. Storage of a unique combination of device details on a temporary basis allows a customer identity to be established, and for the device to access the common depository of information as the device uses multiple product systems. Security systems can confirm that a device's set of characteristics is unique. If the identified characteristics are determined not to be unique, additional data can be requested to arrive at a unique set of characteristics for a device, or additional security limits can be imposed. The unique characteristics are further achieved by limiting the amount of time that a device's characteristics are stored. This reduces opportunities for duplicate device characteristics to be stored in a given time frame. Limiting data storage to deletion threshold limits opportunities for malicious actors to spoof the device data. Such deletion limits can be set for a single transaction time period (e.g., 5 minutes, 10 minutes, etc.), or an expected return time period following a transaction (e.g., 24 hours, 48 hours, etc.).

For example, if an offer product is accepted, data from the offer flow about an applicant's device can be stored in a unique device identification system. Because browser security often cannot be relied upon to store such data, depending on a customer's security settings, a customer input or setting can be used to store such data in a server (e.g., as part of an MPP system or a related system) on a temporary basis. A subsequent purchase transaction that can be associated with the unique device identifier generated during the apply process can enhance security and simplify interfaces by autofilling or automatically providing information such as account details during the purchase operations that follow the apply process. By enabling an cross domain data sharing independent of a user's device, seamless transitions can occur within one or more transactions.

In examples that allow such data use for return transactions, if a customer begins a transaction and then cancels the transaction for any reason, but then returns prior to the unique device identification being deleted, the device operation can be improved by preventing repeated interface inputs. The customer's inputs from the previous canceled transaction can securely be used in the return transaction, preventing duplicate operations in the return transaction.

By creating a time-limited return mechanism, fraud and security systems can additionally be improved by tying return transactions to the unique device identification and history data about return transactions to improve system security. In some examples, a machine learning algorithm can use history data for unique device identification information to determine when return data associated with a uniquely identified device to set fraud expectations. Such data can be used to modify deletion times for unique identification data (e.g., for time frames at which the unique data provides limited security information) in addition to providing fraud indications for a single device or transaction.

In addition to consumer information and merchant information, unique transaction tokens and tokenized data for a transaction can be tied to a device's unique identification data. Such tokenization data can provide additional information security. The tokenized data can, in some examples, share a deletion threshold or deletion time trigger with the other unique device identification data.

FIG. 22 is a flow diagram illustrating a method for unique device identification in accordance with some examples. In some examples, method 2200 can be performed by one or more processors of a server computer or server system as part of an MPP system (e.g., MPP server 195). Method 2200 can, in some examples, be implemented as computer readable instructions that, when executed by processing circuitry of a device, cause the device to perform steps of method 2200.

Operation 2202 of method 2200 involves receiving, at a server computer, transaction data associated with a customer device, wherein the transaction data includes device configuration data. The transaction data can be current transaction information received by an MPP server as described above in implementations where the device fingerprinting is used for MPP security (e.g., where fingerprinting is used for existing cardholder verification or identification, such as finding cardholder information in block 1210, or any other such cardholder identification or authentication).

Operation 2204 of method 2200 involves aggregating device configuration data for the client device received within a threshold time period to generate a unique set of device configuration characteristics. As described above, the client device can be a customer mobile device, laptop, desktop, tablet, or any device in a transaction system, including a POS device.

Operation 2206 of method 2200 involves receiving, at a server system, transaction request data associated with the customer device.

Operation 2208 of method 2200 involves verifying the client device using the unique set of device configuration characteristics.

Operation 2210 of method 2200 involves facilitating a transaction associated with the transaction request data based on verification of the customer device using the unique set of device configuration characteristics.

In some aspects, the method 2200 can operate where the unique set of device configuration characteristics includes an operating system type and version, a web browser type and version, and canvas details for the client device. In some aspects, the method 2200 can operate where the unique set of device configuration characteristics includes partner identifiers received from one or more third party servers associated with the client device. In some aspects, the method 2200 can operate where the unique set of device configuration characteristics includes data from a validated uniform resource locator history tracked via cookies or via local storage at the client device accessible by the server computer. In some aspects, the method 2200 can operate where the unique set of device configuration characteristics are accessed by the server computer using hypertext transform protocol-based post and get commands with the client device.

In some aspects, the method 2200 can involve further operations for storing the unique set of device configuration characteristics in a cross-domain identification database, associating the unique set of device configuration characteristics with a deletion timer, receiving an updated set of unique device configuration characteristics prior to expiration of the deletion timer, updating the unique set of device configuration characteristics with the updated set of unique device configuration characteristics for the client device including a timer refresh counter, and deleting the unique set of device configuration characteristics when the deletion timer expires without additional updated characteristics being received for the client device. Such expiration of data can allow fingerprinting to be used for transaction security, while limiting the risk of data being leaked or publicly distributed. Additionally, as device information may change or be updated, such an expiration reduces the risk of a transaction being rejected due to stale, old, or outdated fingerprint information for a customer device. Such expiration can, for example, be a single day expiration timer, a 48 hour deletion timer, a one month deletion timer, or any other such timer set to balance security and privacy. In some aspects, a dynamic deletion criteria can be used, such that security breaches or risks trigger an automatic deletion. In some aspects, a threshold number of device identification checks or a privacy risk threshold (e.g., associated with any combination of time, security breaches, usage frequency, changes in use patterns or unusual transactions, etc.) triggers deletion of identification data, with a notice to a customer to re-upload or provide information to the system that has been deleted and to confirm that no transactions using the device were fraudulent. After such a verification, the unique information for the device can continue to be used.

Various methods, including the method 900, the method 1000, the method 2300, etc. are described herein, along with variations on such methods. Any such method can be modified in accordance with aspects described herein to include additional intervening operations or repeated operations. Further, it will be apparent that certain methods can be modified to add certain elements of any method described herein and remove other elements while remaining within the scope of the aspects described herein.

Figure 23:
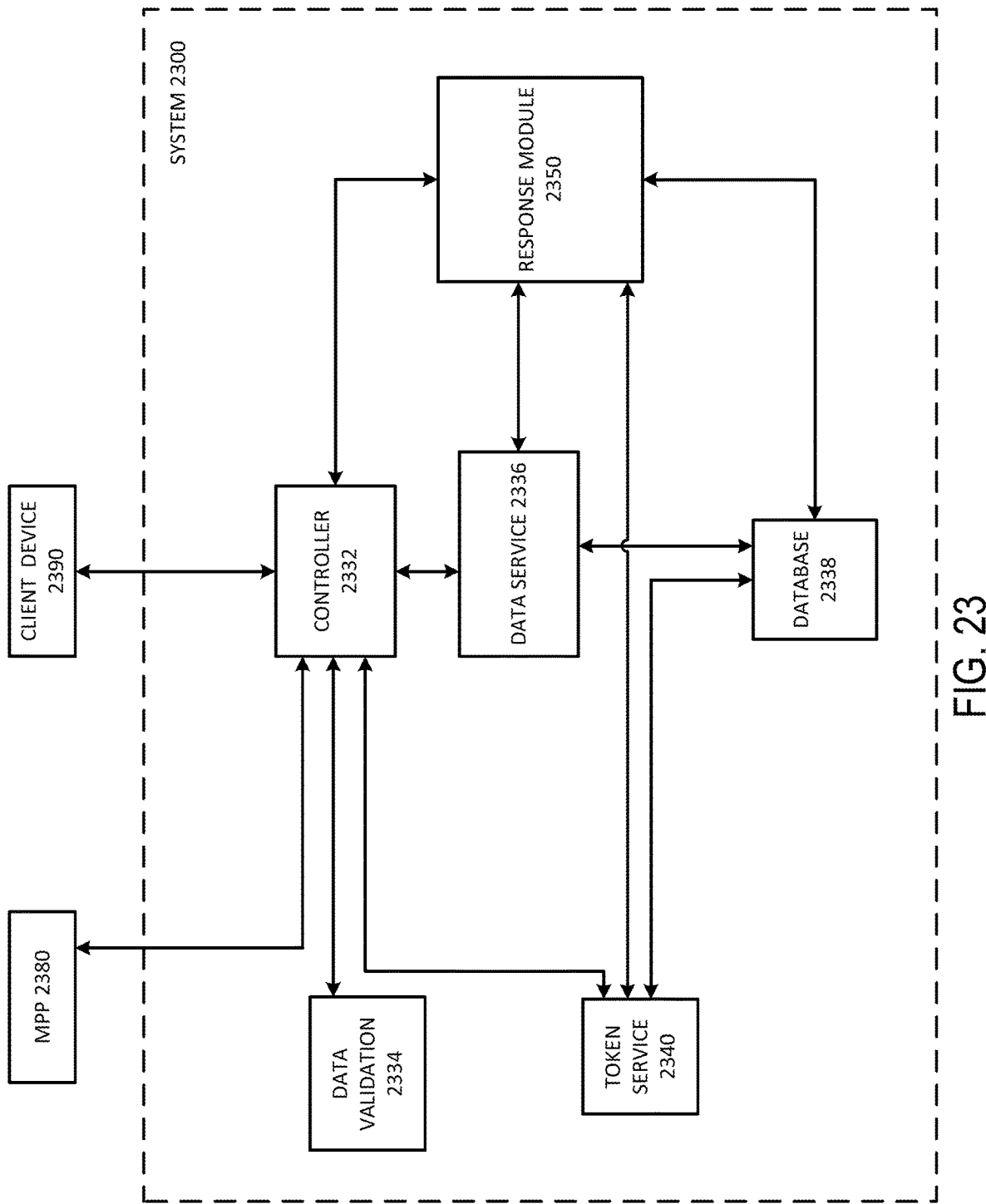
FIG. 23 illustrates aspects of a tokenization system for use with examples described herein.

FIG. 23 illustrates an example of an authentication system 2300 that can be used for tokenization of data managed by an MPP server 2380 in conjunction with product systems and merchant systems as part of a transaction between a merchant and a client device 2390 involving MPP server 2380 (e.g., similar to the MPP server 195, the MPP server 201, etc.). The example of FIG. 23 can operate in accordance with aspects of a system that can use tokenization for MPP server 2380 managed products. In the illustrated system of FIG. 23, a customer device 2390 can provide request data to the authentication system. A controller 2332 processes the incoming request data and accesses a request validation service in data validation 2334. If the request is validated, the controller 2332 initiates generation of a token using module 2350. Additional details of module 2350 are described below. Module 2350 provides a secure token to controller 2332. At any point, either in parallel to or after generation of the secure token, the controller can also initiate a data fetch using data service 2336. This can include any information for a service to be called in response to the request data. In some implementations, data from the data service can be used with the initiation of the generation of the token. In other implementations, the data from data service 2336 (e.g. using database 2338) can then be available for various services as part of MPP managed products and offers. The controller 2332 then initiates communication of the secure one-time line to the authorized recipient (e.g. either directly to a customer device or to the customer via a host, retail, or merchant system).

If the controller 2332 then receives an incoming communication using the secure one-time link, the controller 2332 accesses token service 2340 to verify the authenticity of the communication. This can include fetching data from module 2350 via data service 2336 and from the token service 2340. When the secure one-time link is verified, the token status is updated at token service 2340 to prevent the token from being used again. The controller can then communicate with MPP server 2380 to enable secure communications for decision making and facilitating a response to the request from the customer.

Figure 24:
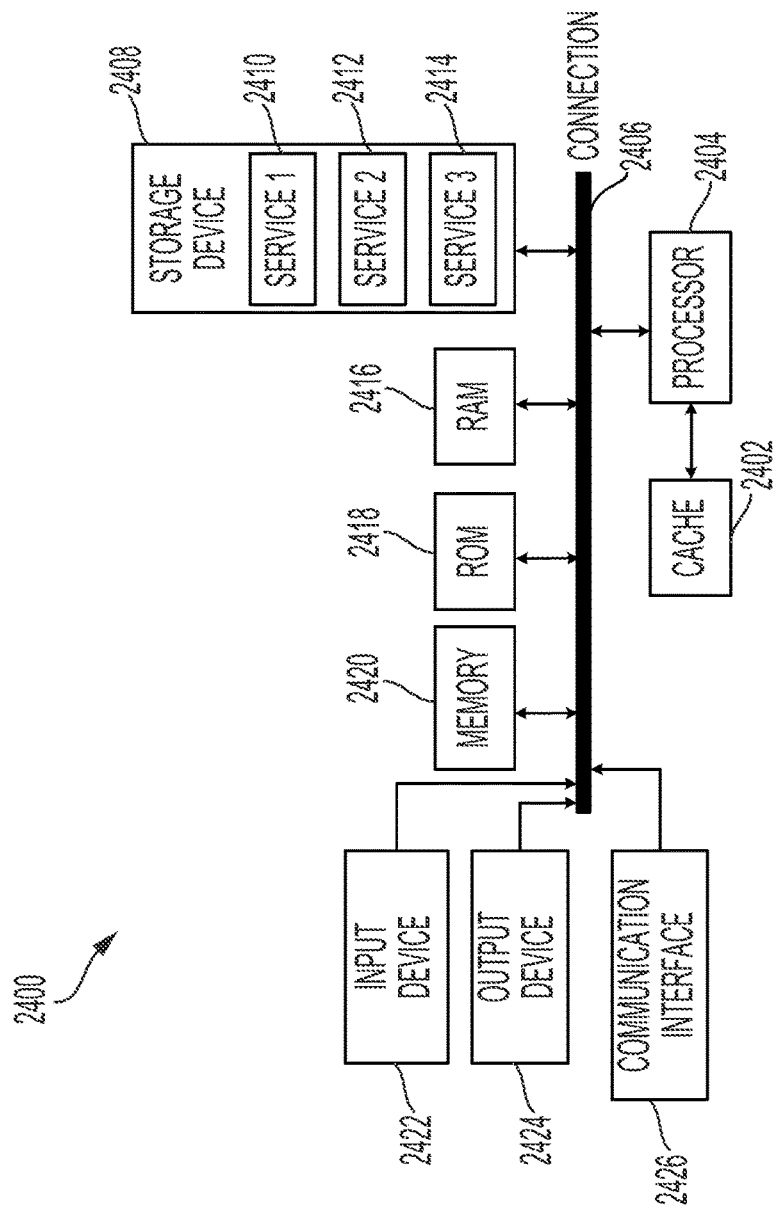
FIG. 24 shows a computing system architecture including various components in electrical communication with each other using a connection in accordance with various examples.

FIG. 24 shows a computing system architecture including various components in electrical communication with each other using a connection in accordance with various examples. FIG. 24 illustrates a computing system architecture 2400 including various components in electrical communication with each other using a connection 2406, such as a bus, in accordance with some implementations. Example system architecture 2400 includes a processing unit (CPU or processor) 2404 and a system connection 2406 that couples various system components including the system memory 2420, such as ROM 2418 and RAM 2416, to the processor 2404. The system architecture 2400 can include a cache 2402 of high-speed memory connected directly with, in close proximity to, or integrated as part of the processor 2404. The system architecture 2400 can copy data from the memory 2420 and/or the storage device 2408 to the cache 2402 for quick access by the processor 2404. In this way, the cache can provide a performance boost that avoids processor 2404 delays while waiting for data. These and other modules can control or be configured to control the processor 2404 to perform various actions.

Other system memory 2420 may be available for use as well. The memory 2420 can include multiple different types of memory with different performance characteristics. The processor 2404 can include any general purpose processor and a hardware or software service, such as service 1 2410, service 2 2412, and service 3 2414 stored in storage device 2408, configured to control the processor 2404 as well as a special-purpose processor where software instructions are incorporated into the actual processor design. The processor 2404 may be a completely self-contained computing system, containing multiple cores or processors, a bus, memory controller, cache, etc. A multi-core processor may be symmetric or asymmetric.

To enable user interaction with the computing system architecture 2400, an input device 2422 can represent any number of input mechanisms, such as a microphone for speech, a touch-sensitive screen for gesture or graphical input, keyboard, mouse, motion input, speech and so forth. An output device 2424 can also be one or more of a number of output mechanisms known to those of skill in the art. In some instances, multimodal systems can enable a user to provide multiple types of input to communicate with the computing system architecture 2400. The communications interface 2426 can generally govern and manage the user input and system output. There is no restriction on operating on any particular hardware arrangement and therefore the basic features here may easily be substituted for improved hardware or firmware arrangements as they are developed.

Storage device 2408 is a non-volatile memory and can be a hard disk or other types of computer readable media which can store data that are accessible by a computer, such as magnetic cassettes, flash memory cards, solid state memory devices, digital versatile disks, cartridges, RAMs 2416, ROM 2418, and hybrids thereof.

The storage device 2408 can include services 2410, 2412, 2414 for controlling the processor 2404. Other hardware or software modules are contemplated. The storage device 2408 can be connected to the system connection 2406. In one aspect, a hardware module that performs a particular function can include the software component stored in a computer-readable medium in connection with the necessary hardware components, such as the processor 2404, connection 2406, output device 2424, and so forth, to carry out the function.

The disclosed gift selection, attribution, and distribution system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"), a merchant server system, a payment network, or other such systems. As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor. The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a customer-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the terms "computer readable medium", "computer readable storage medium", "machine-readable medium" and "machine-readable storage medium" should be taken to include a single medium or multiple media (e.g., a centralized or distributed database, and/or associated caches and servers) that store the one or more sets of instructions. The terms "computer readable medium", "computer readable storage medium", "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included (e.g. in FIG. 8). A process may correspond to a method, a function, a procedure, a subroutine, a subprogram, etc. When a process corresponds to a function, its termination can correspond to a return of the function to the calling function or the main function.

Customer devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method for device fingerprinting, the method comprising:
   matching device configuration data associated with a plurality of devices including a client device, wherein the device configuration data includes data for the client device, and wherein matching includes using a time period to generate a unique set of device configuration characteristics associated with the time period;
   training a learning system including a neural network to create one or more datasets that result in uniqueness for devices;
   identifying, via the neural network, one or more device configuration characteristics that create a non-unique overlap between device configuration characteristics associated with one or more other devices of the plurality of devices;
   reducing memory use within a server computer and reducing opportunities for spoofing by removing the one or more device configuration characteristics from the set of device configuration characteristics, wherein removing includes associating the device configuration characteristics with a deletion timer and generating a unique set of device configuration characteristics that are deleted when the deletion timer expires without additional device configuration characteristics being received by the client device;
   receiving, at the server computer, transaction request data associated with the client device;
   verifying the client device using the unique set of device configuration characteristics; and
   facilitating a transaction associated with the transaction request data based on verification of the client device using the unique set of device configuration characteristics.

2. The computer-implemented method of claim 1, wherein the unique set of device configuration characteristics includes canvas details for the client device associated with the time period.

3. The computer-implemented method of claim 1, wherein the unique set of device configuration characteristics includes partner identifiers received from one or more third party servers associated with the client device.

4. The computer-implemented method of claim 1, wherein the unique set of device configuration characteristics includes data from a validated uniform resource locator history tracked via cookies or via local storage at the client device accessible by the server computer.

5. The computer-implemented method of claim 1, wherein the unique set of device configuration characteristics are accessed by the server computer using hypertext transform protocol-based post and get commands with the client device.

6. The computer-implemented method of claim 1, further comprising:
   storing the unique set of device configuration characteristics in a cross-domain identification database.

7. The computer-implemented method of claim 1, wherein the unique set of device configuration characteristics are associated with a 48 hour deletion timer.

8. A device comprising:
   memory; and
   one or more processors coupled to the memory and configured for:
      matching device configuration data associated with a plurality of devices including a client device, wherein the device configuration data includes data for the client device, and wherein matching includes using a time period to generate a unique set of device configuration characteristics associated with the time period;
      training a learning system including a neural network to create one or more datasets that result in uniqueness for devices;
      identifying, via the neural network, one or more device configuration characteristics that create a non-unique overlap between device configuration characteristics associated with one or more other devices of the plurality of devices;
      reducing memory use within a server computer and reducing opportunities for spoofing by removing the one or more device configuration characteristics from the set of device configuration characteristics, wherein removing includes associating the device configuration characteristics with a deletion timer and generating a unique set of device configuration characteristics that are deleted when the deletion timer expires without additional device configuration characteristics being received by the client device;
      receiving transaction request data associated with the client device;
      verifying the client device using the unique set of device configuration characteristics; and
      facilitating a transaction associated with the transaction request data based on verification of the client device using the unique set of device configuration characteristics.

9. The device of claim 8, wherein the unique set of device configuration characteristics includes canvas details for the client device associated with the time period.

10. The device of claim 8, wherein the unique set of device configuration characteristics includes partner identifiers received from one or more third party servers associated with the client device.

11. The device of claim 8, wherein the unique set of device configuration characteristics includes data from a validated uniform resource locator history tracked via cookies or via local storage at the client device accessible by the server computer.

12. The device of claim 8, wherein the unique set of device configuration characteristics are accessed by the server computer using hypertext transform protocol-based post and get commands with the client device.

13. The device of claim 8, wherein the one or more processors are configured for operations further comprising:
   storing the unique set of device configuration characteristics in a cross-domain identification database.

14. The device of claim 8, wherein the unique set of device configuration characteristics are associated with a 48 hour deletion timer.

15. A non-transitory computer readable storage medium comprising instructions that, when executed by one or more processors of a device, cause the device to perform operations including:
- matching device configuration data associated with a plurality of devices including a client device, wherein the device configuration data includes data for the client device, and wherein matching includes using with a time period to generate a unique set of device configuration characteristics associated with the time period;
- training a learning system including a neural network to create one or more datasets that result in uniqueness for devices;
- identifying, via the neural network, one or more device configuration characteristics that create a non-unique overlap between device configuration characteristics associated with one or more other devices of the plurality of devices;
- reducing memory use within a server computer and reducing opportunities for spoofing by removing the one or more device configuration characteristics from the set of device configuration characteristics, wherein removing includes associating the device configuration characteristics with a deletion timer and generating a unique set of device configuration characteristics that are deleted when the deletion timer expires without additional device configuration characteristics being received by the client device;
- receiving, at a server computer, transaction request data associated with the client device;
- verifying the client device using the unique set of device configuration characteristics; and
- facilitating a transaction associated with the transaction request data based on verification of the client device using the unique set of device configuration characteristics.

16. The non-transitory computer readable storage medium of claim 15, wherein the unique set of device configuration characteristics includes canvas details for the client device associated with the time period.

17. The non-transitory computer readable storage medium of claim 15, wherein the unique set of device configuration characteristics includes partner identifiers received from one or more third party servers associated with the client device.

18. The non-transitory computer readable storage medium of claim 15, wherein the unique set of device configuration characteristics includes data from a validated uniform resource locator history tracked via cookies or via local storage at the client device accessible by the server computer.

19. The non-transitory computer readable storage medium of claim 15, wherein the unique set of device configuration characteristics are accessed by the server computer using hypertext transform protocol-based post and get commands with the client device.

20. The non-transitory computer readable storage medium of claim 15, wherein the instructions further configure the device for operations comprising:
- storing the unique set of device configuration characteristics in a cross-domain identification database.

* * * * *